United States Patent
Lee et al.

(10) Patent No.: US 12,010,305 B2
(45) Date of Patent: Jun. 11, 2024

(54) METHOD FOR ENCODING/DECODING IMAGE SIGNAL, AND DEVICE THEREFOR

(71) Applicant: APPLE INC., Cupertino, CA (US)

(72) Inventors: Bae Keun Lee, Seongnam-si (KR); Dong San Jun, Changwon-si (KR)

(73) Assignee: Apple Inc., Cupertino, CA (US)

( * ) Notice: Subject to any disclaimer, the term of this patent is extended or adjusted under 35 U.S.C. 154(b) by 142 days.

(21) Appl. No.: 17/428,330

(22) PCT Filed: Mar. 11, 2020

(86) PCT No.: PCT/KR2020/003390
§ 371 (c)(1),
(2) Date: Aug. 4, 2021

(87) PCT Pub. No.: WO2020/184979
PCT Pub. Date: Sep. 17, 2020

(65) Prior Publication Data
US 2022/0109835 A1    Apr. 7, 2022

(30) Foreign Application Priority Data

Mar. 11, 2019  (KR) .................. 10-2019-0027608
Apr. 19, 2019  (KR) .................. 10-2019-0046344

(51) Int. Cl.
*H04N 19/119*  (2014.01)
*H04N 19/105*  (2014.01)
(Continued)

(52) U.S. Cl.
CPC ......... *H04N 19/119* (2014.11); *H04N 19/105* (2014.11); *H04N 19/176* (2014.11); *H04N 19/577* (2014.11)

(58) Field of Classification Search
CPC .. H04N 19/119; H04N 19/105; H04N 19/176; H04N 19/577
See application file for complete search history.

(56) References Cited

U.S. PATENT DOCUMENTS

| | | |
|---|---|---|
| 11,470,312 B2 | 10/2022 | Lee |
| 2006/0125956 A1* | 6/2006 | Lee .................. H04N 19/577 |
| | | 348/700 |

(Continued)

FOREIGN PATENT DOCUMENTS

| | | |
|---|---|---|
| KR | 10-2014-0017010 A | 2/2014 |
| KR | 10-2014-0064944 A | 5/2014 |

(Continued)

OTHER PUBLICATIONS

International Search Report and Written Opinion in International Appln. No. PCT/KR2020/003390, dated Jun. 17, 2020, 13 pages (with English Translation).

(Continued)

*Primary Examiner* — Fabio S Lima
(74) *Attorney, Agent, or Firm* — Fish & Richardson P.C.

(57) ABSTRACT

An image decoding method according to the present invention may comprise: determining a division type of a coding block; on the basis of the determined division type, dividing the coding block into a first prediction unit and a second prediction unit; deriving movement information of each of the first prediction unit and the second prediction unit; and on the basis of the derived movement information, acquiring prediction samples for the first prediction unit and the second prediction unit.

13 Claims, 16 Drawing Sheets

(51) Int. Cl.
H04N 19/176 (2014.01)
H04N 19/577 (2014.01)

(56) References Cited

U.S. PATENT DOCUMENTS

| | | |
|---|---|---|
| 2013/0215968 A1 | 8/2013 | Jeong et al. |
| 2017/0339425 A1 | 11/2017 | Jeong et al. |
| 2019/0052886 A1 | 2/2019 | Chiang et al. |
| 2021/0168398 A1* | 6/2021 | Ahn ..................... H04N 19/159 |
| 2021/0274162 A1* | 9/2021 | Ahn ..................... H04N 19/46 |
| 2021/0360240 A1* | 11/2021 | Lee ..................... H04N 19/619 |
| 2022/0337832 A1 | 10/2022 | Lee |
| 2022/0337833 A1 | 10/2022 | Lee |

FOREIGN PATENT DOCUMENTS

| KR | 10-2014-0074945 A | 6/2014 |
|---|---|---|
| KR | 10-2017-0111477 A | 10/2017 |

OTHER PUBLICATIONS

International Preliminary Report on Patentability in International Appln. No. PCT/KR2020/003390, dated Sep. 23, 2021, 11 pages (with English Translation).

* cited by examiner

[FIG. 1]
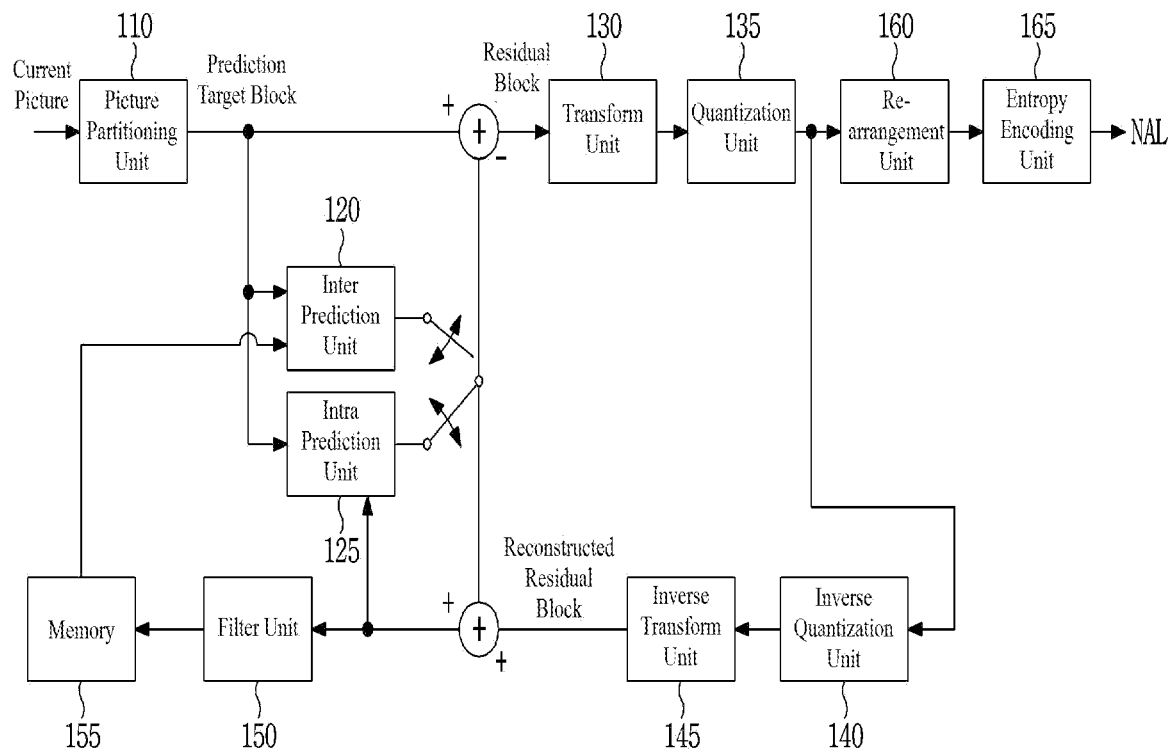
[FIG. 2]
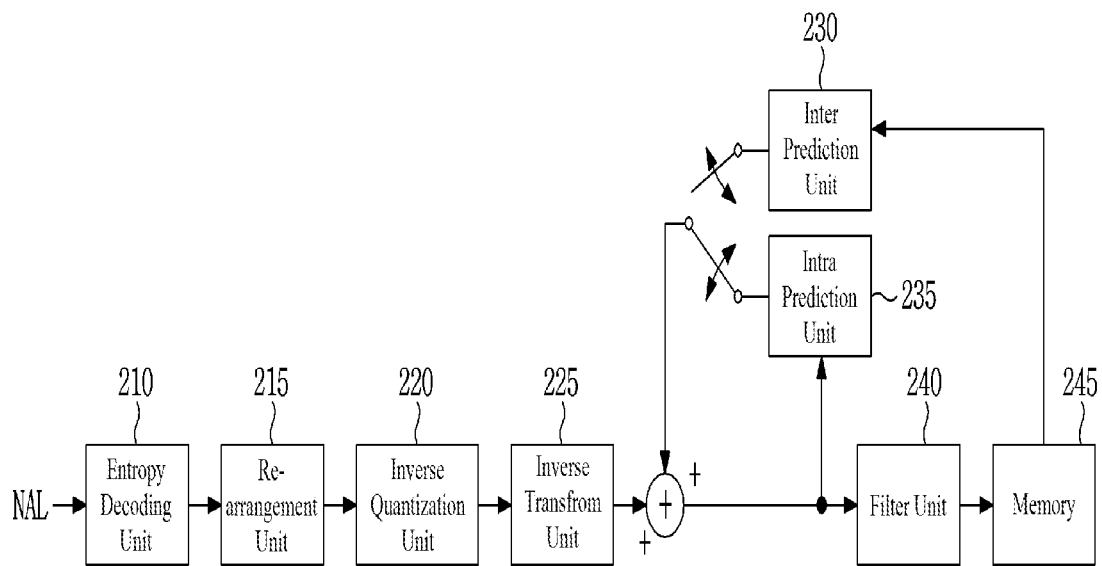

[FIG. 3]
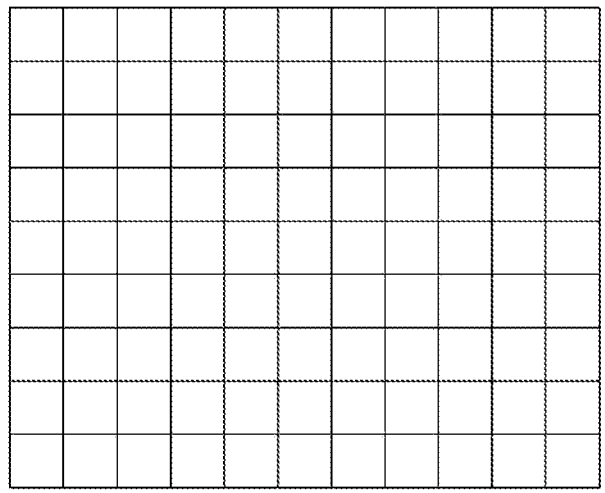
[FIG. 4]
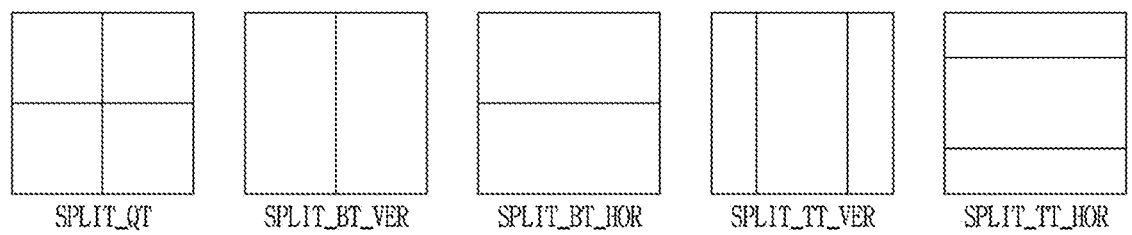
[FIG. 5]
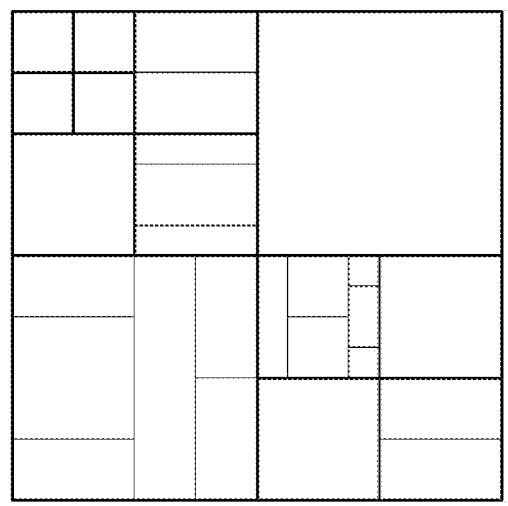

[FIG. 6]
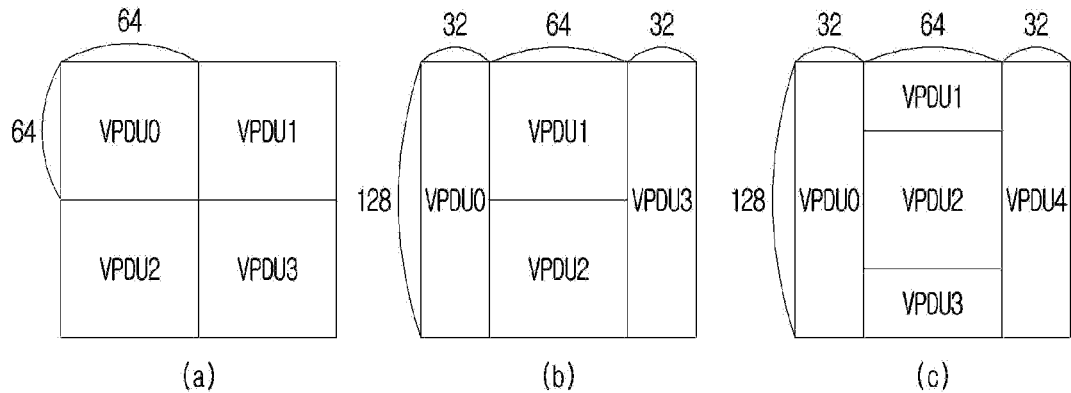
[FIG. 7]
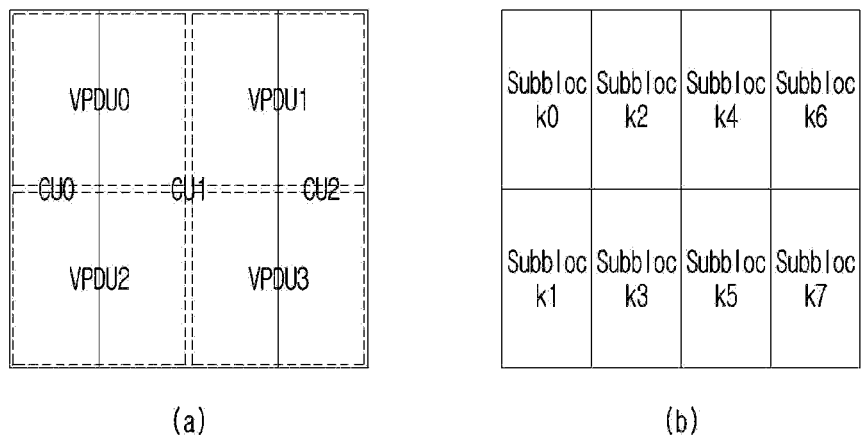
[FIG. 8]
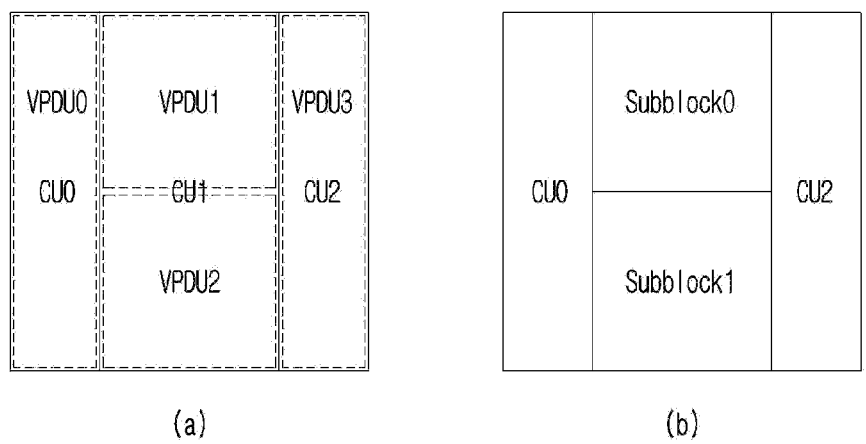

[FIG. 9]
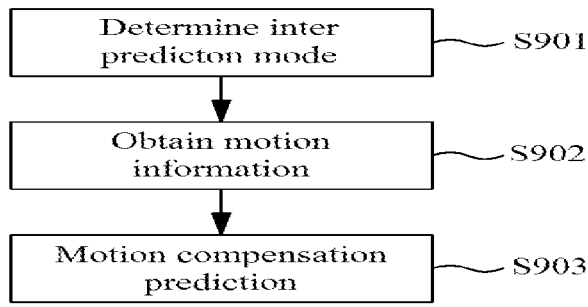
[FIG. 10]
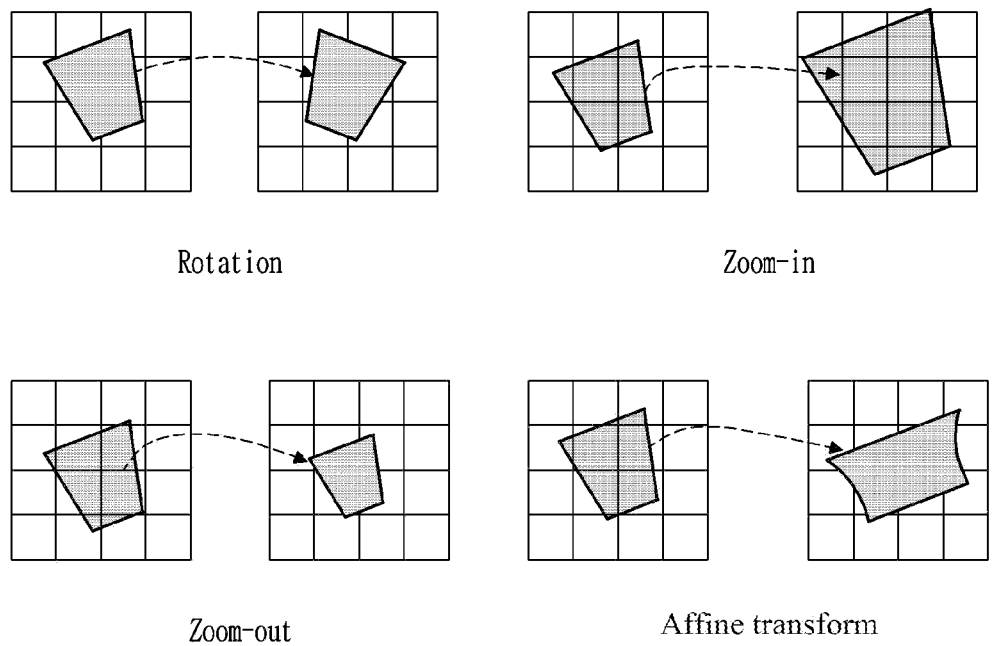
[FIG. 11]
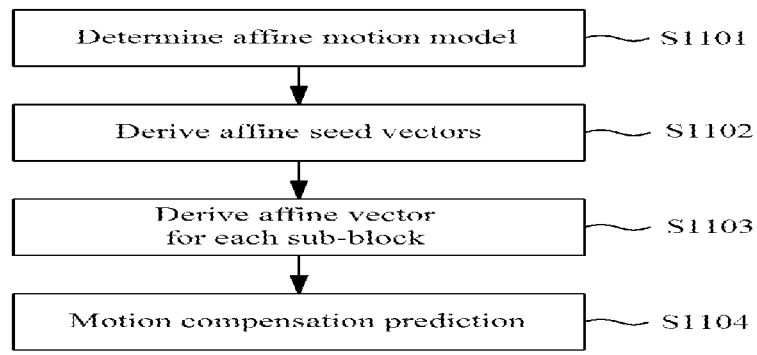

[FIG. 12]
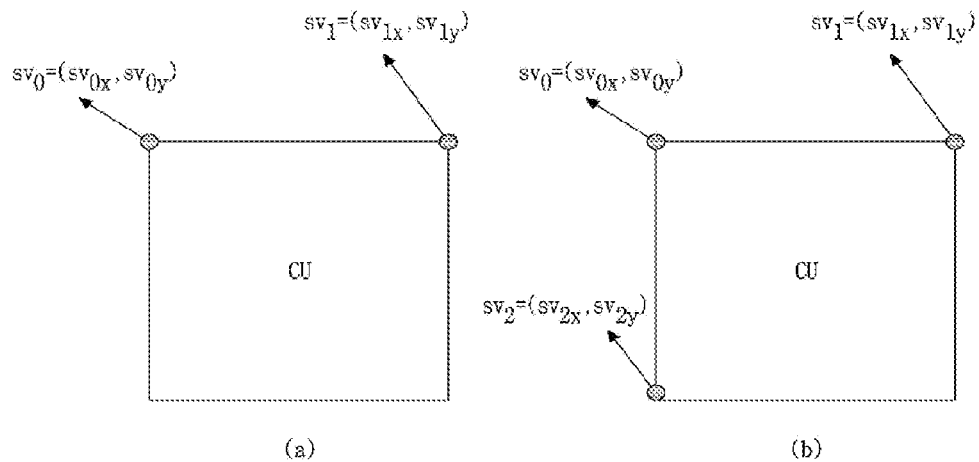
(a)  (b)
[FIG. 13]
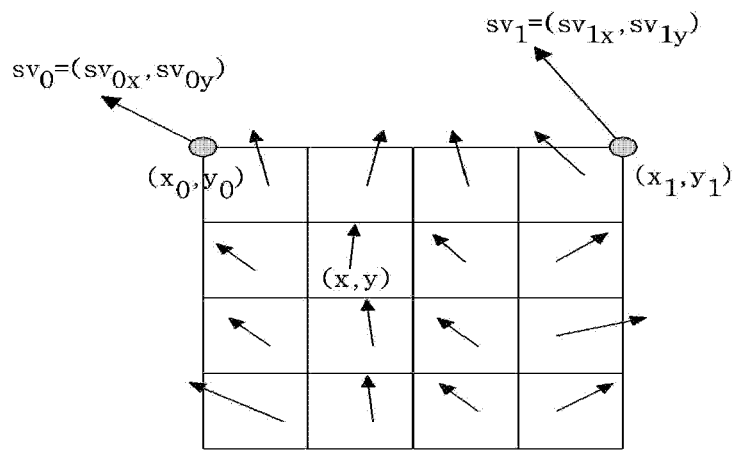
[FIG. 14]
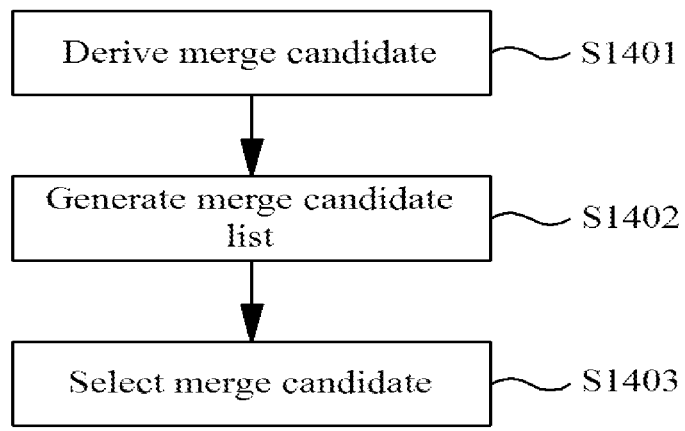

【FIG. 15】
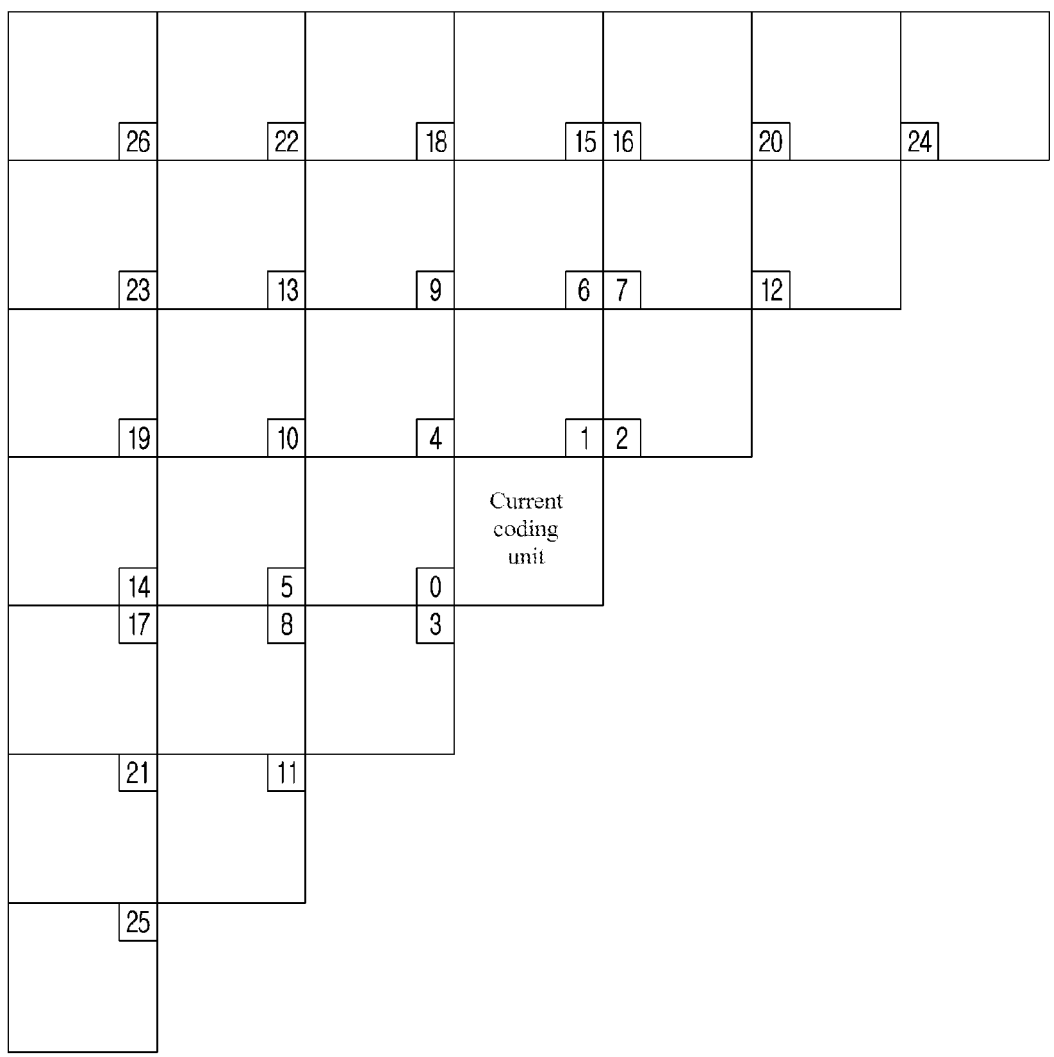

[FIG. 16]
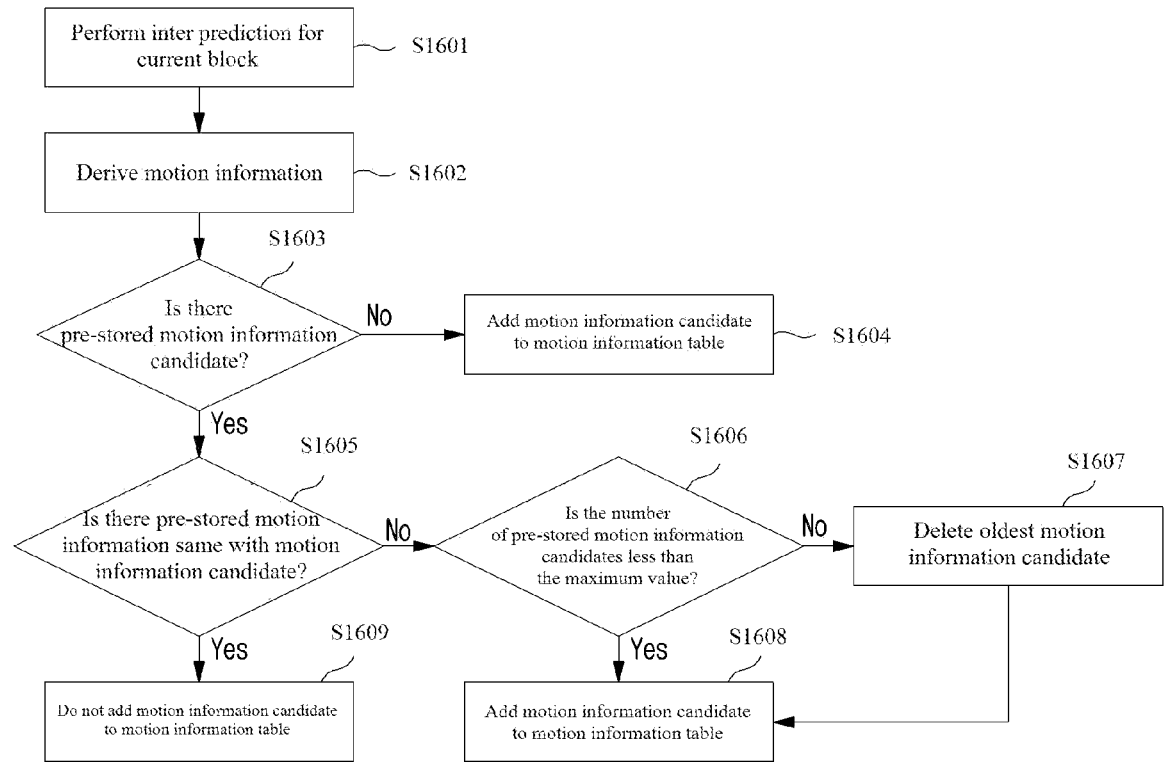
[FIG. 17]
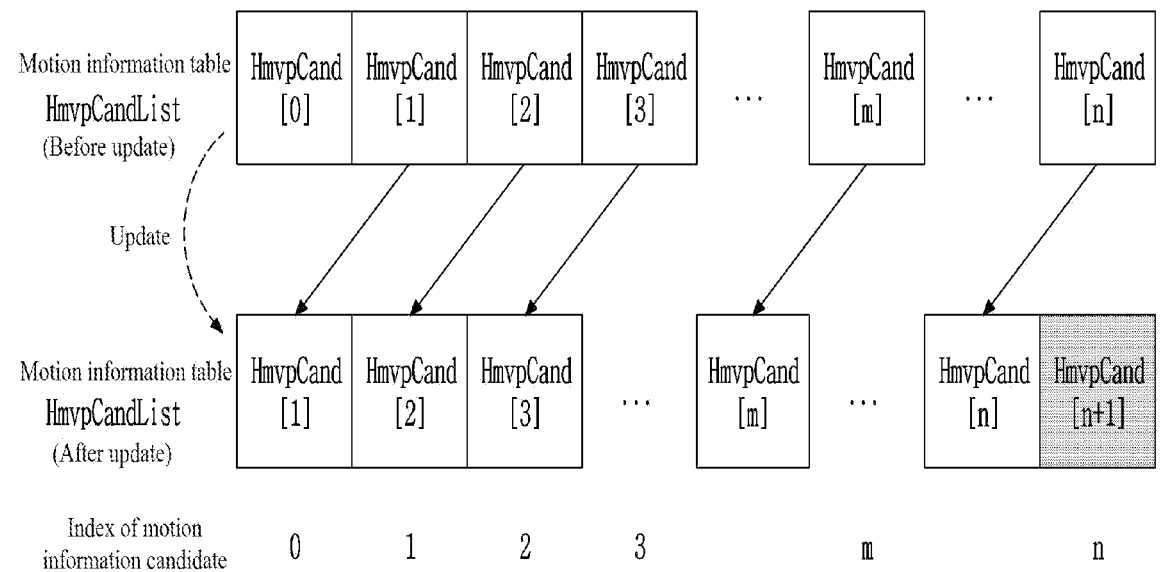

[FIG. 18]
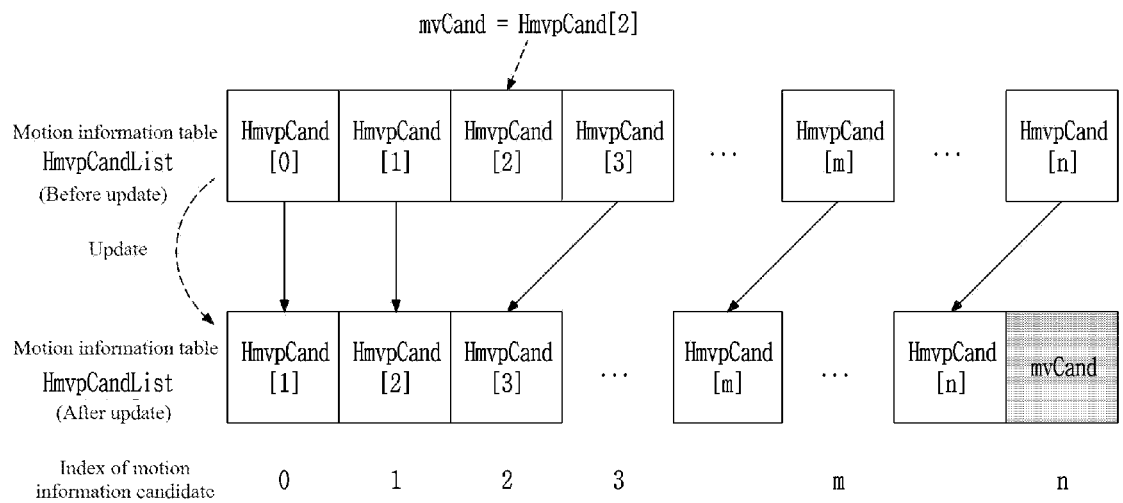
[FIG. 19]
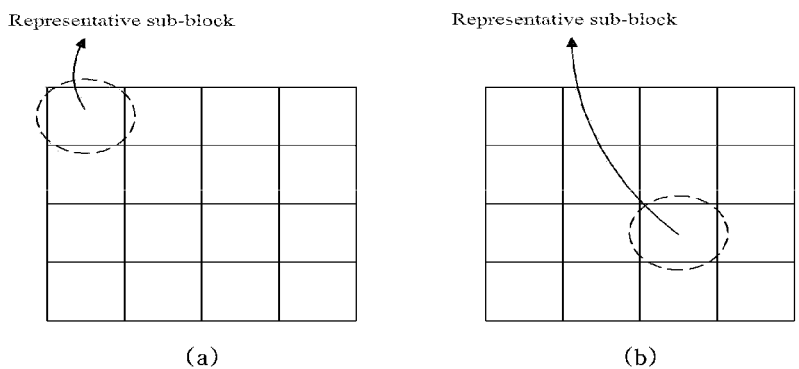
[FIG. 20]
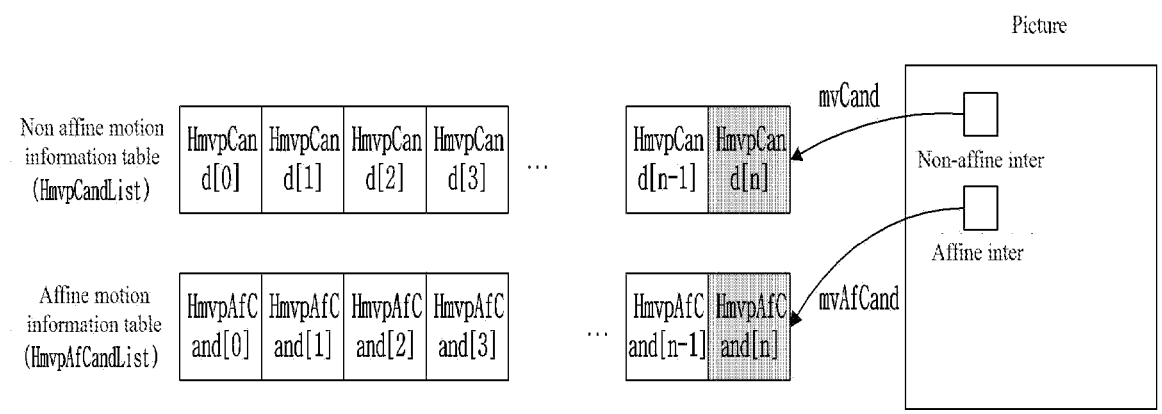

[FIG. 21]
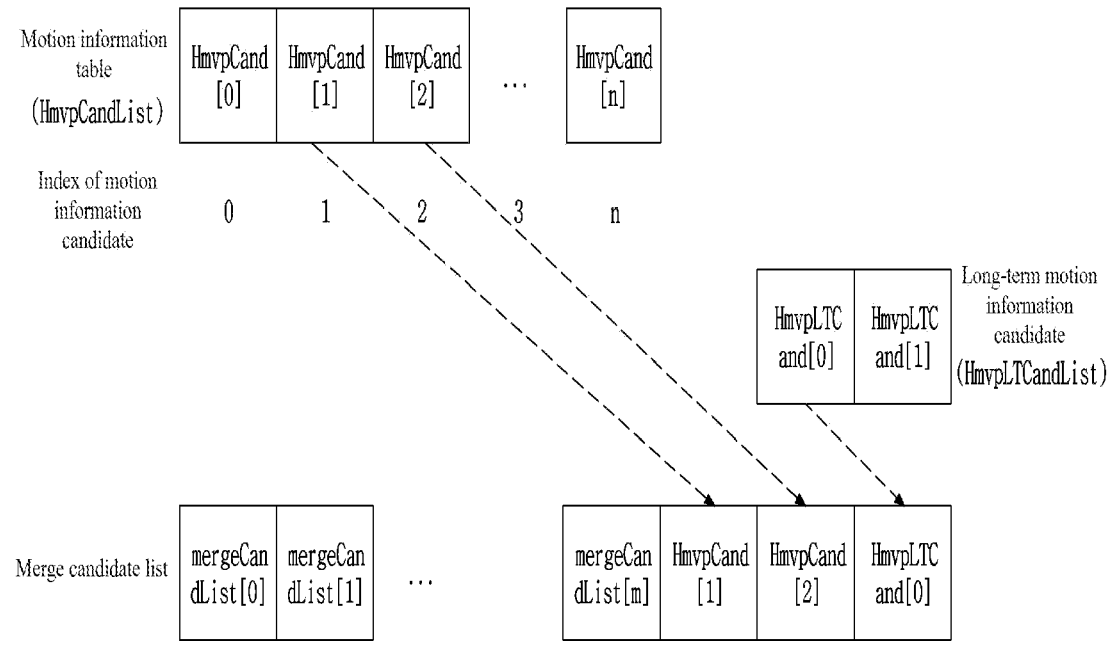
[FIG. 22]
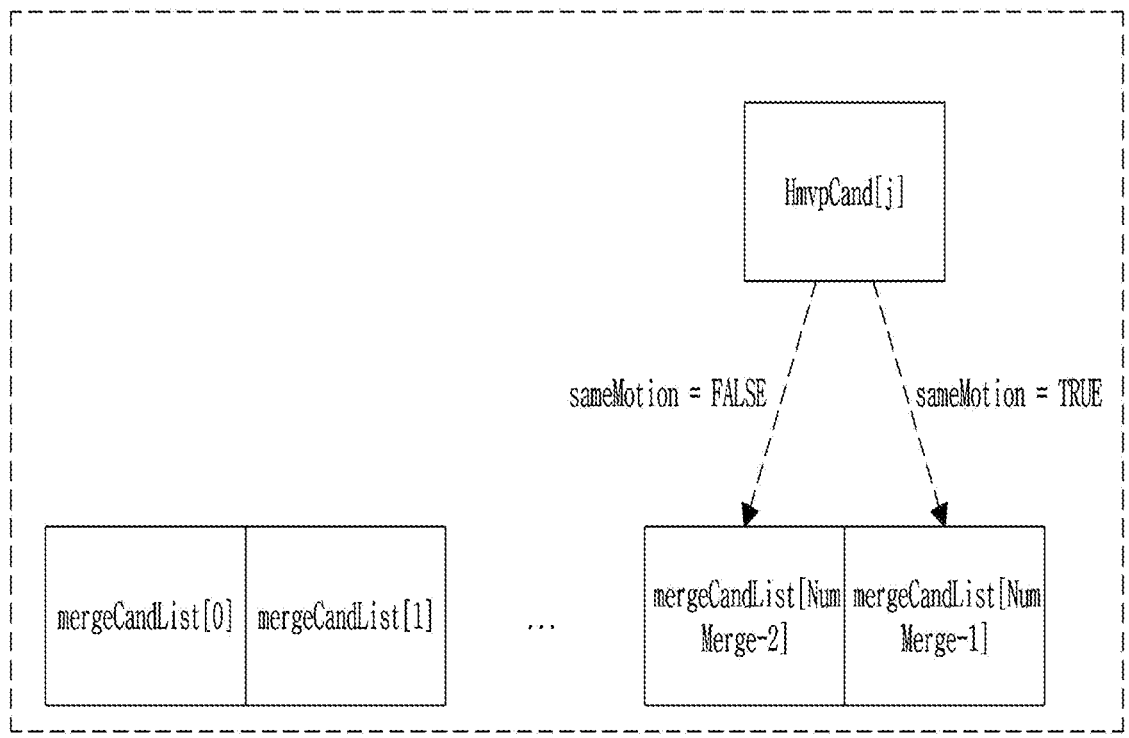

[FIG. 23]
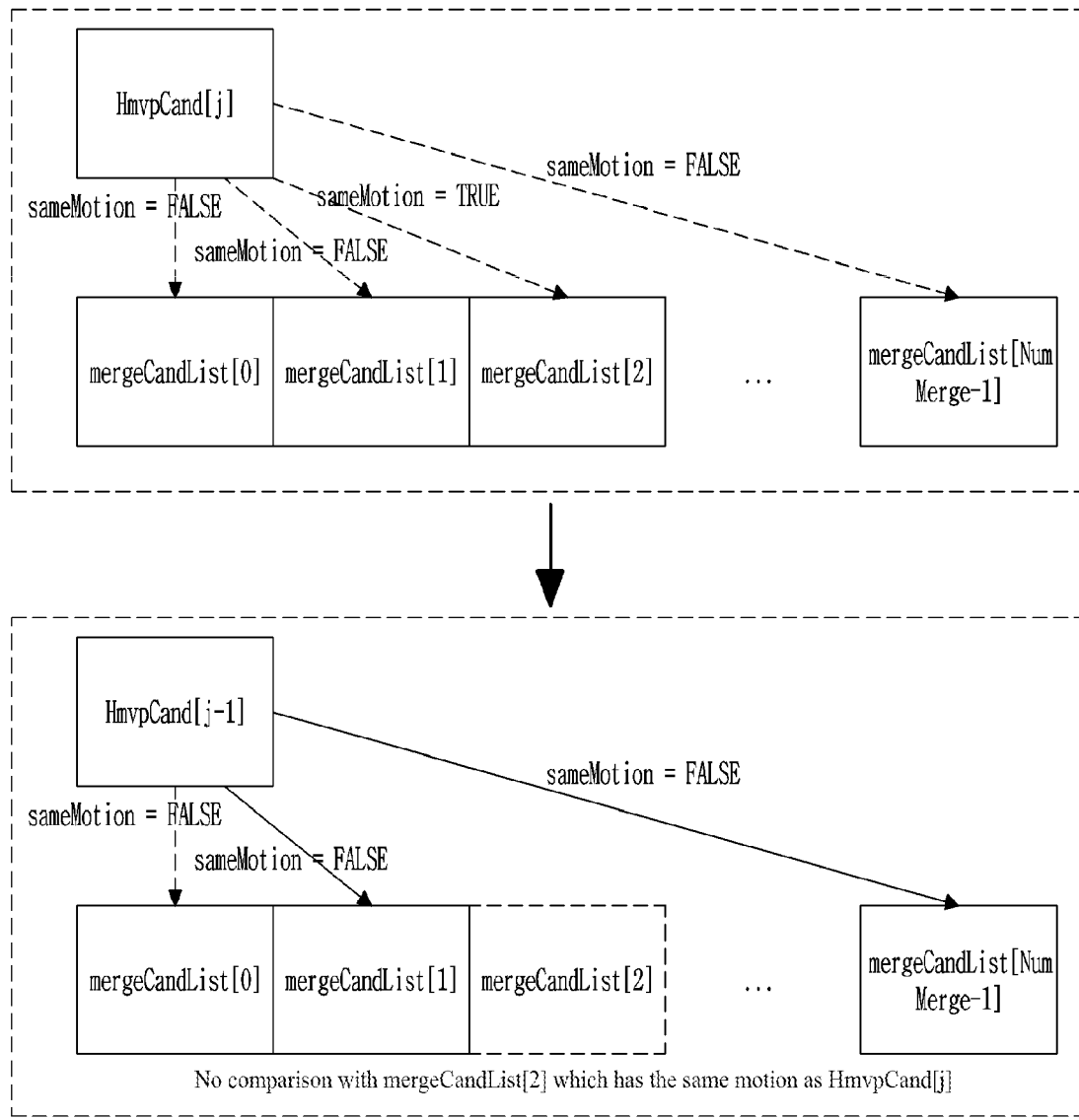
[FIG. 24]
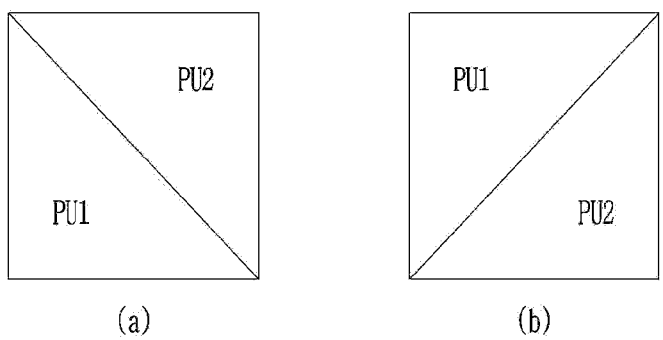
(a)          (b)

[FIG. 25]
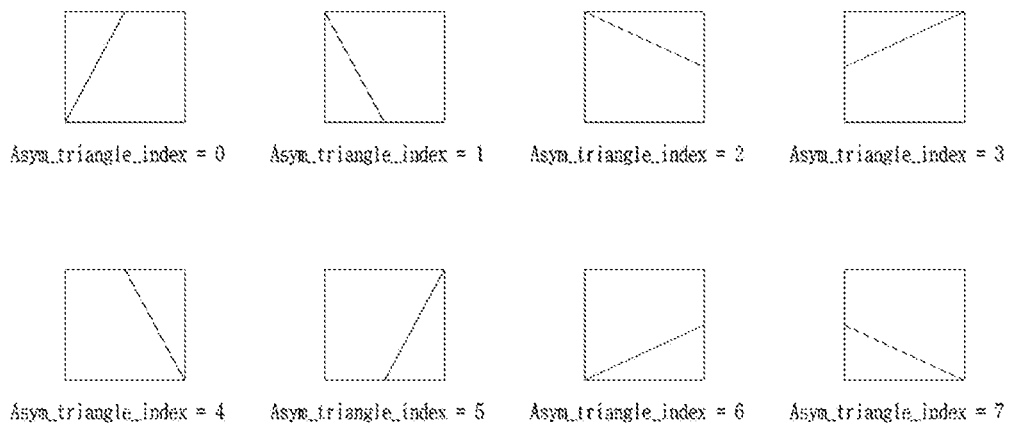
[FIG. 26]
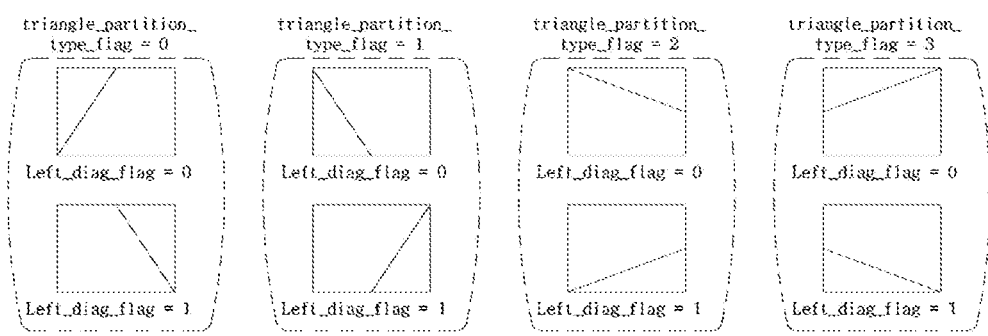
[FIG. 27]
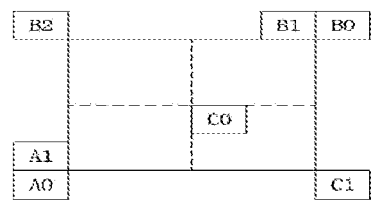
[FIG. 28]
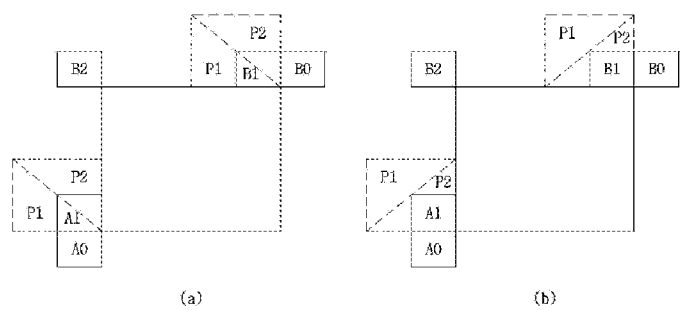

[FIG. 29]
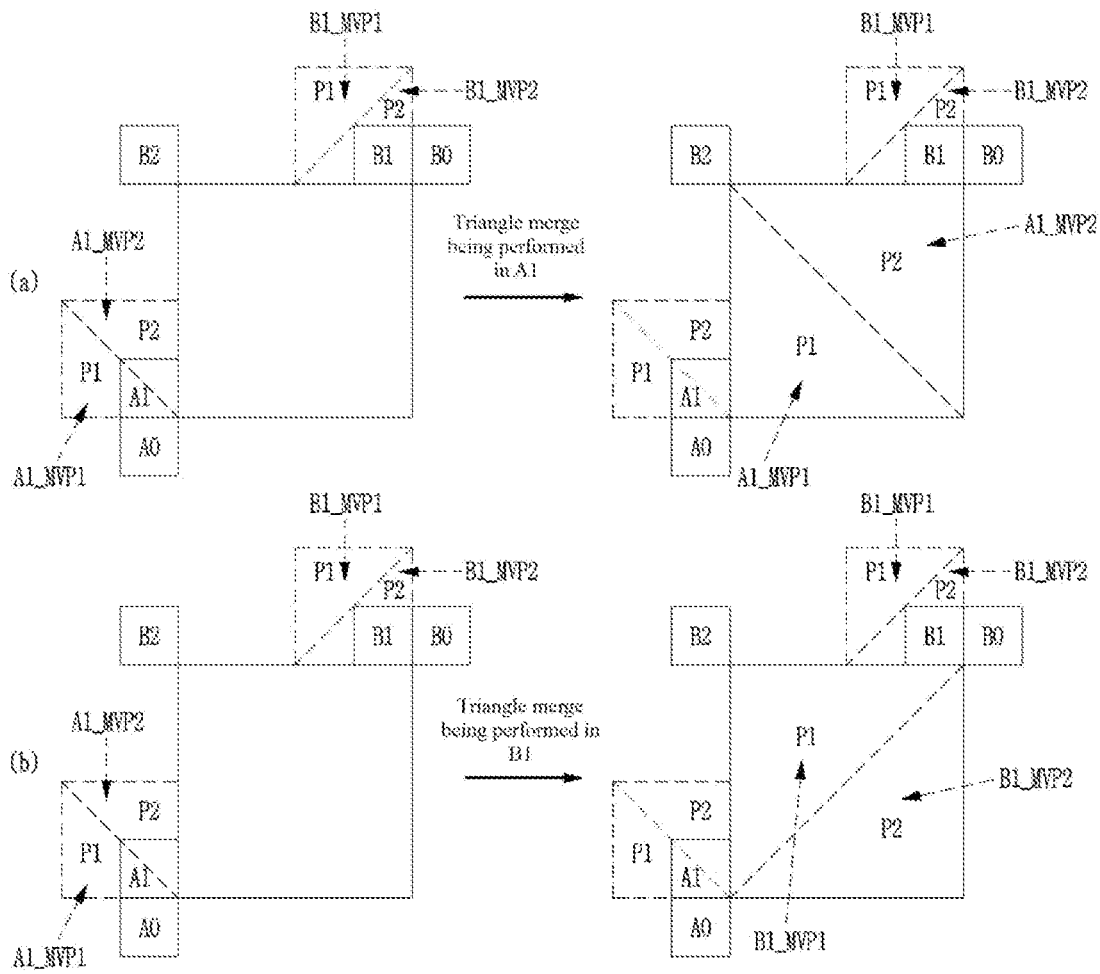
[FIG. 30]
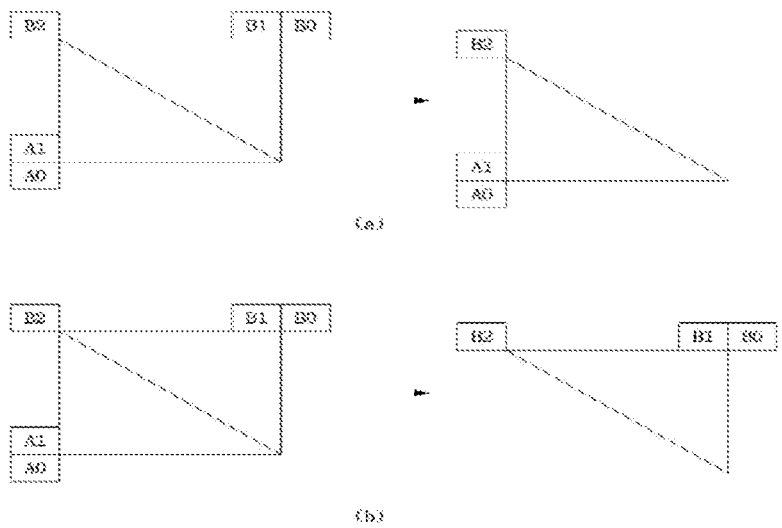

[FIG. 31]
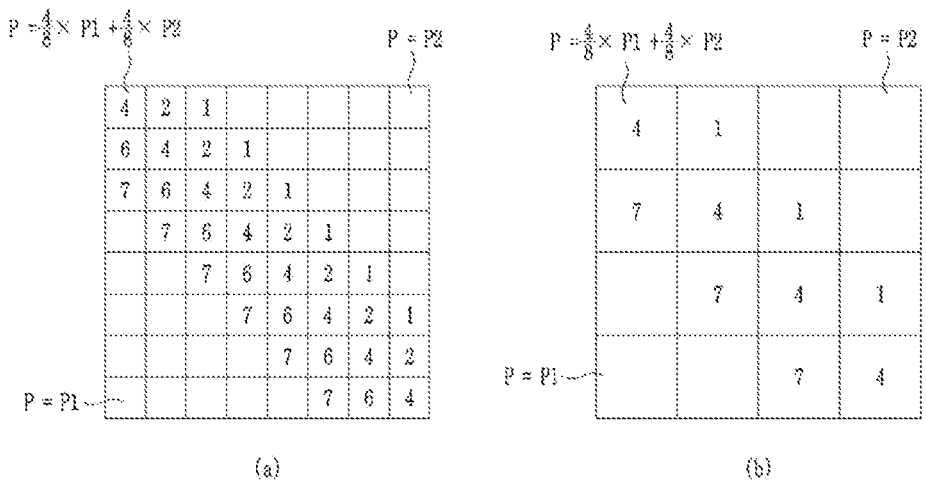
(a)          (b)
[FIG. 32]
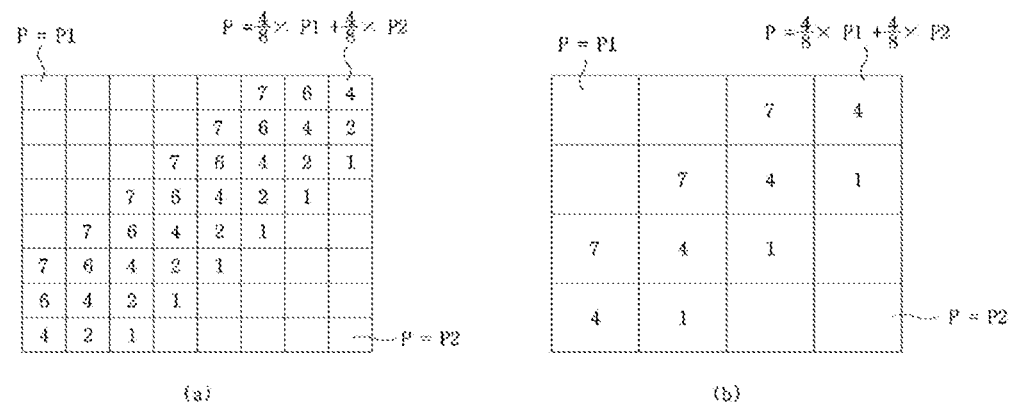
(a)          (b)
[FIG. 33]
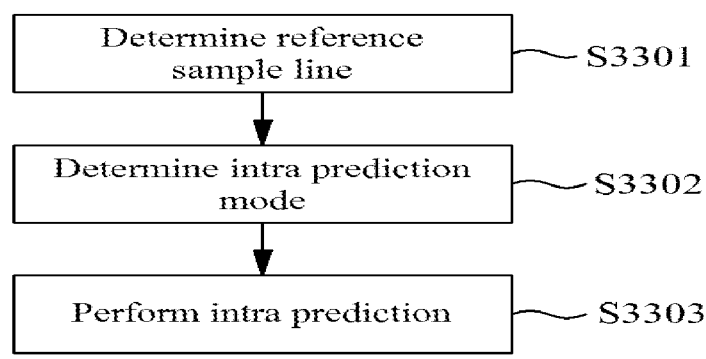

[FIG. 34]
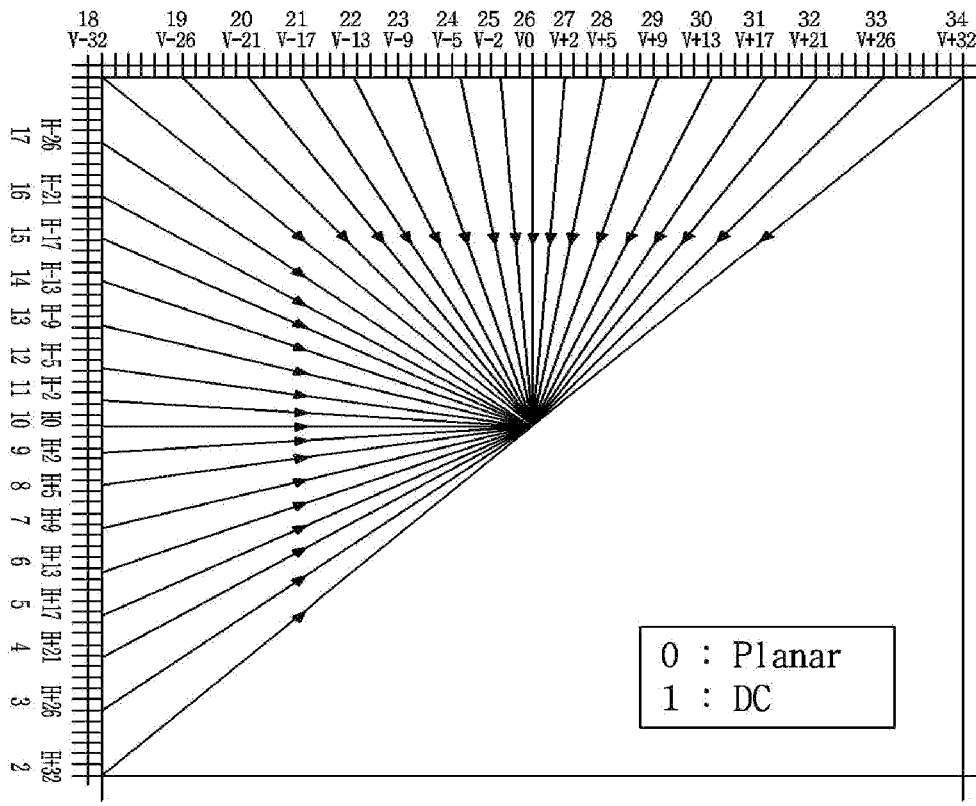
(a)
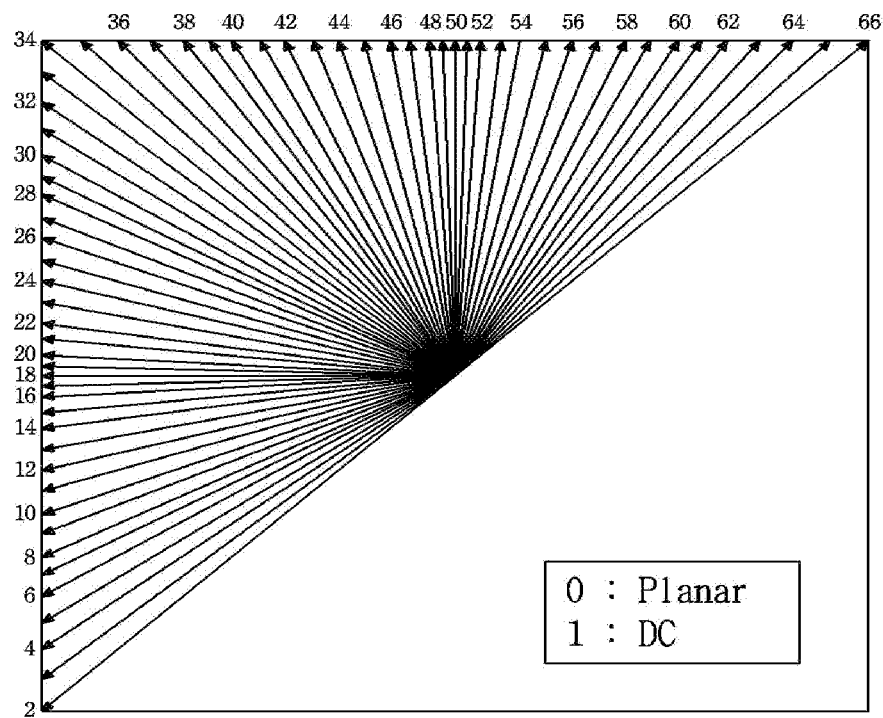
(b)

[FIG. 35]
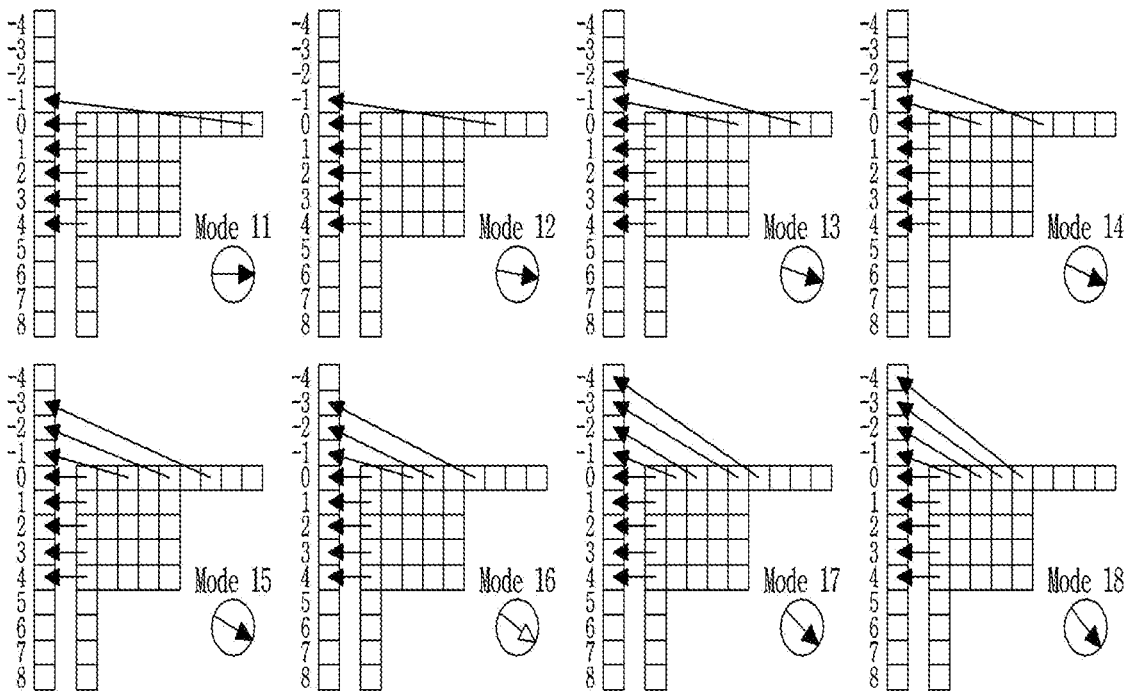
[FIG. 36]
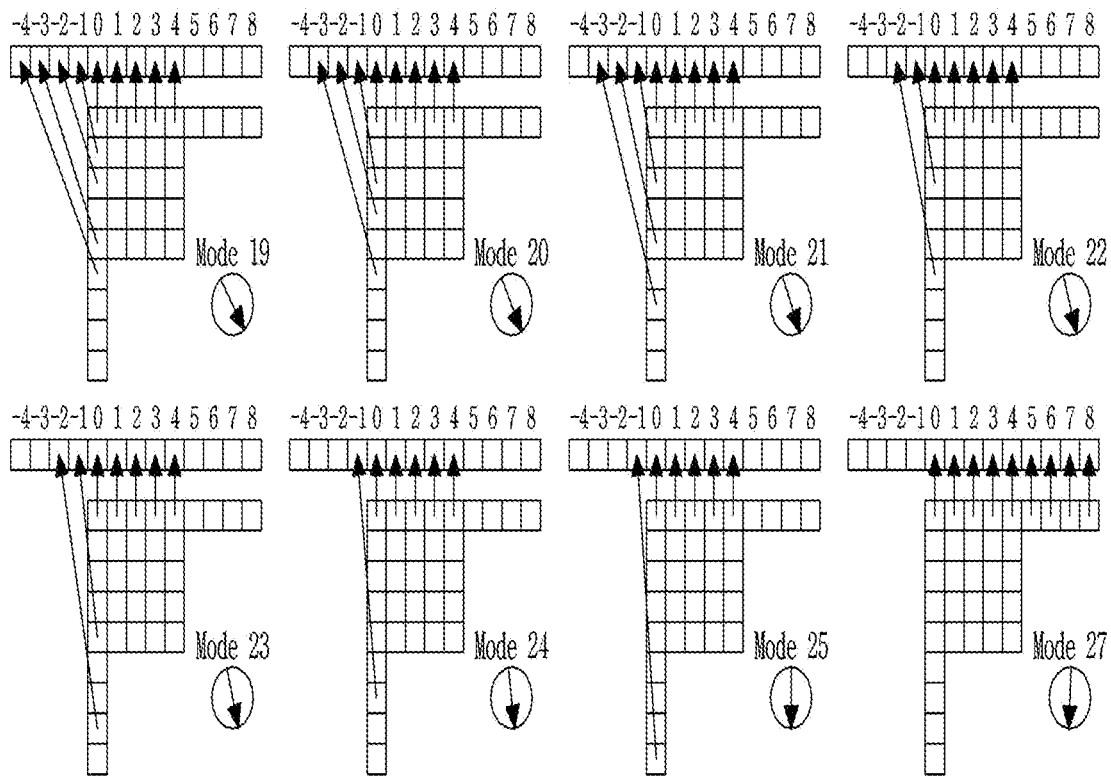

[FIG. 37]
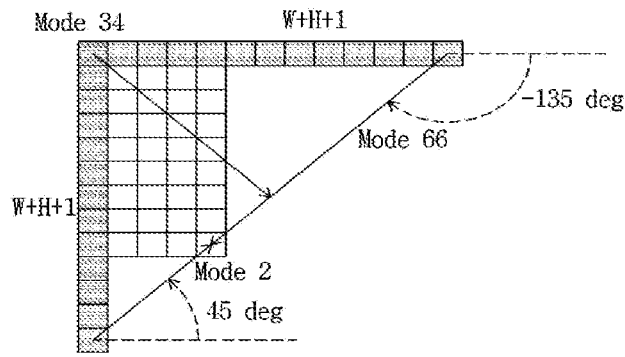
[FIG. 38]
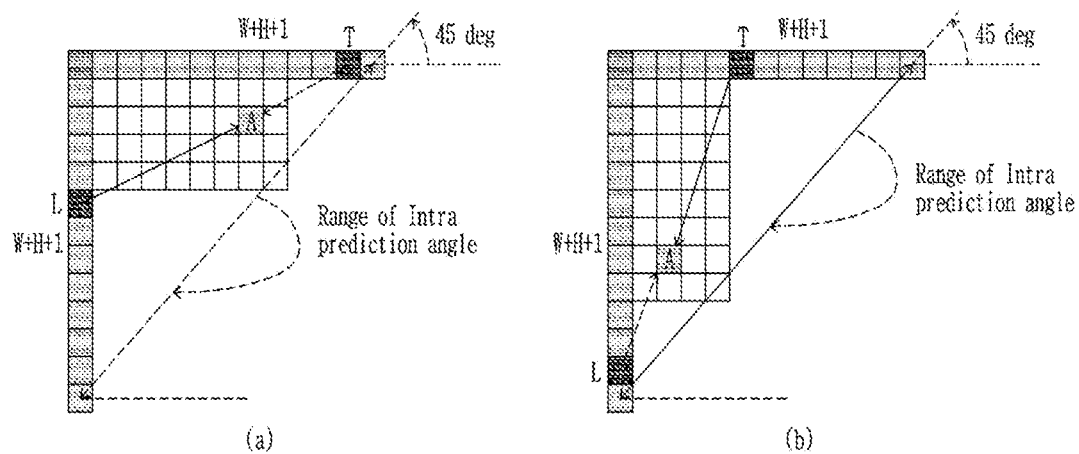
(a)　　　　　　　　　(b)
[FIG. 39]
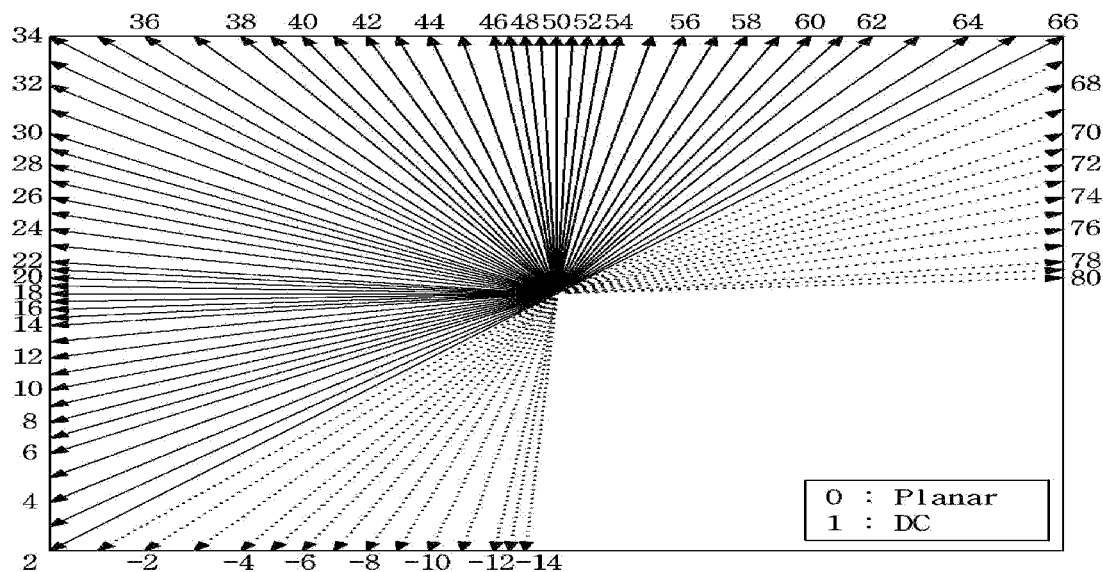

METHOD FOR ENCODING/DECODING IMAGE SIGNAL, AND DEVICE THEREFOR

This application claims the benefit under 35 U.S.C. section 371, of PCT International Application No.: PCT/KR2020/003390, filed on Mar. 11, 2020, which claims foreign priority to Korean Patent Application No.: 10-2019-0027608, filed on Mar. 11, 2019, and Korean Patent Application No.: 10-2019-0046344, filed on Apr. 19, 2019, in the Korean Intellectual Property Office, the disclosures of which are hereby incorporated by reference in their entireties.

FIELD OF THE DISCLOSURE

The present disclosure relates to a video signal encoding/decoding method and a device therefor.

DESCRIPTION OF THE RELATED ART

As display panels become larger, video service of higher quality is required. The biggest problem with high-definition video service is that an amount of data is greatly increased. In order to solve the above problem, research for improving the video compression rate is being actively conducted. As a representative example, the Joint Collaborative Team on Video Coding (JCT-VC) was formed in 2009 by the Motion Picture Experts Group (MPEG) and the Video Coding Experts Group (VCEG) under the International Telecommunication Union-Telecommunication (ITU-T). The JCT-VC proposed High Efficiency Video Coding (HEVC), a video compression standard that has about twice compression performance of H.264/AVC, and that was approved as standard on Jan. 25, 2013. However, with rapid development of high-definition video services, the performance of HEVC is gradually showing its limitations.

DISCLOSURE

Technical Purpose

A purpose of the present disclosure is to provide a method of partitioning a coding block into a plurality of prediction units and a device for performing the method in encoding/decoding a video signal.

A purpose of the present disclosure is to provide a method of deriving motion information of each of a plurality of prediction units and a device for performing the method in encoding/decoding a video signal.

A purpose of the present disclosure is to provide a method of extracting unidirectional motion information from a merge candidate having bidirectional motion information and a device for performing the method in encoding/decoding a video signal.

A purpose of the present disclosure is to provide a method of performing prediction by combining a plurality of prediction methods and a device for performing the method in encoding/decoding a video signal.

Technical purposes obtainable from the present disclosure are non-limited to the above-mentioned technical purposes, and other unmentioned technical purposes may be clearly understood from the following description by those having ordinary skill in the technical field to which the present disclosure pertains.

Technical Solution

A video signal decoding method according to the present disclosure may include determining a partitioning type of a coding block, partitioning the coding block into a first prediction unit and a second prediction unit based on the determined partitioning type, deriving motion information of each of the first prediction unit and the second prediction unit and obtaining a prediction sample for the first prediction unit and the second prediction unit based on the derived motion information. In this case, motion information of the first prediction unit may be derived from a first merge candidate specified by a first merge index signaled in a bitstream and motion information of the second prediction unit may be derived from a second merge candidate specified by a second merge index signaled in the bitstream.

A video signal encoding method according to the present disclosure may include determining a partitioning type of a coding block, partitioning the coding block into a first prediction unit and a second prediction unit based on the determined partitioning type, deriving motion information of each of the first prediction unit and the second prediction unit and obtaining a prediction sample for the first prediction unit and the second prediction unit based on the derived motion information. In this case, a first merge index for specifying a first merge candidate used to derive motion information of the first prediction unit and a second merge index for specifying a second merge candidate used to derive motion information of the second prediction unit may be encoded, respectively.

In a video signal encoding/decoding method according to the present disclosure, when the second merge index is the same as or greater than the first merge index, the second merge candidate may have an index with a value adding 1 to the second merge index.

In a video signal encoding/decoding method according to the present disclosure, when the second merge index is smaller than the first merge index, the second merge candidate may have an index with a value indicated by the second merge index.

In a video signal encoding/decoding method according to the present disclosure, when the first merge candidate has bidirectional motion information, one of L0 motion information or L1 motion information of the first merge candidate may be derived as motion information of the first prediction unit.

In a video signal encoding/decoding method according to the present disclosure, whether the L0 motion information or the L1 motion information is used as motion information of the first prediction unit may be determined based on whether an index of the first merge candidate is an even number or an odd number.

In a video signal encoding/decoding method according to the present disclosure, the partitioning type may be determined by index information specifying one of a plurality of partitioning type candidates and the plurality of partitioning type candidates may include a symmetric partitioning type that a size of the first prediction unit and a size of the second prediction unit are the same and an asymmetric partitioning type that a size of the first prediction unit is different from a size of the second prediction unit.

In a video signal encoding/decoding method according to the present disclosure, when the asymmetric partitioning type is selected, the coding block is partitioned by a partitioning line that any one of a start point or an end point passes a corner of the coding block and the other does not pass a corner of the coding block.

It is to be understood that the foregoing summarized features are exemplary aspects of the following detailed description of the present disclosure without limiting the scope of the present disclosure.

Technical Effect

According to the present disclosure, inter prediction efficiency may be improved by partitioning a coding block into a plurality of prediction units.

According to the present disclosure, inter prediction efficiency may be improved by deriving motion information of each of a plurality of prediction units by using a different merge candidate.

According to the present disclosure, inter prediction efficiency may be improved by extracting unidirectional motion information from a merge candidate having bidirectional motion information.

According to the present disclosure, prediction efficiency may be improved by combining a plurality of prediction methods.

Effects obtainable from the present disclosure may be non-limited by the above-mentioned effect, and other unmentioned effects may be clearly understood from the following description by those having ordinary skill in the technical field to which the present disclosure pertains.

BRIEF DESCRIPTION OF THE DRAWINGS

FIG. 1 is a view showing a block diagram of a video encoding device (encoder) according to an embodiment of the present disclosure;

FIG. 2 is a view showing a block diagram of a video decoding device (decoder) according to an embodiment of the present disclosure;

FIG. 3 is a view showing a basic coding tree unit according to an embodiment of the present disclosure;

FIG. 4 is a view showing various partitioning types of a coding block;

FIG. 5 is a view of an example showing an aspect of partitioning a CTU;

FIG. 6 is a diagram showing a shape of a data basic unit.

FIGS. 7 and 8 are a diagram showing an example in which a coding block is partitioned into a plurality of sub-blocks.

FIG. 9 is a flow diagram of an inter prediction method according to an embodiment of the present disclosure;

FIG. 10 is a diagram illustrating a nonlinear motion of an object.

FIG. 11 is a flow diagram of an inter prediction method based on an affine motion according to an embodiment of the present disclosure.

FIG. 12 is a diagram illustrating an affine seed vector per affine motion model.

FIG. 13 is a diagram illustrating affine vectors of sub-blocks under a 4-parameter motion model.

FIG. 14 is a flow diagram of a process deriving the current block motion information under a merge mode;

FIG. 15 is a diagram of illustrating candidate blocks used to derive a merge candidate;

FIG. 16 is a diagram to explain the update aspect of a motion information table;

FIG. 17 is a diagram showing the update aspect of a motion information table;

FIG. 18 is a diagram showing an example in which the index of a pre-saved motion information candidate is renewed;

FIG. 19 is a diagram showing the position of a representative sub-block;

FIG. 20 shows an example in which a motion information table is generated per inter-prediction mode;

FIG. 21 is a diagram showing an example in which a motion information candidate included in a long-term motion information table is added to a merge candidate list;

FIG. 22 is a diagram showing an example in which a redundancy check is performed only for a part of merge candidates;

FIG. 23 is a diagram showing an example in which a redundancy check with a specific merge candidate is omitted;

FIG. 24 is a diagram showing a partitioning aspect of a coding block to which symmetric partitioning is applied.

FIG. 25 is a diagram showing a partitioning aspect of a coding block to which asymmetric partitioning is applied.

FIG. 26 is a diagram showing a partitioning aspect of a coding block according to a syntax value.

FIG. 27 is a diagram showing neighboring blocks used to derive a partitioning mode merge candidate;

FIG. 28 is a diagram for describing an example in which a partitioning merge candidate is derived from a neighboring block encoded by diagonal partitioning.

FIG. 29 is a diagram showing an example in which partitioning direction and motion information of a neighboring block is applied to a coding block.

FIG. 30 is a diagram for explaining an example in which the availability of a neighboring block is determined per prediction unit;

FIGS. 31 and 32 are diagrams showing an example in which a prediction sample is derived based on a weighted sum operation of the first prediction sample and the second prediction sample;

FIG. 33 is a flow diagram of an intra prediction method according to an embodiment of the present disclosure.

FIG. 34 is a diagram showing intra prediction modes.

FIGS. 35 and 36 are diagrams showing an example of a one-dimensional array which arranges reference samples in a line.

FIG. 37 is a diagram illustrating an angle formed by directional intra prediction modes with a straight line parallel to an x-axis.

FIG. 38 is a diagram showing an aspect in which a prediction sample is obtained when a current block has a non-square shape.

FIG. 39 is a diagram showing wide-angle intra prediction modes.

DETAILED DESCRIPTION OF THE DISCLOSURE

Hereinafter, embodiments of the present disclosure will be described in detail with reference to the accompanying drawings.

Image encoding and decoding is performed on a basis of a block. In an example, for a coding block, a transform block, or a prediction block, encoding/decoding processes such as transform, quantization, prediction, in-loop filtering, reconstruction, etc. may be performed.

Hereinafter, an encoding/decoding target block is referred to as a "current block". In an example, a current block may represent a coding block, a transform block, or a prediction block according to a current process of encoding/decoding.

In addition, the term "unit" used in the present specification represents a basis unit for performing a specific encoding/decoding process, and a "block" may be understood to represent a sample array having a predetermined size. Unless otherwise stated, "block" and "unit" may be used interchangeably. In an example, in examples described later, a coding block and a coding unit may be understood to have the same meaning as each other.

FIG. 1 is view showing a block diagram of an image encoding apparatus (encoder) according to an embodiment of the present disclosure.

Referring to FIG. 1, an image encoding apparatus 100 may include a picture partitioning unit 110, prediction units 120 and 125, a transform unit 130, a quantization unit 135, a rearrangement unit 160, an entropy encoding unit 165, a dequantization unit 140, an inverse-transform unit 145, a filter unit 150, and a memory 155.

Components described in FIG. 1 are independently illustrated in order to show different characteristic functions in an image encoding apparatus, and the figure does not mean that each component is constituted by separated hardware or one software unit. That is, each component is just enumerated for convenience of explanation, at least two components of respective components may constitute one component or one component may be partitioned into a plurality of components which may perform their functions. Even an embodiment of integrating respective components and embodiment of dividing a component are also included in the scope of the present disclosure unless they are departing from the spirit of the present disclosure.

Further, some components are not requisite components that perform essential functions of the present disclosure but are optional components for just improving performance. The present disclosure may be implemented with the requisite component for implementing the spirit of the present disclosure other than the component used to just improve the performance and a structure including only the requisite component other than the optional component used to just improve the performance is also included in the scope of the present disclosure.

The picture partitioning unit 110 may partition an input picture into at least one processing unit. In this connection, the processing unit may be a prediction unit (PU), a transform unit (TU), or a coding unit (CU). In the picture partitioning unit 110, a single picture may be partitioned into combinations of a plurality of coding units, prediction units, and transform units, and the picture may be encoded by selecting a combination of the coding units, the prediction units, and the transform units according to a predetermined condition (for example, cost function).

For example, a single picture may be partitioned into a plurality of coding units. In order to partition a picture into coding units, a recursive tree structure such as a quad-tree structure may be used, and a coding unit that is originated from a root such as a single image or largest coding unit may be partitioned into other coding units and may have child nodes as many as the partitioned coding units. A coding unit that is no longer partitioned according to certain restrictions becomes a leaf node. Namely, when it is assumed that only square partitioning is available for a single coding unit, a single coding unit may be partitioned into at most four other coding units.

Hereinafter, in the embodiment of the present disclosure, a coding unit may be used as a unit for encoding or may be used as a unit for decoding.

A prediction unit may be obtained by partitioning a single coding unit into at least one square or rectangle having the same size, or a single coding unit may be partitioned into prediction units in such a manner that one prediction unit may be different from another prediction unit in a shape and/or size.

In generation of a prediction unit based on a coding block to which intra-prediction is being performed, when the coding unit is not the smallest coding unit, intra-prediction may be performed without performing partitioning into a plurality of N×N prediction units.

The prediction units 120 and 125 may include an inter-prediction unit 120 performing inter-prediction and an intra prediction unit 125 performing intra-prediction. Whether to perform inter-prediction or intra-prediction on a prediction unit may be determined, and detailed information (for example, an intra-prediction mode, a motion vector, a reference picture, etc.) according to each prediction method may be determined. In this connection, a processing unit on which prediction is performed may differ with a processing unit for which a prediction method, and detail thereof are determined. For example, a prediction method, a prediction mode, etc. may be determined on the basis of a prediction unit, and prediction may be performed on the basis of a transform unit. A residual value (residual block) between the generated prediction block and an original block may be input to the transform unit 130. In addition, prediction mode information used for prediction, motion vector information, etc. may be encoded using a residual value by the entropy encoding unit 165 and may be transmitted to the decoder. When a specific encoding mode is used, an original block is encoded as it is and transmitted to a decoding unit without generating a prediction block through the prediction unit 120 or 125.

The inter-prediction unit 120 may predict a prediction unit on the basis of information on at least one of a previous picture and a subsequent picture of a current picture, or in some cases, may predict a prediction unit on the basis of information on some encoded regions in the current picture. The inter-prediction unit 120 may include a reference picture interpolation unit, a motion prediction unit, and a motion compensation unit.

The reference picture interpolation unit may receive reference picture information from the memory 155, and generate pixel information of a pixel at an integer or less from the reference picture. In case of a luma pixel, an 8-tap DCT-based interpolation filter having different coefficients may be used so as to generate pixel information on a pixel at an integer or less for a ¼ pixel unit. In case of a chroma signal, a 4-tap DCT-based interpolation filter having different filter coefficients may be used so as to generate pixel information on a pixel at an integer or less for a ⅛ pixel unit.

The motion prediction unit may perform motion prediction based on a reference picture interpolated by the reference picture interpolation unit. As methods for calculating a motion vector, various methods, such as a full search-based block matching algorithm (FBMA), a three step search (TSS) algorithm, a new three-step search (NTS) algorithm, etc. may be used. A motion vector may have a motion vector value in a unit of ½ or ¼ pixel on the basis of the interpolated pixel. The motion prediction unit may predict a current prediction unit by varying a motion prediction method. As motion prediction methods, various methods, such as a skip method, a merge method, an advanced motion vector prediction (AMVP) method, an intra block copy method, etc. may be used.

The intra-prediction unit 125 may generate a prediction unit on the basis of information on a reference pixel around a current block, which is pixel information in a current picture. When a neighboring block of a current prediction unit is a block for which inter-prediction is performed, and thus a reference pixel is a pixel for which inter-prediction is performed, a reference pixel included in the block for which inter-prediction is performed may be replaced by information on a reference pixel of a neighboring block for which intra-prediction is performed. In other words, when a reference pixel is unavailable, at least one reference pixel of available reference pixels may be used in place of unavailable reference pixel information.

A prediction mode in intra-prediction may include a directional prediction mode using reference pixel information according to a prediction direction and a non-directional mode not using directional information when performing prediction. A mode for predicting luma information may be different from a mode for predicting chroma information. In order to predict the chroma information, information on an intra-prediction mode used for predicting the luma information or information on a predicted luma signal may be used.

In performing intra-prediction, when a prediction unit is identical in a size with a transform unit, intra-prediction may be performed on the prediction unit on the basis of pixels positioned at the left, the top-left, and the top of the prediction unit. However, in performing intra-prediction, when a prediction unit is different in a size with a transform unit, intra-prediction may be performed by using a reference pixel based on the transform unit. In addition, intra-prediction using N×N partitioning may be only used for the smallest coding unit.

In an intra-prediction method, a prediction block may be generated after applying an adaptive intra smoothing (AIS) filter to a reference pixel according to a prediction mode. A type of AIS filter applied to a reference pixel may vary. In order to perform an intra-prediction method, an intra prediction mode for a current prediction unit may be predicted from an intra-prediction mode of a prediction unit present around the current prediction unit. In predicting a prediction mode for a current prediction unit by using mode information predicted from a neighboring prediction unit, when an intra prediction mode for the current prediction unit is identical to an intra prediction mode of the neighboring prediction unit, information indicating that the current prediction unit and the neighboring prediction unit have the same prediction mode may be transmitted by using predetermined flag information. When a prediction mode for the current prediction unit is different from prediction modes of the neighboring prediction units, entropy encoding may be performed to encode information on a prediction mode for a current block.

In addition, a residual block may be generated which includes information on a residual value that is a difference value between a prediction unit for which prediction is performed on by the prediction unit 120 or 125, and an original block of the prediction unit. The generated residual block may be input to the transform unit 130.

The transform unit 130 may perform transform on a residual block, which includes information on a residual value between an original block and a prediction unit generated by the prediction unit 120 or 125, by using a transform method such as discrete cosine transform (DCT) or discrete sine transform (DST). In this connection, a DCT transform core includes at least one of DCT2 or DCT8 and a DST transform core includes DST7. Whether to apply DCT, or DST so as to perform transform on a residual block may be determined on the basis of information on an intra-prediction mode of a prediction unit which is used to generate the residual block. It is possible to skip a transform for a residual block. A flag indicating whether or not to skip a transform for a residual block may be encoded. A transform skip may be allowed for a residual block whose a size is smaller than or equal to a threshold value, a residual block of a luma component, or a residual block of a chroma component under 4:4:4 format.

The quantization unit 135 may perform quantization on values transformed into a frequency domain by the transform unit 130. A quantization coefficient may vary according to a block or importance of an image. Values calculated in the quantization unit 135 may be provided to the dequantization unit 140 and the rearrangement unit 160.

The rearrangement unit 160 may perform rearrangement on coefficient values with respect to quantized residual values.

The rearrangement unit 160 may change coefficients in the form of a two-dimensional block into coefficients in the form of a one-dimensional vector through a coefficient scanning method. For example, the rearrangement unit 160 may scan from a DC coefficient to a coefficient in a high frequency domain by using a zigzag scanning method so as to change the coefficients into the form of a one-dimensional vector. According to a size and an intra prediction mode of a transform unit, rather than zigzag scanning, vertical directional scanning where coefficients in the form of a two-dimensional block are scanned in a column direction, or horizontal directional scanning where coefficients in the form of two-dimensional block are scanned in a row direction may be used. In other words, which scanning method among zigzag scanning, vertical directional scanning, and horizontal directional scanning is used may be determined according to a size and an intra prediction mode of a transform unit.

The entropy encoding unit 165 may perform entropy encoding on the basis of values calculated by the rearrangement unit 160. Entropy encoding may use various encoding methods, for example, exponential Golomb coding, context-adaptive variable length coding (CAVLC), or context-adaptive binary arithmetic coding (CABAL).

The entropy encoding unit 165 may encode various types of information, such as information on a residual value coefficient and information on a block type of a coding unit, information on a prediction mode, information on a partitioning unit, information on a prediction unit, information on a partitioning unit, information on a prediction unit and information on a transmission unit, information on a motion vector, information on a reference frame, information on a block interpolation, filtering information, etc. obtained from the rearrangement unit 160 and the prediction units 120 and 125.

The entropy encoding unit 165 may entropy encode coefficients of a coding unit input from the rearrangement unit 160.

The dequantization unit 140 may perform dequantization on values quantized in the quantization unit 135, and the inverse-transform unit 145 may perform inverse-transform on values transformed in the transform unit 130. A residual value generated by the dequantization unit 140 and the inverse-transform unit 145 may be added with a prediction unit predicted by a motion estimation unit, a motion compensation unit, or the intra-prediction unit which are included in the prediction units 120 and 125 so as to generate a reconstructed block.

The filter unit 150 may include at least one of a deblocking filter, an offset correction unit, and an adaptive loop filter (ALF).

The deblocking filter may remove block distortion that occurs due to boundaries between blocks in a reconstructed picture. In order to determine whether or not to perform deblocking, whether or not to apply a deblocking filter to a current block may be determined on the basis of pixels included in several rows and columns included in a block. When a deblocking filter is applied to a block, a strong filter or a weak filter is applied according to required deblocking filtering strength. In addition, in applying a deblocking filter, when performing horizontal directional filtering and vertical directional filtering, horizontal directional filtering and vertical directional filtering may be configured to be processed in parallel.

The offset correction unit may correct an original image by an offset in a unit of a pixel with respect to an image for which deblocking is performed. In order to perform offset correction on a specific picture, a method of applying a offset to a region which is determined after partitioning pixels of the image into the predetermined number of regions, or a method of applying an offset according to edge information of each pixel may be used.

Adaptive loop filtering (ALF) may be performed on the basis of a value obtained by comparing a filtered reconstructed image with an original image. Pixels included in an image may be partitioned into predetermined groups, a filter to be applied to each of the groups may be determined, and filtering may be individually performed on each group. Information on whether or not to apply ALF and may be transmitted for each coding unit (CU) for a luma signal, and a shape and a filter coefficient of an ALF filter to be applied may vary on the basis of each block. Alternatively, an ALF filter having the same shape (fixed shape) may be applied regardless of a feature of a block to which the filter will be applied.

In the memory 155, a reconstructed block or picture calculated through the filter unit 150 may be stored. The stored reconstructed block or picture may be provided to the prediction unit 120 or 125 when performing inter-prediction.

FIG. 2 is view showing a block diagram of an image decoding apparatus (decoder) according to an embodiment of the present disclosure.

Referring to FIG. 2, an image decoding apparatus 200 may include: an entropy decoding unit 210, a rearrangement unit 215, a dequantization unit 220, an inverse-transform unit 225, prediction units 230 and 235, a filter unit 240, and a memory 245.

When an image bitstream is input from the encoder, the input bitstream may be decoded according to an inverse process of the image encoding apparatus.

The entropy decoding unit 210 may perform entropy decoding according to the inverse process of the entropy encoding by the entropy encoding unit of the image encoder. For example, in association with the methods performed by the image encoder apparatus, various methods, such as exponential Golomb coding, context-adaptive variable length coding (CAVLC), or context-adaptive binary arithmetic coding (CABAC) may be applied.

The entropy decoding unit 210 may decode information on intra-prediction and inter-prediction performed by the encoder.

The rearrangement unit 215 may perform rearrangement on the bitstream entropy decoded by the entropy decoding unit 210 on the basis of the rearrangement method used in the encoder. Coefficients represented in the form of a one-dimensional vector may be reconstructed and rearranged into coefficients in the form of a two-dimensional block. The rearrangement unit 215 may perform rearrangement through a method of receiving information related to coefficient scanning performed in the encoder and of inversely scanning on the basis of the scanning order performed in the encoder.

The dequantization unit 220 may perform dequantization on the basis of a quantization parameter received from the encoder and coefficient values of the rearranged block.

The inverse-transform unit 225 may perform, an inverse transform, that is inverse DCT or inverse DST, against to a transform, that is DCT or DST, performed on the quantization result by the transform unit in the image encoder. In this connection, a DCT transform core may include at least one of DCT2 or DCT8, and a DST transform core may include DST7. Alternatively, when the transform is skipped in the image encoder, the inverse-transform also not be performed in the inverse-transform unit 225. Inverse transform may be performed on the basis of a transmission unit determined by the image encoder. The inverse transform unit 225 of the image decoder may selectively perform a transform method (for example, DCT, or DST) according to multiple pieces of information, such as a prediction method, a size of a current block, a prediction direction, etc.

The prediction unit 230 or 235 may generate a prediction block on the basis of information related to a prediction block received from the entropy decoding unit 210 and information on a previously decoded block or picture received from the memory 245.

As described above, as the operation of the image encoder, in performing intra-prediction, when a prediction unit is identical in size with a transform unit, intra-prediction may be performed on the prediction unit on the basis of pixels positioned at the left, the top-left, and the top of the prediction unit. However, in performing intra-prediction, when a prediction unit is different in size with a transform unit, intra-prediction may be performed by using a reference pixel based on the transform unit. In addition, intra-prediction using N×N partitioning may be only used for the smallest coding unit.

The prediction units 230 and 235 may include a PU determination module, an inter-prediction unit, and an intra-prediction unit. The PU determination unit may receive various types of information, such as information on a prediction unit, information on a prediction mode of an intra-prediction method, information on a motion prediction of an inter-prediction method, etc. which are input from the entropy decoding unit 210, divide a prediction unit in a current coding unit, and determine whether inter-prediction or intra-prediction is performed on the prediction unit. By using information required in inter-prediction of a current prediction unit received from the image encoder, the inter-prediction unit 230 may perform inter-prediction on the current prediction unit on the basis of information on at least one of a previous picture and a subsequent picture of a current picture including the current prediction unit. Alternatively, inter-prediction may be performed on the basis of information on some pre-reconstructed regions in a current picture including the current prediction unit.

In order to perform inter-prediction, which method among a skip mode, a merge mode, an AMVP mode, or an intra block copy mode is used as a motion prediction method for a prediction unit included in a coding unit may be determined on the basis of the coding unit.

The intra prediction unit 235 may generate a prediction block on the basis of information on a pixel within a current picture. When a prediction unit is a prediction unit for which intra-prediction has been performed, intra-prediction may be performed on the basis of information on an intra-prediction mode of a prediction unit received from the image encoder. The intra prediction unit 235 may include an adaptive intra smoothing (AIS) filter, a reference pixel interpolation module, or a DC filter. The AIS filter may perform filtering on a reference pixel of a current block, and whether to apply the filter may be determined according to a prediction mode for a current prediction unit. A prediction mode of the prediction unit and information on an AIS filter which are received from the image encoder may be used when performing AIS filtering on a reference pixel of a current block. When a prediction mode for the current block is a mode to which AIS filtering is not applied, the AIS filter may not be applied.

When a prediction mode of a prediction unit is a prediction mode for which intra-prediction is performed on the basis of a pixel value obtained by interpolating reference pixels, the reference pixel interpolation unit may interpolate the reference pixels so as to generate a reference pixel having a unit of an integer or less. When a prediction mode for a current prediction unit is a prediction mode where a prediction block is generated without interpolating reference pixels, the reference pixels may not be interpolated. The DC filter may generate a prediction block through filtering when a prediction mode for a current block is a DC mode.

A reconstructed block or picture may be provided to the filter unit 240. The filter unit 240 may include a deblocking filter, an offset correction module, and an ALF.

Information on whether or not a deblocking filter has been applied to a corresponding block or picture and information on whether a strong filter or a weak filter is applied when the deblocking filter is applied may be received from the image encoder. The deblocking filter of the image decoder may receive information on a deblocking filter from the image encoder, and the image decoder may perform deblocking filtering on a corresponding block.

The offset correction unit may perform offset correction on a reconstructed image on the basis of a type of offset correction, information on an offset value, etc. applied to an image when performing encoding.

The ALF may be applied to a coding unit on the basis of information on whether or not to apply ALF, information on an ALF coefficient, etc. received from the encoder. The above ALF information may be provided by being included in a particular parameter set.

In the memory 245, a reconstructed picture or block may be stored so as to be used as a reference picture or reference block, and the reconstructed picture may be provided to an output unit.

FIG. 3 is a view showing a basic coding tree unit according to an embodiment of the present disclosure.

The largest coding block may be defined as a coding tree block. A single picture may be partitioned into a plurality of coding tree units (CTU). A CTU may be a coding unit of the largest size, and may be referred to as the largest coding unit (LCU). FIG. 3 is a view showing an example where a single picture is partitioned into a plurality of CTUs.

A size of a CTU may be defined in a picture level or sequence level. For the same, information representing a size of a CTU may be signaled through a picture parameter set or sequence parameter set.

In an example, a size of a CTU for the entire picture within a sequence may be set to 128×128. Alternatively, any one of 128×128 or 256×256 may be determined as a size of a CTU in a picture level. In an example, a CTU may be set to have a size of 128×128 in a first picture, and a size of 256×256 in a second picture.

Coding blocks may be generated by partitioning a CTU. A coding block represents a basic unit for performing encoding/decoding. In an example, prediction or transform may be performed for each coding block, or a prediction encoding mode may be determined for each coding block. In this connection, the prediction encoding mode represents a method of generating a prediction image. In an example, a prediction encoding mode may include intra-prediction, inter-prediction, current picture referencing (CPR), intra block copy (IBC) or combined prediction. For a coding block, a prediction block of the coding block may be generated by using a prediction encoding mode of at least one of intra-prediction, inter-prediction, current picture referencing, or combined prediction.

Information representing a prediction encoding mode for a current block may be signaled in a bitstream. In an example, the information may be a 1-bit flag representing whether a prediction encoding mode is an intra mode or an inter mode. When a prediction encoding mode for a current block is determined as an inter mode, current picture referencing or combined prediction may be available.

Current picture referencing is setting a current picture as a reference picture and obtaining a prediction block of a current block from a region that has been already encoded/decoded within a current picture. In this connection, the current picture means a picture including the current block. Information representing whether or not current picture referencing is applied to a current block may be signaled in a bitstream. In an example, the information may be a 1-bit flag. When the flag is TRUE, a prediction encoding mode for a current block may be determined as current picture referencing, and when the flag is FALSE, a prediction encoding mode for a current block may be determined as inter-prediction.

Alternatively, a prediction encoding mode for a current block may be determined on the basis of a reference picture index. In an example, when a reference picture index indicates a current picture, a prediction encoding mode for a current block may be determined as current picture referencing. When a reference picture index indicates a picture other than a current picture, a prediction encoding mode for a current block may be determined as inter-prediction. In other words, current picture referencing is a prediction method using information on a region that has been already encoded/decoded within a current picture, and inter-prediction is a prediction method using information on another picture that has been already encoded/decoded.

Combined prediction represents a combined encoding mode combining at least two of intra-prediction, inter-prediction, and current picture referencing. In an example, when combined prediction is applied, a first prediction block may be generated on the basis of any one of intra-prediction, inter-prediction or current picture referencing, and a second prediction block may be generated on the basis of another. When a first prediction block and a second prediction block are generated, a final prediction block may be generated by calculating an average or weighted sum of the first prediction block and the second prediction block. Information representing whether or not to apply combined prediction to a current block may be signaled in a bitstream. The information may be a 1-bit flag.

FIG. 4 is a view showing various partitioning types a coding block.

A coding block may be partitioned into a plurality of coding blocks on the basis of quad-tree partitioning, binary-tree partitioning or ternary tree partitioning. The partitioned coding block may be partitioned again into a plurality of coding blocks on the basis of quad-tree partitioning, binary-tree partitioning or ternary tree partitioning.

Quad-tree partitioning represents a method of partitioning a current block into four blocks. As a result of quad-tree partitioning, a current block may be partitioned into four square partitions (refer to "SPLIT_QT" of FIG. 4 (*a*)).

Binary-tree partitioning represents a method of partitioning a current block into two blocks. Partitioning a current block into two blocks along a vertical direction (that is, using a vertical line across the current block) may be referred to vertical directional binary-tree partitioning, and partitioning a current block into two blocks along a horizontal direction (that is, using a horizontal line across the current block) may be referred to as horizontal directional binary-tree partitioning. As a result of binary-tree partitioning, a current block may be partitioned into two non-square partitions. "SPLIT_BT_VER" of FIG. 4 (b) is a view showing a result of vertical directional binary-tree partitioning, and "SPLIT_BT_HOR" of FIG. 4 (c) is a view showing a result of horizontal directional binary-tree partitioning.

Ternary-tree partitioning represents a method of partitioning a current block into three blocks. Partitioning a current block into three blocks along a vertical direction (that is, using two vertical lines across the current block) may be referred to vertical directional ternary-tree partitioning, and partitioning a current block into three blocks along a horizontal direction (that is, using two horizontal lines across the current block) may be referred to as horizontal directional ternary-tree partitioning. As a result of ternary-tree partitioning, a current block may be partitioned into three non-square partitions. In this connection, a width/height of a partition positioned at the center of a current block may be twice than a width/height of other partitions. "SPLIT_TT_VER" of FIG. 4 (d) is a view showing a result of vertical directional ternary-tree partitioning, and "SPLIT_TT_HOR" of FIG. 4 (e) is a view showing a result of horizontal directional ternary-tree partitioning.

The number of partitioning times of a CTU may be defined as a partitioning depth. The maximum partitioning depth of a CTU may be determined in a sequence or picture level. Accordingly, the maximum partitioning depth of a CTU may vary on the basis of a sequence or picture.

Alternatively, the maximum partitioning depth may be independently determined for each partitioning method. In an example, the maximum partitioning depth where quad-tree partitioning is allowed may differ from the maximum partitioning depth where binary-tree partitioning and/or ternary-tree partitioning is allowed.

The encoder may signal information representing at least one of a partitioning type and a partitioning depth of a current block in a bitstream. The decoder may determine a partitioning type and a partitioning depth of a CTU on the basis of the information obtained by parsing a bitstream.

FIG. 5 is a view of an example showing an aspect of partitioning a CTU.

Partitioning a coding block by using quad-tree partitioning, binary-tree partitioning and/or ternary-tree partitioning may be referred to as multi-tree partitioning.

Coding blocks generated by partitioning a coding block by applying multi-tree partitioning may be referred to child coding blocks. When a partitioning depth of a coding block is k, a partitioning depth of child coding blocks is set to k+1.

To the contrary, for coding blocks having a partitioning depth of k+1, a coding block having a partitioning depth of k may be referred to as a parent coding block.

A partitioning type of a current coding block may be determined on the basis of at least one of a partitioning type of a parent coding block and a partitioning type of a neighboring coding block. In this connection, the neighboring coding block may be a block adjacent to a current coding block, and include at least one of an top neighboring block, a left neighboring block, or a neighboring block adjacent to the top-left corner of the current coding block. In this connection, the partitioning type may include whether or not to apply quad-tree partitioning, whether or not to apply binary-tree partitioning, a direction of binary-tree partitioning, whether or not to apply ternary-tree partitioning, or a direction of ternary-tree partitioning.

In order to determine a partitioning type of a coding block, information representing whether or not a coding block is partitioned may be signaled in a bitstream. The information is a 1-bit flag of "split_cu_flag", and when the flag is TRUE, it may represent that a coding block is partitioned by a multi tree partitioning method.

When split_cu_flag is TRUE, information representing whether or not a coding block is partitioned by quad-tree partitioning may be signaled in a bitstream. The information is a 1-bit flag of split_qt_flag, and when the flag is TRUE, a coding block may be partitioned into four blocks.

In an example, in an example shown in FIG. 5, a CTU is partitioned by quad-tree partitioning, and thus four coding blocks having a partitioning depth of 1 are generated. In addition, it is shown that quad-tree partitioning is applied again to the first coding block and the fourth coding block among four coding blocks generated by quad-tree partitioning. As a result, four coding blocks having a partitioning depth of 2 may be generated.

In addition, by applying again quad-tree partitioning to a coding block having a partitioning depth of 2, a coding block having a partitioning depth of 3 may be generated.

When quad-tree partitioning is not applied to a coding block, whether to perform binary-tree partitioning or ternary-tree partitioning for the coding block may be determined according to at least one of a size of the coding block, whether or not the coding block is positioned at a picture boundary, the maximum partitioning depth, or a partitioning type of a neighboring block. When it is determined to perform binary-tree partitioning or ternary-tree partitioning for the coding block, information representing a partitioning direction may be signaled in a bitstream. The information may be a 1-bit flag of mtt_split_cu_vertical_flag. Whether a partitioning direction is a vertical direction or a horizontal direction may be determined on the basis of the flag. Additionally, information representing which one of binary-tree partitioning or ternary-tree partitioning is applied to the coding block may be signaled in a bitstream. The information may be a 1-bit flag of mtt_split_cu_binary_flag. Whether binary-tree partitioning is applied to the coding block or ternary-tree partitioning is applied to the coding block may be determined on the basis of the flag.

In an example, in an example shown in FIG. 5, vertical directional binary-tree partitioning is applied to a coding block having a partitioning depth of 1, vertical directional ternary-tree partitioning is applied to a left coding block among coding blocks generated by the partitioning, and vertical directional binary-tree partitioning is applied to a right coding block.

When implements a device which encodes or decodes an image, a problem occurs that it is difficult to process a region larger than a threshold value because hardware performance limit. In an example, when up to 4096 samples may be simultaneously processed according to hardware performance, for a region that has more that 4096, a problem occurs that a 64×64 sized data unit should be redundantly accessed and processed and that data may not be processed simultaneously. Likewise, a basic unit of data processing may be defined as a virtual processing data unit (VPDU, hereinafter, referred to as a data basic unit).

A data basic unit may be classified into a square, non-square or non-rectangular type.

FIG. 6 is a diagram showing a shape of a data basic unit.

Data basic units may include samples equal to or smaller than the maximum number of samples which may be simultaneously processed. In an example, as in an example shown in FIG. 6 (a), 64×64 sized square blocks may be set as a data basic unit. Alternatively, a non-square block may be set as a data basic unit. In an example, as in an example shown in FIG. 6 (b) or FIG. 6 (c), a 32×128 sized block or a 64×32 sized block may be set as a data basic unit.

Not shown, but a data basic unit of a triangular, L-shaped or polygonal type may be defined.

Information for determining a data basic unit may be signaled in a bitstream. The information may be for determining at least one of a size or a shape of a data basic unit. Based on the information, whether a non-square data basic unit is allowed or whether a non-rectangular data basic unit is allowed may be determined.

Alternatively, at least one of a size or a shape of a data basic unit may be predefined in an encoder and a decoder.

Whether a partitioning type is allowed to a coding block or not may be determined by considering a size of a data basic unit. In an example, when a coding block that will be generated by partitioning a coding block is greater than a data basic unit, the partitioning may not be allowed. Alternatively, when a non-square coding block that will be generated by partitioning a coding block is greater than a data basic unit, the partitioning may not be allowed. In an example, when a width or a height of a coding block is greater than a threshold value, or when the number of samples included in a coding block is greater than a threshold value, binary tree or triple tree partitioning may not be allowed. Accordingly, encoding of information related to binary tree or triple tree partitioning may be omitted.

Alternatively, it may set to partition a coding block always when it is greater than a data basic unit. Alternatively, for a coding block greater than a data basic unit, binary tree partitioning or triple tree partitioning may be always performed. Accordingly, for a coding block greater than a data basic unit, although split flag, a flag representing whether a coding block is partitioned, is not encoded, a value of the flag may be inferred to 1.

In another example, a coding block greater than a data basic unit may be partitioned into a plurality of sub-blocks. In this case, a sub-block may be set as a prediction unit, a basic unit for prediction, or a transform unit, a basic unit for transform and/or quantization. In this case, when a coding block is partitioned into a plurality of prediction units, it may be defined as VPDU prediction unit partitioning and when a coding block is partitioned into a plurality of transform units, it may be defined as VPDU transform unit partitioning.

At least one of VPDU prediction unit partitioning or VPDU transform unit partitioning may be applied to a coding block. A partitioning type of a coding block according to application of VPDU prediction unit partitioning may be set the same as a partitioning type of a coding block according to application of VPDU transform unit partitioning.

When only VPDU prediction unit partitioning is applied to a coding block, prediction may be performed per sub-block, but transform and/or quantization may be performed for a coding block. In this case, a prediction encoding mode, that is a prediction mode such as an intra prediction mode or an inter prediction mode may be determined for a coding block.

When only VPDU transform unit partitioning is applied to a coding block, prediction is performed for a sub-block, but transform and/or quantization may be performed per sub-block.

FIGS. 7 and 8 are diagrams showing an example in which a coding block is partitioned into a plurality of sub-blocks.

FIG. 7 is a diagram showing a partitioning aspect when only a square data basic unit is allowed and FIG. 8 is a diagram showing a partitioning aspect when a square data basic unit and a non-square data basic unit are allowed.

When it is assumed that only a square data basic unit is allowed, CU0 and CU3 are defined by two different VPDUs and CU1 is defined by four different VPDUs in FIGS. 7 (a) and (b). Accordingly, CU0 and CU3 may be partitioned into two sub-blocks and CU1 may be partitioned into four sub-blocks.

When it is assumed that a square data basic unit and a non-square data basic unit are allowed, each of CU0 and CU3 may be defined as a single VPDU, but CU1 may be defined by using two different VPDUs in FIGS. 8 (a) and (b). Accordingly, CU0 and CU3 may not be partitioned into sub-blocks, but CU1 may be partitioned into two 2 sub-blocks.

In this case, CU1 may be partitioned into square sub-blocks or non-square sub-blocks. In an example, based on a horizontal line partitioning CU1 up and down, CU1 may be partitioned into two square sub-blocks. Alternatively, based on a vertical line partitioning CU1 left and right, CU1 may be partitioned into 2 non-square sub-blocks.

When there is a plurality of partitioning type candidates which may be applied to a coding block, information representing any one of a plurality of partitioning type candidates may be signaled in a bitstream. In an example, the information may represent whether a coding block is partitioned into square sub-blocks or whether a coding block is partitioned into non-square sub-blocks.

Alternatively, partitioning a coding block into square sub-blocks may be set to have a higher priority than partitioning a coding block into non-square sub-blocks. For example, partitioning a coding block into non-square sub-blocks may be allowed when a coding block may not be partitioned into square sub-blocks.

Alternatively, a partitioning type of a coding block may be determined based on a partitioning type of a parent node coding block. In an example, when a parent node coding block is partitioned based on triple tree, a coding block may be set to be partitioned into square sub-blocks. On the other hand, when a parent node coding block is partitioned based on binary tree or triple tree, a coding block may be set to be partitioned into non-square sub-blocks.

Inter-prediction is a prediction encoding mode predicting a current block by using information on a previous picture. In an example, a block (hereinafter, collocated block) at the same position with a current block within a previous picture may be set as a prediction block of the current block. Hereinafter, a prediction block generated on the basis of a collocated block of the current block may be referred to as a collocated prediction block.

To the contrary, when an object present in a previous picture has moved to another position in a current picture, a current block may be effectively predicted by using motions of the object. For example, when a motion direction and a size of the object is determined by comparing a previous picture with a current picture, a prediction block (or prediction image) of the current block may be generated according to motion information of the objects. Hereinafter, a prediction block generated by using motion information may be referred to as a motion prediction block.

A residual block may be generated by subtracting a prediction block from a current block. In this connection, in case where an object moves, energy of a residual block may be reduced by using a motion prediction block rather than using a collocated prediction block, and thus compression performance of the residual block may be improved.

As above, generating a prediction block by using motion information may be referred to as motion estimation prediction. In the most inter-prediction, a prediction block may be generated on the basis of motion compensation prediction.

Motion information may include at least one of a motion vector, a reference picture index, a prediction direction, and a bidirectional weighting factor index. A motion vector represents a motion direction of an object and a magnitude. A reference picture index specifies a reference picture of a current block among reference pictures included in a reference picture list. A prediction direction indicates any one of uni-directional L0 prediction, uni-directional L1 prediction, or bi-directional prediction (L0 prediction and L1 prediction). At least one of L0 directional motion information and L1 directional motion information may be used according to a prediction direction of a current block. A bidirectional weighting factor index specifies a weighting factor applied to an L0 prediction block and a weighting factor applied to an L1 prediction block.

Precision of a motion vector may be determined in a level of a sequence, a slice or a block. In other words, precision of a motion vector may be different per sequence, slice or block. Precision of a motion vector may be determined as any one of a ⅛ pixel(octo-pel), a ¼ pixel(quarter-pel), a ½ pixel(half-pel), an integer-pel or a 4 integer-pel.

FIG. 9 is a flow diagram of an inter-prediction method according to the embodiment of the present disclosure.

In reference to FIG. 9, an inter-prediction method includes determining an inter-prediction mode for a current block S901, obtaining motion information of the current block according to the determined inter-prediction mode S902, and performing motion compensation prediction for a current block on the basis of the obtained motion information S903.

In this connection, the inter-prediction mode may represent various methods for determining motion information of a current block, and include an inter-prediction mode using translation motion information, an inter-prediction mode using affine motion information. In an example, an inter-prediction mode using translation motion information may include a merge mode and a motion vector prediction mode, and an inter-prediction mode using affine motion information may include an affine merge mode and an affine motion vector prediction mode. Motion information on a current block may be determined on the basis of a neighboring block neighboring the current block or information obtained by parsing a bitstream.

In this case, as an inter prediction mode represents a variety of methods for determining motion information of a current block, it may include an inter prediction mode using translation motion information and an inter prediction mode using affine motion information. In an example, an inter prediction mode using translation motion information may include a merge mode and a motion vector prediction mode and an inter prediction mode using affine motion information may include an affine merge mode and an affine motion vector prediction mode. Motion information of a current block may be determined based on information parsed from a neighboring block adjacent to a current block or a bitstream according to an inter prediction mode.

Hereinafter, an inter prediction method using affine motion information will be described in detail.

FIG. 10 is a diagram illustrating a nonlinear motion of an object.

A case that a motion of an object in an image is not linear may occur. In an example, as in an example shown in FIG. 10, a nonlinear motion of an object such as zoom-in, zoom-out, rotation or affine transform, etc. may occur. When a nonlinear motion of an object occurs, a translation motion vector may not effectively express a motion of an object. Accordingly, encoding efficiency may be improved by using an affine motion instead of a translation motion in a part where a nonlinear motion of an object occurs.

FIG. 11 is a flow diagram of an inter prediction method based on an affine motion according to an embodiment of the present disclosure.

Whether an inter prediction method based on an affine motion is applied to a current block may be determined based on information parsed from a bitstream. Concretely, whether an inter prediction method based on an affine motion is applied to a current block may be determined based on at least one of a flag representing whether an affine merge mode is applied to a current block or a flag representing whether an affine motion vector prediction mode is applied to a current block.

When it is determined to apply an inter prediction method based on an affine motion to a current block, an affine motion model of a current block may be determined (S1101). An affine motion model may be determined as at least one of a 6-parameter affine motion model or a 4-parameter affine motion model. A 6-parameter affine motion model represents an affine motion by using 6 parameters and a 4-parameter affine motion model represents an affine motion by using 4 parameters.

Equation 1 represents an affine motion by using 6 parameters. An affine motion represents a translation motion for a predetermined region determined by affine seed vectors.

$$v_x = ax - by + e$$

$$v_y = cx + dy + j \qquad \text{[Equation 1]}$$

When an affine motion is represented by using 6 parameters, a complicated motion may be represented, but the number of bits needed to encode each parameter may increase so encoding efficiency may be reduced. Accordingly, an affine motion may be represented by using 4 parameters. Equation 2 represents an affine motion by using 4 parameters.

$$v_x = ax - by + e$$

$$v_y = bx + ay + j \qquad \text{[Equation 2]}$$

Information for determining an affine motion model of a current block may be encoded and signaled in a bitstream. In an example, the information may be a 1-bit flag, 'affine_type_flag'. When a value of the flag is 0, it may represent that a 4-parameter affine motion model is applied and when a value of the flag is 1, it may represent that a 6-parameter affine motion model is applied. The flag may be encoded in a unit of a slice, a tile or a block (e.g., a coding block or a coding tree unit). When a flag is signaled in a level of a slice, an affine motion model determined in a level of the slice may be applied to all blocks belonging to the slice.

Alternatively, an affine motion model of a current block may be determined based on an affine inter prediction mode of a current block. In an example, when an affine merge mode is applied, an affine motion model of a current block may be determined as a 4-parameter motion model. On the other hand, when an affine motion vector prediction mode is applied, information for determining an affine motion model of a current block may be encoded and signaled in a bitstream. In an example, when an affine motion vector prediction mode is applied to a current block, an affine motion model of a current block may be determined based on a 1-bit flag, 'affine_type_flag'.

Next, an affine seed vector of a current block may be derived (S1102). When a 4-parameter affine motion model is selected, motion vectors at two control points of a current block may be derived. On the other hand, when a 6-parameter affine motion model is selected, motion vectors at three control points of a current block may be derived. A motion vector at a control point may be referred to as an affine seed vector. A control point may include at least one of a top-left corner, a top-right corner or a bottom-left corner of a current block.

FIG. 12 is a diagram illustrating an affine seed vector per affine motion model.

Affine seed vectors for two of a top-left corner, a top-right corner or a bottom-left corner may be derived in a 4-parameter affine motion model. In an example, as in an example shown in FIG. 12 (a), when a 4-parameter affine motion model is selected, an affine vector may be derived by using an affine seed vector $sv_0$ for a top-left corner of a current block (e.g., a top-left sample (x1,y1)) and an affine seed vector $sv_1$ for a top-right corner of a current block (e.g., a top-right sample (x1,y1)). It is possible to use an affine seed vector for a bottom-left corner instead of an affine seed vector for a top-left corner or an affine seed vector for a top-right corner.

Affine seed vectors for a top-left corner, a top-right corner and a bottom-left corner may be derived in a 6-parameter affine motion model. In an example, as in an example shown in FIG. 12 (b), when a 6-parameter affine motion model is selected, an affine vector may be derived by using an affine seed vector $sv_0$ for a top-left corner of a current block (e.g., a top-left sample (x1,y1)), an affine seed vector $sv_1$ for a top-right corner of a current block (e.g., a top-right sample (x1,y1)) and an affine seed vector $sv_2$ for a top-left corner of a current block (e.g., a top-left sample (x2,y2)).

In the after-described embodiment, under a 4-parameter affine motion model, affine seed vectors at a top-left control point and a top-right control point are referred to as a first affine seed vector and a second affine seed vector, respectively. In the after-described embodiments using a first affine seed vector and a second affine seed vector, at least one of a first affine seed vector and a second affine seed vector may be substituted for an affine seed vector at a bottom-left control point (a third affine seed vector) or an affine seed vector at a bottom-right control point (a fourth affine seed vector).

In addition, under a 6-parameter affine motion model, affine seed vectors at a top-left control point, a top-right control point and a bottom-left control point are referred to as a first affine seed vector, a second affine seed vector and a third affine seed vector, respectively. In the after-described embodiments using a first affine seed vector, a second affine seed vector and a third affine seed vector, at least one of a first affine seed vector, a second affine seed vector and a third affine seed vector may be substituted for an affine seed vector at a bottom-right control point (a fourth affine seed vector).

An affine vector may be derived per sub-block by using affine seed vectors (S1103). In this case, an affine vector represents a translation motion vector derived based on affine seed vectors. An affine vector of a sub-block may be referred to as an affine sub-block motion vector or a sub-block motion vector.

FIG. 13 is a diagram illustrating affine vectors of sub-blocks under a 4-parameter motion model.

An affine vector of a sub-block may be derived based on a position of a control point, a position of a sub-block and an affine seed vector. In an example, Equation 3 represents an example in which an affine sub-block vector is derived.

$$v_x = \frac{(sv_{1x} - sv_{0x})}{(x_1 - x_0)}(x - x_0) - \frac{(sv_{1y} - sv_{0y})}{(x_1 - x_0)}(y - y_0) + sv_{0x}$$
$$v_y = \frac{(sv_{1y} - sv_{0y})}{(x_1 - x_0)}(x - x_0) - \frac{(sv_{1x} - sv_{0x})}{(x_1 - x_0)}(y - y_0) + sv_{0y}$$
[Equation 3]

In the Equation 3, (x, y) represents a position of a sub-block. In this case, a position of a sub-block represents a position of a base sample included in a sub-block. A base sample may be a sample positioned at a top-left corner of a sub-block or a sample that at least one of an x-axis or y-axis coordinate is at a central position. $(x_0, y_0)$ represents a position of a first control point and $(sv_{0x}, sv_{0y})$ represents a first affine seed vector. In addition, $(x_1, y_1)$ represents a position of a second control point and $(sv_{1x}, sv_{1y})$ represents a second affine seed vector.

When a first control point and a second control point correspond to a top-left corner and a top-right corner of a current block, respectively, $x_1-x_0$ may be set as the same value as a width of a current block.

Afterwards, motion compensation prediction for each sub-block may be performed by using an affine vector of each sub-block (S1104). As a result of performing motion compensation prediction, a prediction block for each sub-block may be generated. Prediction blocks of sub-blocks may be set as a prediction block of a current block.

Next, an inter prediction method using translation motion information will be described in detail.

Motion information of a current block may be derived from motion information of another block. In this connection, another block may be a block encoded/decoded by inter prediction previous to the current block. Setting motion information of a current block to be the same as motion information of another block may be defined as a merge mode. Also, setting a motion vector of another block as a prediction value of a motion vector of the current block may be defined as a motion vector prediction mode.

FIG. 14 is a flow diagram of a process deriving the motion information of a current block under a merge mode.

The merge candidate of a current block may be derived S1401. The merge candidate of a current block may be derived from a block encoded/decoded by inter-prediction prior to a current block.

FIG. 15 is a diagram illustrating candidate blocks used to derive a merge candidate.

The candidate blocks may include at least one of neighboring blocks including a sample adjacent to a current block or non-neighboring blocks including a sample non-adjacent to a current block. Hereinafter, samples determining candidate blocks are defined as base samples. In addition, a base sample adjacent to a current block is referred to as a neighboring base sample and a base sample non-adjacent to a current block is referred to as a non-neighboring base sample.

A neighboring base sample may be included in a neighboring column of a leftmost column of a current block or a neighboring row of an uppermost row of a current block. In an example, when the coordinate of a left-top sample of a current block is (0,0), at least one of a block including a base sample at a position of (−1, H−1), (W−1, −1), (W, −1), (−1, H) or (−1, −1) may be used as a candidate block. In reference to a diagram, the neighboring blocks of index 0 to 4 may be used as candidate blocks.

A non-neighboring base sample represents a sample that at least one of a x-axis distance or a y-axis distance with a base sample adjacent to a current block has a predefined value. In an example, at least one of a block including a base sample that a x-axis distance with a left base sample is a predefined value, a block including a non-neighboring sample that a y-axis distance with a top base sample is a predefined value or a block including a non-neighboring sample that a x-axis distance and a y-axis distance with a left-top base sample are a predefined value may be used as a candidate block. A predefined value may be a natural number such as 4, 8, 12, 16, etc. In reference to a diagram, at least one of blocks in an index 5 to 26 may be used as a candidate block.

A sample not positioned on the same vertical, horizontal or diagonal line as a neighboring base sample may be set as a non-neighboring base sample.

An X-coordinate of top non-neighboring base samples may be set to be different from that of top neighboring base samples. In an example, when a position of a top neighboring base sample is (W−1, −1), a position of a top non-neighboring base sample apart from a top neighboring base sample by N on a y-axis may be set to be ((W/2)−1, −1−N), and a position of a top non-neighboring base sample apart from a top neighboring base sample by 2N on a y-axis may be set to be (0, −1−2N). In other words, a position of a non-adjacent base sample may be determined based on a position of an adjacent base sample and a distance with an adjacent base sample.

Hereinafter, a candidate block including a neighboring base sample among candidate blocks is referred to as a neighboring block and a candidate block including a non-neighboring base sample is referred to as a non-neighboring block.

When a distance between a current block and a candidate block is equal to or greater than a threshold value, the candidate block may be set to be unavailable as a merge candidate. The threshold value may be determined based on a size of a coding tree unit. In an example, a threshold value may be set as a height of a coding tree unit (ctu_height) or a value adding or subtracting an offset to or from a height of a coding tree unit (ctu_height±N). As an offset N is a predefined value in an encoding device and a decoding device, it may be set to be 4, 8, 16, 32 or ctu_height.

When a difference between a y-axis coordinate of a current block and a y-axis coordinate of a sample included in a candidate block is greater than a threshold value, a candidate block may be determined to be unavailable as a merge candidate.

Alternatively, a candidate block not belonging to the same coding tree unit as a current block may be set to be unavailable as a merge candidate. In an example, when a base sample is out of an upper boundary of a coding tree unit to which a current block belongs, a candidate block including the base sample may be set to be unavailable as a merge candidate.

A merge candidate may be derived from a temporal neighboring block included in a picture different from a current block. In an example, a merge candidate may be derived from a collocated block included in a collocated picture. Any one of reference pictures included in a reference picture list may be set as a collocated picture. Index information identifying a collocated picture among reference pictures may be signaled in a bitstream. Alternatively, a reference picture with a predefined index among reference pictures may be determined as a collocated picture.

The motion information of a merge candidate may be set the same as the motion information of a candidate block. In an example, at least one of a motion vector, a reference picture index, a prediction direction or a bidirectional weight index of a candidate block may be set as the motion information of a merge candidate.

A merge candidate list including a merge candidate may be generated S1402.

The index of merge candidates in a merge candidate list may be assigned according to the predetermined order. In an example, an index may be assigned in the order of a merge candidate derived from a left neighboring block, a merge candidate derived from a top neighboring block, a merge candidate derived from a right-top neighboring block, a merge candidate derived from a left-bottom neighboring block, a merge candidate derived from a left-top neighboring block and a merge candidate derived from a temporal neighboring block.

When a plurality of merge candidates are included in a merge candidate, at least one of a plurality of merge candidates may be selected S1403. Concretely, information for specifying any one of a plurality of merge candidates may be signaled in a bitstream. In an example, information, merge_idx, representing an index of any one of merge candidates included in a merge candidate list may be signaled in a bitstream.

When the number of merge candidates included in a merge candidate list is less than the threshold, a motion information candidate included in a motion information table may be added to a merge candidate list as a merge candidate. In this connection, the threshold may be the maximum number of merge candidates which may be included in a merge candidate list or a value in which an offset is subtracted from the maximum number of merge candidates. An offset may be a natural number such as 1 or 2, etc.

A motion information table includes a motion information candidate derived from a block encoded/decoded based on inter-prediction in a current picture. In an example, the motion information of a motion information candidate included in a motion information table may be set the same as the motion information of a block encoded/decoded based on inter-prediction. In this connection, motion information may include at least one of a motion vector, a reference picture index, a prediction direction or a bidirectional weight index.

A motion information candidate included in a motion information table also can be referred to as a inter region merge candidate or a prediction region merge candidate.

The maximum number of a motion information candidate which may be included in a motion information table may be predefined in an encoder and a decoder. In an example, the maximum number of a motion information candidate which may be included in a motion information table may be 1, 2, 3, 4, 5, 6, 7, 8 or more (e.g. 16).

Alternatively, information representing the maximum number of a motion information candidate which may be included in a motion information table may be signaled in a bitstream. The information may be signaled in a sequence, a picture or a slice level. The information may represent the maximum number of a motion information candidate which may be included in a motion information table. Alternatively, the information may represent difference between the maximum number of a motion information candidate which may be included in a motion information table and the maximum number of a merge candidate which may be included in a merge candidate list.

Alternatively, the maximum number of a motion information candidate which may be included in a motion information table may be determined according to a picture size, a slice size or a coding tree unit size.

A motion information table may be initialized in a unit of a picture, a slice, a tile, a brick, a coding tree unit or a coding tree unit line (a row or a column). In an example, when a slice is initialized, a motion information table is also initialized thus a motion information table may not include any motion information candidate.

Alternatively, information representing whether a motion information table will be initialized may be signaled in a bitstream. The information may be signaled in a slice, a tile, a brick or a block level. Until the information indicates the initialization of a motion information table, a pre-configured motion information table may be used.

Alternatively, information on an initial motion information candidate may be signaled in a picture parameter set or a slice header. Although a slice is initialized, a motion information table may include an initial motion information candidate. Accordingly, an initial motion information candidate may be used for a block which is the first encoding/decoding target in a slice.

Alternatively, a motion information candidate included in the motion information table of a previous coding tree unit may be set as an initial motion information candidate. In an example, a motion information candidate with the smallest index or with the largest index among motion information candidates included in the motion information table of a previous coding tree unit may be set as an initial motion information candidate.

Blocks are encoded/decoded in the order of encoding/decoding, and blocks encoded/decoded based on inter-prediction may be sequentially set as a motion information candidate in the order of encoding/decoding.

FIG. 16 is a diagram to explain the update aspect of a motion information table.

For a current block, when inter-prediction is performed S1601, a motion information candidate may be derived based on a current block S1602. The motion information of a motion information candidate may be set the same as that of a current block.

When a motion information table is empty S1603, a motion information candidate derived based on a current block may be added to a motion information table S1604.

When a motion information table already includes a motion information candidate S1603, a redundancy check for the motion information of a current block (or, a motion information candidate derived based on it) may be performed S1605. A redundancy check is to determine whether the motion information of a pre-stored motion information candidate in a motion information table is the same as the motion information of a current block. A redundancy check may be performed for all pre-stored motion information candidates in a motion information table. Alternatively, a redundancy check may be performed for motion information candidates with an index over or below the threshold among pre-stored motion information candidates in a motion information table. Alternatively, a redundancy check may be performed for the predefined number of motion information candidates. In an example, motion information candidates with smallest indexes or with largest indexes may be determined as targets for a redundancy check.

When a motion information candidate with the same motion information as a current block is not included, a motion information candidate derived based on a current block may be added to a motion information table S1608. Whether motion information candidates are identical may be determined based on whether the motion information (e.g. a motion vector/a reference picture index, etc.) of motion information candidates is identical.

In this connection, when the maximum number of motion information candidates are already stored in a motion information table S1606, the oldest motion information candidate may be deleted S1607 and a motion information candidate derived based on a current block may be added to a motion information table S1608. In this connection, the oldest motion information candidate may be a motion information candidate with the largest or the smallest index.

Motion information candidates may be identified by respective index. When a motion information candidate derived from a current block is added to a motion information table, the smallest index (e.g. 0) may be assigned to the motion information candidate and indexes of pre-stored motion information candidates may be increased by 1. In this connection, When the maximum number of motion information candidates are already stored in a motion information table, a motion information candidate with the largest index is removed.

Alternatively, when a motion information candidate derived from a current block is added to a motion information table, the largest index may be assigned to the motion information candidate. In an example, when the number of pre-stored motion information candidates in a motion information table is less than the maximum value, an index with the same value as the number of pre-stored motion information candidates may be assigned to the motion information candidate. Alternatively, when the number of pre-stored motion information candidates in a motion information table is equal to the maximum value, an index subtracting 1 from the maximum value may be assigned to the motion information candidate. Alternatively, a motion information candidate with the smallest index is removed and the indexes of residual pre-stored motion information candidates are decreased by 1.

FIG. 17 is a diagram showing the update aspect of a motion information table.

It is assumed that as a motion information candidate derived from a current block is added to a motion information table, the largest index is assigned to the motion information candidate. In addition, it is assumed that the maximum number of a motion information candidate is already stored in a motion information table.

When a motion information candidate HmvpCand[n+1] derived from a current block is added to a motion information table HmvpCandList, a motion information candidate HmvpCand[0] with the smallest index among pre-stored motion information candidates may be deleted and indexes of residual motion information candidates may be decreased by 1. In addition, the index of a motion information candidate HmvpCand[n+1] derived from a current block may be set to the maximum value (for an example shown in FIG. 17, n).

When a motion information candidate identical to a motion information candidate derived based on a current block is prestored S1605, a motion information candidate derived based on a current block may not be added to a motion information table S1609.

Whether to have the same motion information may be determined based on at least one of a motion vector, a reference picture index or prediction mode information (e.g., whether of Uni-prediction and/or Bi-prediction). In an example, when at least one of a motion vector, a reference picture index or prediction mode information (e.g., whether of Uni-prediction and/or Bi-prediction) is different, a motion information candidate derived from a current block may be determined to be new.

Alternatively, when a reference picture index and prediction mode information between mvCand, a motion information candidate derived based on a current block, and a motion information candidate included in a motion information table are the same, but a motion vector is different, whether of redundance may be determined based on whether a motion vector difference between two motion information candidates is smaller than a threshold value. In an example, when a difference between a motion vector of a current block and a motion vector of a motion information candidate included in a motion information table is smaller than a threshold value, a motion information table may not be updated by motion information of a current block. A threshold value may be set as 1-pixel, 2-pixel or 4-pixel.

Alternatively, while a motion information candidate derived based on a current block is added to a motion information table, a pre-stored motion information candidate identical to the motion information candidate may be removed. In this case, it causes the same effect as when the index of a pre-stored motion information candidate is newly updated.

FIG. 18 is a diagram showing an example in which the index of a pre-stored motion information candidate is updated.

When the index of a pre-stored motion information candidate identical to a motion information candidate mvCand derived from a current block is hIdx, the pre-stored motion information candidate may be removed and the index of motion information candidates with an index larger than hIdx may be decreased by 1. In an example, an example shown in FIG. 18 showed that HmvpCand[2] identical to mvCand is deleted in a motion information table HvmpCandList and an index from HmvpCand[3] to HmvpCand[n] is decreased by 1.

And, a motion information candidate mvCand derived based on a current block may be added to the end of a motion information table.

Alternatively, an index assigned to a pre-stored motion information candidate identical to a motion information candidate derived based on a current block may be updated. For example, the index of a pre-stored motion information candidate may be changed to the minimum value or the maximum value.

Alternatively, a motion information table may be updated by swapping HmvpCandList[hIdx], a motion information candidate having the same motion information as a current block, and a motion information candidate storing motion information which is most recently updated. In this case, swap means that an index of two motion information candidates is interchanged.

Whether two motion information candidates will be swapped may be determined by comparing a difference between an index of a motion information candidate having the same motion information as a current block and an index of a motion information candidate storing motion information which is most recently updated with a threshold value. In an example, when it is assumed that an index of a motion information candidate storing motion information which is most recently updated is n, two motion information candidates may be swapped only when an index of a motion information candidate having the same motion information as a current block is n−1, n−2 or n−3.

Alternatively, HmvpCandList[hIdx], a motion information candidate having the same motion information as a current block, may be stored in HmvpCandList[n], a position of a motion information candidate storing motion information which is most recently updated. In addition, HmvpCandList[hIdx], a storage position of a motion information candidate having the same motion information as a current block, may be updated based on motion information of surrounding motion information candidates. In an example, when HmvpCandList[hIdx−1] and HmvpCandList[hIdx+1] are a bidirectional inter prediction mode, motion information between HmvpCandList[hIdx−1] and HmvpCandList[hIdx+1] may be averaged and its result may be stored in HmvpCandList[hIdx]. In this case, when a reference picture index between two motion information candidates is different, a motion vector may be scaled based on an arbitrary reference picture index.

Whether to have the same motion information as motion information of a current block may be checked only for part of motion information candidates which are pre-stored in a motion information table. In an example, motion information of n motion information candidates which are most recently stored in a motion information table may be compared with motion information of a current block.

Alternatively, motion information of a current block may be compared with motion information candidates whose index is an odd number or an even number among motion information candidates stored in a motion information table. In an example, when it is assumed that a size of a motion information table is 6, whether to have the same motion information as a current block may be checked only for motion information candidates whose index is 0, 2, 4. Alternatively, whether to have the same motion information as a current block may be checked only for motion information candidates whose index is 1, 3, 5.

When a current block is encoded by diagonal partitioning, a current block may have one or more motion information. In an example, motion compensation for a first prediction unit in a current block may be performed based on first motion information and motion compensation for a second prediction unit in a current block may be performed based on second motion information.

One which is arbitrarily selected among a plurality of motion information of a current block may be added to a motion information table. In an example, one of motion information of a first prediction unit and motion information of a second prediction unit may be added to a motion information table. Motion information of a prediction unit including a sample at a predefined position among a first prediction unit and a second prediction unit may be added to a motion information table. A sample at a predefined position may include at least one of a top-left sample, a bottom-left sample, a top-right sample, a bottom-right sample or a central sample in a coding block. Alternatively, one of motion information of a first prediction unit and motion information of a second prediction unit may be selected based on at least one of a size, a depth or a shape of a current block or partitioning information of a neighboring block.

Alternatively, a plurality of motion information of a current block may be sequentially added to a motion information table in a predefined order. In an example, when a left triangular partition type is applied to a current block, a motion information table may be updated in an order of a first prediction unit and a second prediction unit. Or, when a left triangular partition type is applied to a current block, a motion information table may be updated in an order of a second prediction unit and a first prediction unit.

Alternatively, when a right triangular partition type is applied to a current block, a motion information table may be updated in an order of a second prediction unit and a first prediction unit. Or, when a right triangular partition type is applied to a current block, a motion information table may be updated in an order of a first prediction unit and a second prediction unit.

The motion information of blocks included in a predetermined region may be set not to be added to a motion information table. In an example, a motion information candidate derived based on the motion information of a block included in a merge processing region may not be added to a motion information table. Since the encoding/decoding order for blocks included in a merge processing region is not defined, it is improper to use motion information of any one of them for the inter-prediction of another of them. Accordingly, motion information candidates derived based on blocks included in a merge processing region may not be added to a motion information table.

Alternatively, the motion information of a block smaller than a preset size may be set not to be added to a motion information table. In an example, a motion information candidate derived based on the motion information of a coding block whose width or height is smaller than 4 or 8 or the motion information of a 4×4 sized coding block may not be added to a motion information table.

When motion compensation prediction is performed per sub-block basis, a motion information candidate may be derived based on the motion information of a representative sub-block among a plurality of sub-blocks included in a current block. In an example, when a sub-block merge candidate is used for a current block, a motion information candidate may be derived based on the motion information of a representative sub-block among sub-blocks.

The motion vector of sub-blocks may be derived in the following order. First, any one of merge candidates included in the mere candidate list of a current block may be selected and an initial shift vector (shVector) may be derived based on the motion vector of a selected merge candidate. And, a shift sub-block that a base sample is at a position of (xColSb, yColSb) may be derived by adding an initial shift vector to the position (xSb, ySb) of the base sample of each sub-block in a coding block (e.g. a left-top sample or a center sample). The below Equation 4 shows a formula for deriving a shift sub-block.

(xColSb,yColSb)=(xSb+shVector[0]>>4,ySb+shVector[1]>>4)     [Equation 4]

Then, the motion vector of a collocated block corresponding to the center position of a sub-block including (xColSb, yColSb) may be set as the motion vector of a sub-block including (xSb, ySb).

A representative sub-block may mean a sub-block including the a top-left sample, a central sample, a bottom-right sample, a top-right sample or a bottom-left sample of a current block.

FIG. 19 is a diagram showing the position of a representative sub-block.

FIG. 19 (a) shows an example in which a sub-block positioned at the left-top of a current block is set as a representative sub-block and FIG. 19 (b) shows an example in which a sub-block positioned at the center of a current block is set as a representative sub-block. When motion compensation prediction is performed in a basis of a sub-block, the motion information candidate of a current block may be derived based on the motion vector of a sub-block including the left-top sample of a current block or including the central sample of a current block.

Based on the inter-prediction mode of a current block, it may be determined whether a current block will be used as a motion information candidate. In an example, a block encoded/decoded based on an affine motion model may be set to be unavailable as a motion information candidate. Accordingly, although a current block is encoded/decoded by inter-prediction, a motion information table may not be updated based on a current block when the inter-prediction mode of a current block is an affine prediction mode.

Alternatively, based on at least one of a motion vector resolution of a current block, whether a merge offset encoding method is applied, whether combined prediction is applied or whether diagonal partitioning is applied, whether a current block will be used as a motion information candidate may be determined. In an example, a current block may be set to be unavailable as a motion information candidate in at least one of a case when a motion information resolution of a current block is equal to or greater than 2 integer-pel, a case when combined prediction is applied to a current block, a case when diagonal partitioning is applied to a current block or a case when a merge offset encoding method is applied to a current block.

Alternatively, a motion information candidate may be derived based on at least one sub-block vector of a sub-block included in a block encoded/decoded based on an affine motion model. In an example, a motion information candidate may be derived by using a sub-block positioned at the left-top, the center or the right-top of a current block. Alternatively, the average value of the sub-block vectors of a plurality of sub-blocks may be set as the motion vector of a motion information candidate.

Alternatively, a motion information candidate may be derived based on the average value of the affine seed vectors of a block encoded/decoded based on an affine motion model. In an example, at least one average of the first affine seed vector, the second affine seed vector or the third affine seed vector of a current block may be set as the motion vector of a motion information candidate.

Alternatively, a motion information table may be configured per inter-prediction mode. In an example, at least one of a motion information table for a block encoded/decoded by an intra block copy, a motion information table for a block encoded/decoded based on a translation motion model or a motion information table for a block encoded/decoded based on an affine motion model may be defined. According to the inter-prediction mode of a current block, any one of a plurality of motion information tables may be selected.

FIG. 20 shows an example in which a motion information table is generated per inter-prediction mode.

When a block is encoded/decoded based on a non-affine motion model, a motion information candidate mvCand derived based on the block may be added to a non-affine motion information table HmvpCandList. On the other hand, when a block is encoded/decoded based on an affine motion model, a motion information candidate mvAfCand derived based on the above model may be added to an affine motion information table HmvpCandList.

The affine seed vectors of the above block may be stored in a motion information candidate derived from a block encoded/decoded based on an affine motion model. Accordingly, the motion information candidate may be used as a merge candidate for deriving the affine seed vectors of a current block.

An additional motion information table may be defined in addition to the described motion information table. A long-term motion information table (hereinafter, referred to as the second motion information table) may be defined in addition to the above-described motion information table (hereinafter, referred to as the first motion information table). In this connection, a long-term motion information table includes long-term motion information candidates.

When both the first motion information table and the second motion information table are empty, first, a motion information candidate may be added to the second motion information table. After the number of motion information candidates available for the second motion information table reaches the maximum number, a motion information candidate may be added to the first motion information table.

motion information candidate included in the second motion information table may be added to a merge candidate list.

FIG. 21 is a diagram showing an example in which a motion information candidate included in a long-term motion information table is added to a merge candidate list.

In case that the number of a merge candidate included in a merge candidate list is less than the maximum number, a motion information candidate included in the first motion information table HmvpCandList may be added to a merge candidate list. In When the number of a merge candidate included in the merge candidate list is less than the maximum number even though motion information candidates included in the first motion information table is added to a merge candidate list, a motion information candidate included in a long-term motion information table HmvpLT-CandList may be added to the merge candidate list.

Table 1 shows a process in which motion information candidates included in a long-term information table are added to a merge candidate list.

TABLE 1

For each candidate in HMVPCandList with index HMVPLTIdx = 1 . . . numHMVPLTCand,
the following ordered steps are repeated until combStop is equal to true
sameMotion is set to FALSE
If hmvpStop is equal to FALSE and numCurrMergecand is less than
(MaxNumMergeCand − 1), hmvpLT is set to TRUE
If HMVPLTCandList[NumLTHmvp − HMVPLTIdx] have the same motion vectors and the
same reference indices with any mergeCandList[i] with I being 0 . . .
numOrigMergeCand − 1 and HasBeenPruned[i] equal to false, sameMotion is set to
true
If sameMotion is equal to false, mergeCandList[numCurrMergeCand++] is set
to HMVPLTCandList[NumLTHmvp − HMVPLTIdx]
If numCurrMergeCand is equal to (MaxNumMergeCand − 1), hmvpLTStop is set to
TRUE Alternatively, one motion information candidate may be added to both the second motion information table and the first motion information table.

In this connection, a second motion information table which is fully filled may not perform an update any more. Alternatively, when a decoded region in a slice is over a predetermined ratio, the second motion information table may be updated. Alternatively, the second motion information table may be updated per N coding tree unit line.

On the other hand, the first motion information table may be updated whenever an encoded/decoded block is generated by inter-prediction. But, a motion information candidate added to the second motion information table may be set not to be used to update the first motion information table.

Information for selecting any one of the first motion information table or the second motion information table may be signaled in a bitstream. When the number of a merge candidate included in a merge candidate list is less than the threshold, motion information candidates included in a motion information table indicated by the information may be added to a merge candidate list as a merge candidate.

Alternatively, a motion information table may be selected based on a size or a shape of a current block, an inter-prediction mode of the current block, whether bidirectional prediction is applied to the current block, whether a motion vector is refined or whether diagonal partitioning is applied to the current block.

Alternatively, when the number of merge candidates included in a merge candidate list is less than the maximum number even though a motion information candidate included in the first motion information table is added, a A motion information candidate may be set to include additional information except for motion information. In an example, at least one of a size, shape or partition information of a block may be additionally stored in a motion information candidate. When the merge candidate list of a current block is configured, only motion information candidate whose a size, shape or partition information is identical or similar to a current block among motion information candidates may be used or a motion information candidate whose a size, shape or partition information is identical or similar to a current block may be added to a merge candidate list in advance. Alternatively, a motion information table may be generated per block size, shape or partition information. The merge candidate list of a current block may be configured by using a motion information table matching the shape, size or partition information of a current block among a plurality of motion information tables.

When the number of a merge candidate included in the merge candidate list of a current block is less than the threshold, a motion information candidate included in a motion information table may be added to a merge candidate list as a merge candidate. The additional process is performed in the order reflecting sorted order of indexes of motion information candidates in ascending or descending order. In an example, a motion information candidate with the largest index may be first added to the merge candidate list of a current block.

When a motion information candidate included in a motion information table is added to a merge candidate list, a redundancy check between a motion information candidate and pre-stored merge candidates in the merge candidate list may be performed. As a result of a redundancy check, a motion information candidate with the same motion information as a pre-stored merge candidate may not be added to the merge candidate list.

In an example, Table 2 shows a process in which a motion information candidate is added to a merge candidate list.

TABLE 2

For each candidate in HMVPCandList with index HMVPIdx = 1 . . .
numCheckedHMVPCand, the following ordered steps are repeated until combStop
is equal to true
sameMotion is set to false
If HMVPCandList[NumHmvp − HMVPIdx] have the same motion vectors and the same
reference indices with any mergeCandList[i] with I being 0 . . . numOrigMergeCand−
1 and HasBeenPruned[i] equal to false, sameMotion is set to true
If sameMotion is equal to false, mergeCandList[numCurrMergeCand++] is set
to HMVPCandList[NumHmvp − HMVPIdx]
If numCurrMergeCand is equal to (MaxNumMergeCand − 1), hmvpStop is set to TRUE A redundancy check may be performed only for a part of motion information candidates included in a motion information table. In an example, a redundancy check may be performed only for a motion information candidate with an index over or below the threshold. Alternatively, a redundancy check may be performed only for N motion information candidates with the largest index or the smallest index. Alternatively, a redundancy check may be performed only for a part of pre-stored merge candidates in a merge candidate list. In an example, a redundancy check may be performed only for a merge candidate whose index is over or below the threshold or a merge candidate derived from a block at a specific position. In this connection, a specific position may include at least one of the left neighboring block, the top neighboring block, the right-top neighboring block or the left-bottom neighboring block of a current block.

FIG. 22 is a diagram showing an example in which a redundancy check is performed only for a part of merge candidates.

When a motion information candidate HmvpCand[j] is added to a merge candidate list, a redundancy check with 2 merge candidates with the largest index, mergeCandList[NumMerge−2] and mergeCandList[NumMerge−1], may be performed for a motion information candidate. In this connection, NumMerge may show the number of an available spatial merge candidate and a temporal merge candidate.

Unlike a shown example, when a motion information candidate HmvpCand[j] is added to a merge candidate list, a redundancy check with 2 merge candidates with the smallest index may be performed for a motion information candidate. For example, it may be checked whether mergeCandList[0] and mergeCandList[1] are identical to HmvpCand[j].

Alternatively, a redundancy check may be performed only for a merge candidate derived from a specific position. In an example, a redundancy check may be performed for at least one of a merge candidate derived from a neighboring block positioned at the left of a current block or at the top of a current block. When there is no merge candidate derived from a specific position in a merge candidate list, a motion information candidate may be added to a merge candidate list without a redundancy check.

When a motion information candidate HmvpCand[j] is added to a merge candidate list, a redundancy check with 2 merge candidates with the largest index, mergeCandList[NumMerge−2] and mergeCandList[NumMerge−1], may be performed for a motion information candidate. In this connection, NumMerge may show the number of an available spatial merge candidate and a temporal merge candidate.

A redundancy check with a merge candidate may be performed only for a part of motion information candidates. In an example, a redundancy check may be performed only for N motion information candidates with a large or a small index among motion information candidates included in a motion information table. In an example, a redundancy check may be performed only for motion information candidates with an index that the number and difference of motion information candidates included in a motion information table are below the threshold. When the threshold is 2, a redundancy check may be performed only for 3 motion information candidates with the largest index value among motion information candidates included in a motion information table. A redundancy check may be omitted for motion information candidates except for the above 3 motion information candidates. When a redundancy check is omitted, a motion information candidate may be added to a merge candidate list regardless of whether the same motion information as a merge candidate is exist or not.

Conversely, a redundancy check is set to be performed only for motion information candidates with an index that the number and difference of motion information candidates included in a motion information table are over the threshold.

Alternatively, a redundancy check for N motion information candidates stored in the most recent motion information table may be performed.

The number of motion information candidates that a redundancy check is performed may be redefined in an encoder and a decoder. In an example, the number of motion information candidates may be an integer such as 0, 1 or 2.

Alternatively, the number of motion information candidates may be determined based on at least one of the number of merge candidates included in a merge candidate list or the number of motion information candidates included in a motion information table.

When the same merge candidate as a first motion information candidate is found, a redundancy check with the same merge candidate as the first motion information candidate may be omitted in a redundancy check for a second motion information candidate.

FIG. 23 is a diagram showing an example in which a redundancy check with a specific merge candidate is omitted.

When a motion information candidate HmvpCand[i] whose index is i is added to a merge candidate list, a redundancy check between the motion information candidate and pre-stored merge candidates in a merge candidate list is performed. In this connection, when a merge candidate mergeCandlist[j] identical to a motion information candidate HmvpCand[i] is found, a redundancy check between a motion information candidate HmvpCand[i−1] whose index is i−1 and merge candidates may be performed without adding the motion information candidate HmvpCand[i] to a merge candidate list. In this connection, a redundancy check between the motion information candidate HmvpCand[i−1] and the merge candidate mergeCandList[j] may be omitted.

In an example, in an example shown in FIG. 23, it was determined that HmvpCand[i] and mergeCandList[2] are identical. Accordingly, a redundancy check for HmvpCand[i−1] may be performed without adding HmvpCand[i] to a merge candidate list. In this connection, a redundancy check between HmvpCand[i−1] and mergeCandList[2] may be omitted.

When the number of a merge candidate included in the merge candidate list of a current block is less than the threshold, at least one of a pairwise merge candidate or a zero merge candidate may be additionally included except for a motion information candidate. A pairwise merge candidate means a merge candidate having a value obtained from averaging the motion vectors of more than 2 merge candidates as a motion vector and a zero merge candidate means a merge candidate whose motion vector is 0.

For the merge candidate list of a current block, a merge candidate may be added in the following order.

Spatial merge candidate—Temporal merge candidate—Motion information candidate—(Affine motion information candidate)—Pairwise merge candidate—Zero merge candidate A spatial merge candidate means a merge candidate derived from at least one of a neighboring block or a non-neighboring block and a temporal merge candidate means a merge candidate derived from a previous reference picture. An affine motion information candidate represents a motion information candidate derived from a block encoded/decoded by an affine motion model.

A motion information table may be used in a motion vector prediction mode. In an example, when the number of a motion vector prediction candidate included in the motion vector prediction candidate list of a current block is less than the threshold, a motion information candidate included in a motion information table may be set as a motion vector prediction candidate for a current block. Concretely, the motion vector of a motion information candidate may be set as a motion vector prediction candidate.

If any one of motion vector prediction candidates included in the motion vector prediction candidate list of a current block is selected, a selected candidate may be set as a motion vector predictor of a current block. Then, after the motion vector residual value of a current block is decoded, the motion vector of a current block may be obtained by adding up the motion vector predictor and the motion vector residual value.

The motion vector prediction candidate list of a current block may be configured in the following order.

Spatial motion vector prediction candidate—Temporal motion vector prediction candidate—Motion information candidate—(Affine motion information candidate)—Zero motion vector prediction candidate A spatial motion vector prediction candidate means a motion vector prediction candidate derived from at least one of a neighboring block or a non-neighboring block and a temporal motion vector prediction candidate means a motion vector prediction candidate derived from a previous reference picture. An affine motion information candidate represents a motion information candidate derived from a block encoded/decoded by an affine motion model. A zero motion vector prediction candidate represents a candidate that the value of a motion vector is 0.

A coding block may be partitioned into a plurality of prediction units and prediction may be performed for each of partitioned prediction units. In this case, a prediction unit represents a base unit for performing prediction.

A coding block may be partitioned into non-rectangular prediction units. In an example, a coding block may be partitioned by using at least one of a vertical line, a horizontal line, an oblique line or a diagonal line. Prediction units partitioned by a partitioning line may have a shape such as a triangle, a quadrangle, a trapezoid or a pentagon. In an example, a coding block may be partitioned into two triangular prediction units, two trapezoidal prediction units, two quadrangular prediction units or one triangular prediction unit and one pentagonal prediction unit.

Information on at least one of the number of lines partitioning a coding block, a start point of a line, an end point of a line, an angle required for partitioning, the number of prediction units generated by partitioning or information on a shape of a prediction unit may be signaled in a bitstream.

In an example, information representing any one of partition type candidates of a coding block may be signaled in a bitstream. Alternatively, information specifying any one of a plurality of line candidates partitioning a coding block may be signaled in a bitstream. In an example, index information indicating any one of a plurality of line candidates may be signaled in a bitstream.

For each of a plurality of line candidates, at least one of an angle or a position may be different. The number of line candidates which is available for a current block may be determined based on a size or a shape of a current block, the number of available merge candidates or whether a neighboring block at a specific position is available as a merge candidate.

Alternatively, information for determining the number or a type of line candidates may be signaled in a bitstream. In an example, whether an oblique line with an angle greater than a diagonal line and/or an oblique line with an angle smaller than a diagonal line is available as a line candidate may be determined by using a 1-bit flag. The information may be signaled at a sequence, a picture or a sequence level.

Alternatively, information for specifying at least one of a start point or an end point of a line partitioning a coding block may be signaled. A start point and an end point of a line may pass boundary points generated when a width and/or a height of a coding block is partitioned into four parts. In an example, when it is assumed that a position of a top-left sample of a coding block is (0,0) and a width and a height of a coding block is W and H, respectively, a start point and an end point of a line may be one of the following.

(0, 0), (W/4, 0), (W/2, 0), (3W/4, 0), (W, 0), (0, H), (W/4, H), (W/2, H), (3W/4, H), (W, H), (0, H/4), (0, H/2), (0, H/3), (0, H), (W, H/4), (W, H/2), (W, H/3), (W, H)]

Alternatively, at least one of the number of lines partitioning a coding block, a start point of a line, an end point of a line, an angle required for partitioning, the number of prediction units generated by partitioning or information on a shape of a prediction unit may be implicitly derived by at least one of an intra prediction mode or an inter prediction mode of a coding block, a position of an available merge candidate or a partitioning aspect of a neighboring block.

When a coding block is partitioned into a plurality of prediction units, intra prediction and/or inter prediction may be performed for each prediction unit.

A coding block may be partitioned into prediction units in the same size. In an example, a coding block may be partitioned into prediction units in the same size by using a diagonal line passing two corners of a coding block. When a coding block is partitioned into prediction units in the same size, it may be referred to as symmetric partitioning.

FIG. 24 is a diagram showing a partitioning aspect of a coding block to which symmetric partitioning is applied.

As in an example shown in FIGS. 24 (a) and (b), a coding block may be partitioned into two triangular prediction units by using a diagonal line. In FIG. 24, it was shown that a coding block is partitioned into two prediction units in the same size.

A coding block may be partitioned into prediction units in a different size. In an example, in an example shown in FIG. 24 (a), the top-left of a diagonal line partitioning a coding block may be set to meet a left boundary or an upper boundary of a coding block, not a top-left corner of a coding block. Alternatively, the bottom-right of a diagonal line may be set to meet a right boundary or a lower boundary of a coding block, not a bottom-right corner of a coding block.

Alternatively, in an example shown in FIG. 24 (b), the top-right of a diagonal line partitioning a coding block may be set to meet an upper boundary or a right boundary of a coding block, not a top-right corner of a coding block. Alternatively, the bottom-left of a diagonal line may be set to meet a left boundary or a lower boundary of a coding block, not a bottom-left corner of a coding block.

When a coding block is partitioned into two prediction units in a different size, it may be referred to as asymmetric partitioning.

FIG. 25 is a diagram showing a partitioning aspect of a coding block to which asymmetric partitioning is applied.

As in an example shown in FIG. 25, a coding block may be partitioned by using a diagonal line that any one of a start point or an end point passes a corner of a coding block and the other passes the center of a specific boundary.

Alternatively, a coding block may be partitioned by using a diagonal line that any one of a start point or an end point passes a corner of a coding block and the other passes a ¼ or ¾ point of a specific boundary.

Alternatively, a coding block may be partitioned by using a diagonal line that any one of a start point or an end point passes a corner of a coding block and the other passes an arbitrary point on a specific boundary, not a corner.

Information for determining a partitioning type of a coding block may be signaled in a bitstream. In an example, information representing whether symmetric partitioning is applied may be signaled in a bitstream. The information may be a 1-bit flag. In an example, a syntax, isSymTriangle_flag, may be signaled in a bitstream. When a value of a syntax, isSymTriangle_flag, is 1, it represents that symmetric partitioning is applied to a coding block. When a value of a syntax, isSymTriangle_flag, is 0, it represents that asymmetric partitioning is applied to a coding block.

Information for determining a partitioning type of a coding block may be signaled in a bitstream. In an example, index information specifying one of a plurality of partitioning type candidates may be signaled in a bitstream.

A plurality of partitioning type candidates may include at least one of a symmetric partitioning type or an asymmetric partitioning type. Based on index information specifying one of a plurality of partitioning type candidates, at least one of a position or a partitioning direction of a diagonal line partitioning a coding block or a size of prediction units may be determined.

In an example, in an example shown in FIG. 25, Asym_triangle_index represents an index specifying a partitioning type of a coding block when asymmetric partitioning is applied.

Table 3 represents a structure of a syntax table including information for determining a partition type of a coding block.

TABLE 3

| | Descriptor |
|---|---|
| coding_unit( x0, y0, cbWidth, cbHeight, treeType ) { | |
| ... | |
| } else { /* MODE_INTER */ | |
|   if( cu_skip_flag[ x0 ][ y0 ] ) { | |
|     if( sps_affine_enabled_flag && cbWidth >= 8 && cbHeight >= 8 && | |
|       ( MotionModelIdc[ x0 − 1 ][ y0 + cbHeight − 1 ] != 0 \|\| | |
|         MotionModelIdc[ x0 − 1 ][ y0 + cbHeight ] != 0 \|\| | |
|         MotionModelIdc[ x0 − 1 ][ y0 − 1 ] != 0 \|\| | |
|         MotionModelIdc[ x0 + cbWidth − 1 ][ y0 − 1 ] != 0 \|\| | |
|         MotionModelIdc[ x0 + cbWidth ][ y0 − 1 ]] != 0 ) ) | |
|       merge_affine_flag[ x0 ][ y0 ] | ae(v) |
|     if(sps_triangle_enabled_flag && | |
|       merge_affine_flag[ x0 ][ y0 ] = = 0 && cbWidth + cbHeight > 12 ) | |
|       merge_triangle_flag[ x0 ][ y0 ] | ae(v) |
|     if( merge_triangle_flag [ x0 ][ y0 ] = = 1 ) | |
|       isSymTriangle_flag | ae(v) |
|       if( isSymTriangle_flag ) | |
|         triangle_partition_type_flag | ae(v) |
|       else { | |
|         Asym_traingle_index | ae(v) |
|     } | |
|     if( merge_affine_flag[ x0 ] [ y0 ] = = 0 && | |
|       merge_triangle_flag[ x0 ][ y0 ] = = 0 && MaxNumMergeCand > 1 ) | |
|       merge_idx[ x0 ] [ y0 ] | ae(v) |
|   } else { | |
|     merge_flag[ x0 ][ y0 ] | ae(v) |
|     if( merge_flag[ x0 ][ y0 ] ) { | |
|       if ( sps_affine_enabled_flag && cbWidth >= 8 && cbHeight >= 8 && | |
|         ( MotionModelIdc[ x0 − 1 ][ y0 + cbHeight − 1 ] != 0 \|\| | |

TABLE 3-continued

| | Descriptor |
|---|---|
|       MotionModelIdc[ x0 − 1 ][ y0 + cbHeight ] != 0 \|\| | |
|       MotionModelIdc[ x0 − 1 ][ y0 − 1 ] != 0 \|\| | |
|       MotionModelIdc[ x0 + cbWidth − 1 ][ y0 − 1 ] !=0 \|\| | |
|       MotionModelIdc[ x0 + cbWidth ][ y0 − 1 ]] != 0 ) ) | |
|     merge_affine_flag[ x0 ][ y0 ] | ae(v) |
|   if(slice_type == B && sps_triangle_enabled_flag && | |
|     merge_affine_flag[ x0 ][ y0 ] == 0 && cbWidth + cbHeight > 12 ) | |
|     merge_triangle_flag[ x0 ][ y0 ] | ae(v) |
|   if( merge_triangle_flag [ x0 ][ y0 ] == 1 ) | |
|     isSymTriangle_flag | ae(v) |
|   if( merge_triangle_flag [ x0 ][ y0 ] == 1 ) | |
|     isSymTriangle_flag | ae(v) |
|     if( isSymTriangle_flag ) | |
|       triangle_partition_type_flag | ae(v) |
|     else { | |
|       Asym_traingle_index | ae(v) |
|     } | |
|     merge_idx[ x0 ][ y0 ] | ae(v) |
|   } else { | |
|     ... | |

Information specifying a position of a start point and/or an end point of a diagonal line partitioning a coding block may be signaled in a bitstream. In an example, when a diagonal line that at least one of a start point or an end point does not pass a corner of a coding block is used, information for specifying a position of a boundary which meet with a start point or an end point may be signaled in a bitstream.

FIG. 26 is a diagram showing a partitioning aspect of a coding block according to a syntax value.

Information for specifying a position of at least one of a start point or an end point of a diagonal line partitioning a coding block may be signaled in a bitstream. In an example, a syntax, triangle_partition_type_flag, may be signaled in a bitstream. A syntax, triangle_partition_type_flag, represents whether a diagonal line that at least one of a start point or an end point does not pass a corner of a coding block adjoins a top boundary, a bottom boundary, a right boundary or a left boundary of a coding block.

In an example, when a value of a syntax, triangle_partition_type_flag, is 0, it represents that a diagonal line partitioning a coding block passes the center of a top boundary of a coding block. When a value of a syntax, triangle_partition_type_flag, is 1, it represents that a diagonal line partitioning a coding block passes the center of a bottom boundary of a coding block. When a value of a syntax, triangle_partition_type_flag, is 2, it represents that a diagonal line partitioning a coding block passes the center of a right boundary of a coding block. When a value of a syntax, triangle_partition_type_flag, is 3, it represents that a diagonal line partitioning a coding block passes the center of a left boundary of a coding block.

Information representing whether a width of a first prediction unit is greater than a width of a second prediction unit may be signaled in a bitstream. In an example, whether a width of a first prediction unit is greater than a width of a second prediction unit may be determined through a syntax, left_diag_flag.

When a value of a syntax, left_diag_flag, is 0, it represents that a width of a first prediction unit is smaller than a width of a second prediction unit. When a value of a syntax, left_diag_flag, is 1, it represents that a width of a first prediction unit is greater than a width of a second prediction unit.

A partitioning type of a coding block may be derived by a combination of a syntax, triangle_partition_type_flag, and a syntax, left_diag_flag.

Table 4 represents a structure of a syntax table including information for determining a partition type of a coding block.

TABLE 4

| | Descriptor |
|---|---|
| coding_unit( x0, y0, cbWidth, cbHeight, treeType ) { | |
|   ... | |
|   } else { /* MODE_INTER */ | |
|     if( cu_skip_flag[ x0 ][ y0 ] ) { | |
|       if ( sps_affine_enabled_flag && cbWidth >= 8 && cbHeight >= 8 && | |
|         ( MotionModelIdc[ x0 − 1 ][ y0 + cbHeight − 1 ] != 0 \|\| | |
|           MotionModelIdc[ x0 − 1 ][ y0 + cbHeight ] != 0 \|\| | |
|           MotionModelIdc[ x0 − 1 ][ y0 − 1 ] != 0 \|\| | |
|           MotionModelIdc[ x0 + cbWidth − 1 ][ y0 − 1 ] != 0 \|\| | |
|           MotionModelIdc[ x0 + cbWidth ][ y0 − 1 ]] != 0 ) ) | |
|       merge_affine_flag[ x0 ][ y0 ] | ae(v) |
|     if(slice_type == B && sps_triangle_enabled_flag && | |
|       merge_affine_flag[ x0 ][ y0 ] == 0 && cbWidth + cbHeight > 12 ) | |
|       merge_triangle_flag[ x0 ][ y0 ] | ae(v) |
|     if( merge_triangle_flag [ x0 ][ y0 ] == 1 ) | |
|       isSymTriangle_flag | ae(v) |

TABLE 4-continued

| | Descriptor |
|---|---|
|       if( isSymTriangle_flag ) | |
|         triangle_partition_type_flag | u(1) |
|       else { | |
|         Asym_triangle_type_index | ae(v) |
|         left_diag_flag | u(1) |
|       } | |
|           if( merge_affine_flag[ x0 ][ y0 ] = = 0 && | |
|       merge_triangle_flag[ x0 ][ y0 ] = = 0 && MaxNumMergeCand > 1 ) | |
|         merge_idx[ x0 ][ y0 ] | ae(v) |
|  } else { | |
|   merge_flag[ x0 ][ y0 ] | ae(v) |
|   if( merge_flag[ x0 ][ y0 ] ) { | |
|     if ( sps_affine_enabled_flag && cbWidth >= 8 && cbHeight >= 8 && | |
|       ( MotionModelIdc[ x0 − 1 ][ y0 + cbHeight − 1 ] != 0 \|\| | |
|        MotionModelIdc[ x0 − 1 ][ y0 + cbHeight ] != 0 \|\| | |
|        MotionModelIdc[ x0 − 1 ][ y0 − 1 ] != 0 \|\| | |
|        MotionModelIdc[ x0 + cbWidth − 1 ][ y0 − 1 ] != 0 \|\| | |
|        MotionModelIdc[ x0 + cbWidth ][ y0 − 1 ]] != 0 ) ) | |
|       merge_affine_flag[ x0 ][ y0 ] | ae(v) |
|     if(sps_triangle_enabled_flag && | |
|       merge_affine_flag[ x0 ][ y0 ] = = 0 && cbWidth + cbHeight > 12 ) | |
|       merge_triangle_flag[ x0 ][ y0 ] | ae(v) |
|   if( merge_triangle_flag [ x0 ][ y0 ] = = 1 ) | |
|     isSymTriangle_flag | ae(v) |
|   if( merge_triangle_flag [ x0 ][ y0 ] = = 1 ) | |
|     isSymTriangle_flag | ae(v) |
|   if( isSymTriangle_flag ) | |
|     triangle_partition_type_flag | u(1) |
|   else { | |
|     Asym_triangle_type_index | ae(v) |
|     left_diag_flag | u(1) |
|   } | |
|     merge_idx[ x0 ][ y0 ] | ae(v) |
|  } else { | |
|   ... | |

Each of prediction units generated by partitioning a coding block is referred to as 'the N-th prediction unit'. In an example, in an example shown in FIG. 24, PU1 may be defined as the first prediction unit and PU2 may be defined as the second prediction unit. The first prediction unit may mean a prediction unit which includes a sample at a bottom-left position or a sample at a top-left position in a coding block and the second prediction unit may mean a prediction unit which includes a sample at a top-right position or a sample at a bottom-right position in a coding block.

Conversely, a prediction unit which includes a sample at a top-right position or a sample at a bottom-right position in a coding block may be defined as the first prediction unit and a prediction unit which includes a sample at a bottom-left position or a sample at a top-left position in a coding block may be defined as the second prediction unit.

When a coding block is partitioned by using a horizontal line, a vertical line, a diagonal line or an oblique line, it may be referred to as prediction unit partitioning. A prediction unit generated by applying the prediction unit partitioning may be referred to as a triangular prediction unit, a quadrangular prediction unit or a pentagonal prediction unit according to its shape.

In the embodiments in below, it will be assumed that a coding block is partitioned by using a diagonal line. In particular, when a coding block is partitioned into two prediction units by using a diagonal line, it is referred to as diagonal partitioning or triangular partitioning. But, even when a coding block is partitioned by using an oblique line with an angle different from a vertical line, a horizontal line or a diagonal line, prediction units may be encoded/decoded according to the below-described embodiments. In other words, matters related to the encoding/decoding of the below-described triangular prediction unit may be also applied to the encoding/decoding of a quadrangular prediction unit or a pentagonal prediction unit.

Whether prediction unit partitioning will be applied to a coding block may be determined based on at least one of a slice type, the maximum number of merge candidates which may be included in a merge candidate list, a size of a coding block, a shape of a coding block, a prediction encoding mode of a coding block, a partitioning aspect of a parent node or a size of a parallel processing region.

In an example, whether prediction unit partitioning will be applied to a coding block may be determined based on whether a current slice is a B type. Prediction unit partitioning may be allowed only when a current slice is a B type.

Alternatively, whether prediction unit partitioning will be applied to a coding block may be determined based on whether the maximum number of merge candidates included in a merge candidate list is equal to or greater than 2. Prediction unit partitioning may be allowed only when the maximum number of merge candidates included in a merge candidate list is equal to or greater than 2.

Alternatively, when a VPDU is defined as N×N, a disadvantage occurs that an N×N sized data processing unit is redundantly accessed when at least one of a width or a height is greater than N in hardware implementation. Accordingly, when at least one of a width or a height of a coding block is greater than a threshold value N, it may not be allowed to partition a coding block into a plurality of prediction units. In this case, N may be a positive integer which is a multiple of 2. In an example, N may be 64.

In an example, when at least one of a height or a width of a coding block is greater than 64 (e.g., when at least one of a width or a height is 128), prediction unit partitioning may not be used. For example, when a coding block has a 128×M or M×128 shape, prediction unit partitioning may not be applied. In this case, M represents an integer which is the same as or smaller than 128.

Alternatively, by considering the maximum number of samples which may be simultaneously processed by implemented hardware, prediction unit partitioning may not be allowed for a coding block that the number of samples is greater than a threshold value. In an example, prediction unit partitioning may not be allowed for a coding tree block that the number of samples is greater than 4096.

Alternatively, when at least one of a width or a height of a coding block is equal to or greater than a threshold value, prediction unit partitioning may not be allowed. In this case, a threshold value may be a value which is predefined in an encoder and a decoder. Alternatively, information for determining a threshold value may be signaled in a bitstream.

Alternatively, prediction unit partitioning may not be allowed for a coding block that the number of samples included in a coding block is smaller than a threshold value. In an example, when the number of samples included in a coding block is smaller than 64, prediction unit partitioning may be set not to be applied to a coding block.

Alternatively, whether prediction unit partitioning will be applied to a coding block may be determined by comparing a width and height ratio of a coding block with a threshold value. In this case, a width and height ratio of a coding block, whRatio, may be determined as a ratio of a width CbW and a height CbH of a coding block as in the following Equation 5.

$$whRatio = CbW/CbH \quad \text{[Equation 5]}$$

A width and height ratio, whRatio, may be derived by swapping a position of a denominator and a numerator in Equation 5. A smaller value of CbW and CbH may be substituted for a numerator and a larger value may be substituted for a denominator.

When a width and height ratio of a coding block is equal to or greater than a threshold value or satisfies a preset range, prediction unit partitioning may be allowed or may not be allowed. In an example, when a threshold value is 16, prediction unit partitioning may not be applied to a 64×4 or 4×64 sized coding block.

Alternatively, based on a partitioning type of a parent node, whether prediction unit partitioning is allowed may be determined. In an example, when a coding block, a parent node, is partitioned based on quad tree partitioning, prediction unit partitioning may be applied to a coding block, a leaf node. On the other hand, when a coding block, a parent node, is partitioned based on binary tree or triple tree partitioning, prediction unit partitioning may be set to be unallowable for a coding block, a leaf node.

Alternatively, based on a prediction encoding mode of a coding block, whether prediction unit partitioning is allowed may be determined. In an example, prediction unit partitioning may be allowed only when a coding block is encoded by intra prediction, when a coding block is encoded by inter prediction or when a coding block is encoded by a predefined inter prediction mode. In this case, a predefined inter prediction mode may include at least one of a merge mode, a motion vector prediction mode, an affine merge mode or an affine motion vector prediction mode.

Alternatively, based on a size of a parallel processing region, whether prediction unit partitioning is allowed may be determined. In an example, when a size of a coding block is greater than that of a parallel processing region, prediction unit partitioning may not be used.

Alternatively, prediction unit partitioning may be allowed only when a coding block has a square shape. When a coding block has a non-square shape, prediction unit partitioning may not be applied.

Alternatively, whether diagonal partitioning is allowed may be determined based on whether a coding block is encoded by intra prediction or whether a coding block is encoded by inter prediction.

Alternatively, whether diagonal partitioning is allowed may be determined based on whether a coding block is encoded by a specific inter prediction mode (e.g., at least one of a merge mode, an AMVP mode, an ATMVP mode or an affine mode).

By considering two or more of the above-enumerated conditions, whether prediction unit partitioning will be applied to a coding block may be determined.

In another example, information representing whether prediction unit partitioning will be applied to a coding block may be signaled in a bitstream. The information may be signaled at a sequence, a picture, a slice or a block level.

For example, a flag, triangle_partition_flag, representing whether prediction unit partitioning is applied to a coding block, may be signaled at a coding block level.

Alternatively, a flag representing whether prediction unit partitioning is allowed may be signaled for a sequence, a picture, a slice or a coding tree unit.

When it is determined to apply prediction unit partitioning to a coding block, information representing the number, a direction or a position of lines partitioning a coding block may be signaled in a bitstream.

In an example, when a coding block is partitioned by a diagonal line, information representing a direction of a diagonal line partitioning a coding block may be signaled in a bitstream. In an example, a flag, triangle_partition_type_flag, representing a partitioning direction, may be signaled in a bitstream. The flag represents whether a coding block is partitioned by a diagonal line connecting a top-left and a bottom-right or whether a coding block is partitioned by a diagonal line connecting a top-right and a bottom-left.

When a coding block is partitioned by a diagonal line connecting a top-left and a bottom-right, it may be referred to as a left triangular partition type and when a coding block is partitioned by a diagonal line connecting a top-right and a bottom-left, it may be referred to as a right triangular partition type. In an example, when a value of the flag is 0, it may represent that a partition type of a coding block is a left triangular partition type and when a value of the flag is 1, it may represent that a partition type of a coding block is a right triangular partition type.

Information representing a partition type of a coding block may be signaled at a coding block level. Accordingly, a partition type may be determined per coding block to which prediction unit partitioning is applied.

In another example, information representing a partition type for a sequence, a picture, a slice, a tile or a coding tree unit may be signaled. In this case, partition types of coding blocks to which diagonal partitioning is applied in a sequence, a picture, a slice, a tile or a coding tree unit may be set the same.

Alternatively, information for determining a partition type for the first coding unit to which prediction unit partitioning is applied in a coding tree unit may be encoded and signaled, and coding units to which prediction unit partitioning is applied for the second or later may be set to use the same partition type as the first coding unit.

In another example, a partition type of a coding block may be determined based on a partition type of a neighboring block. In this case, a neighboring block may include at least one of a neighboring block adjacent to the top-left corner of a coding block, a neighboring block adjacent to the top-right corner, a neighboring block adjacent to the bottom-left corner, a neighboring block positioned at the top, a neighboring block positioned at the left, a co-located block or a neighboring block of a co-located block. In an example, a partition type of a current block may be set the same as a partition type of a neighboring block. Alternatively, a partition type of a current block may be determined based on whether a left triangular partition type is applied to a top-left neighboring block or whether a right triangular partition type is applied to a top-right neighboring block or a bottom-left neighboring block.

To perform motion prediction compensation for the first prediction unit and the second prediction unit, the motion information of each of the first prediction unit and the second prediction unit may be derived. In this case, the motion information of the first prediction unit and the second prediction unit may be derived from merge candidates included in a merge candidate list. To distinguish between a general merge candidate list and a merge candidate list used to derive the motion information of prediction units, a merge candidate list for deriving the motion information of prediction units is referred to as a partitioning mode merge candidate list or a triangular merge candidate list. In addition, a merge candidate included in a partitioning mode merge candidate list is referred to as a partitioning mode merge candidate or a triangular merge candidate. But, applying the above-described method of deriving a merge candidate and the above-described method of constituting a merge candidate list to derive a partitioning mode merge candidate and to constitute a partitioning mode merge candidate list is also included in a scope of the preset disclosure.

Information for determining the maximum number of partitioning mode merge candidates which may be included in a partitioning mode merge candidate list may be signaled in a bitstream. The information may represent a difference between the maximum number of merge candidates which may be included in a merge candidate list and the maximum number of partitioning mode merge candidates which may be included in a partitioning mode merge candidate list.

A partitioning mode merge candidate may be derived from a spatial neighboring block and a temporal neighboring block of a coding block.

FIG. 27 is a diagram showing neighboring blocks used to derive a partitioning mode merge candidate.

A partitioning mode merge candidate may be derived by using at least one of a neighboring block positioned at the top of a coding block, a neighboring block positioned at the left of a coding block or a collocated block included in a picture different from a coding block. A top neighboring block may include at least one of a block including a sample (xCb+CbW−1, yCb−1) positioned at the top of a coding block, a block including a sample (xCb+CbW, yCb−1) positioned at the top of a coding block or a block including a sample (xCb−1, yCb−1) positioned at the top of a coding block. A left neighboring block may include at least one of a block including a sample (xCb−1, yCb+CbH−1) positioned at the left of a coding block or a block including a sample (xCb−1, yCb+CbH) positioned at the left of a coding block. A collocated block may be determined as one of a block including a sample (xCb+CbW, yCb+CbH) adjacent to the top-right corner of a coding block or a block including a sample (xCb/2, yCb/2) positioned at the center of a coding block in a collocated picture.

Neighboring blocks may be searched in a predefined order, and a partitioning mode merge candidate list may be configured with partitioning mode merge candidates according to the predefined order. In an example, a partitioning mode merge candidate may be searched in the order of B1, A1, B0, A0, C0, B2 and C1 to configure a partitioning mode merge candidate list.

When a neighboring block adjacent to a current coding block is encoded by diagonal partitioning, a partitioning merge candidate may be derived based on at least one of a left triangular prediction unit or a right triangular prediction unit in a neighboring block.

FIG. 28 is a diagram for describing an example in which a partitioning merge candidate is derived from a neighboring block encoded by diagonal partitioning.

When a neighboring block includes a plurality of prediction units, a partitioning merge candidate may be derived based on a motion vector of one of a plurality of prediction units.

In an example, in an example shown in FIG. 28 (*a*), when a left neighboring block including sample A1 adjacent to the left of a current coding block is encoded by diagonal partitioning, a partitioning merge candidate may be derived based on a motion vector of right triangular prediction unit P2 adjacent to a current coding block among prediction units included by a left neighboring block. When a top neighboring block including sample B1 adjacent to the top of a current coding block is encoded by diagonal partitioning, a partitioning merge candidate may be derived based on a motion vector of left triangular prediction unit P1 adjacent to a current coding block among prediction units included by a top neighboring block.

Alternatively, in an example shown in FIG. 28 (*b*), when a left neighboring block including sample A1 adjacent to the left of a current coding block is encoded by diagonal partitioning, a partitioning merge candidate may be derived based on a motion vector of right triangular prediction unit P2 adjacent to a current coding block among prediction units included by a left neighboring block. When a top neighboring block including sample B1 adjacent to the top of a current coding block is encoded by diagonal partitioning, a partitioning merge candidate may be derived based on a motion vector of right triangular prediction unit P2 adjacent to a current coding block among prediction units included by a top neighboring block.

Alternatively, a merge candidate may be derived by using a value derived based on a weighted sum operation or an average value of motion vectors of prediction units included in a neighboring block.

Alternatively, a plurality of merge candidates may be derived based on a motion vector of each of a plurality of prediction units included in a neighboring block.

Motion information of a prediction unit may be derived from a partitioning merge candidate. In an example, motion information of a partitioning merge candidate may be set as motion information of a prediction unit.

When a neighboring block is encoded by diagonal partitioning, partitioning direction and motion information of a neighboring block may be applied to a current coding block.

FIG. 29 is a diagram showing an example in which partitioning direction and motion information of a neighboring block is applied to a coding block.

In an example shown in FIG. 29 (a), when a left neighboring block including sample A1 adjacent to the left of a current coding block is encoded by diagonal partitioning, a partitioning direction of a current coding block may be set the same as a partitioning direction of a left neighboring block. In an example, when a left neighboring block is partitioned based on a diagonal line connecting the top-left and the bottom-right of a left neighboring block (hereinafter, referred to as a top-left diagonal line), a coding block may be also partitioned by using a top-left diagonal line.

In addition, motion information of a left triangular prediction unit in a current coding block may be derived based on motion information of a left triangular prediction unit in a left neighboring block (e.g., a motion vector, A1_MVP1) and motion information of a right triangular prediction unit in a current coding block may be derived based on motion information of a right triangular prediction unit in a left neighboring block (e.g., a motion vector, A1_MVP2). In an example, a motion vector of a left triangular prediction unit in a current coding block may be set the same as A1_MVP1, motion information of a left triangular prediction unit in a left neighboring block, and a motion vector of a right triangular prediction unit in a current coding block may be set the same as A1_MVP2, a motion vector of a right triangular prediction unit in a left neighboring block.

In an example shown in FIG. 29 (b), when a top neighboring block including sample B1 adjacent to the top of a current coding block is encoded by diagonal partitioning, a partitioning direction of a current coding block may be set the same as a partitioning direction of a top neighboring block. In an example, when a top neighboring block is partitioned based on a diagonal line connecting the top-right and the bottom-left of a top neighboring block (hereinafter, referred to as a top-right diagonal line), a coding block may be also partitioned by using a top-right diagonal line.

In addition, motion information of a left triangular prediction unit in a current coding block may be derived based on motion information of a left triangular prediction unit in a top neighboring block (e.g., a motion vector, B1_MVP1) and motion information of a right triangular prediction unit in a current coding block may be derived based on motion information of a right triangular prediction unit in a top neighboring block (e.g., a motion vector, B1_MVP2). In an example, a motion vector of a left triangular prediction unit in a current coding block may be set the same as B1_MVP1, motion information of a left triangular prediction unit in a top neighboring block, and a motion vector of a right triangular prediction unit in a current coding block may be set the same as B1_MVP2, a motion vector of a right triangular prediction unit in a top neighboring block.

A merge candidate may include partitioning direction and motion information of a neighboring block.

In another example, when a neighboring block adjacent to a current coding block or a collocated block included in a collocated picture is encoded by diagonal partitioning, a corresponding block may be determined to be unavailable as a merge candidate.

Prediction units may have different motion information, respectively. In an example, motion information of a left triangular prediction unit and a right triangular prediction unit may be independently determined.

Motion information of prediction units may be derived based on a partitioning mode merge candidate list including a spatial merge candidate and/or a temporal merge candidate. Prediction units in a current coding block may share one partitioning mode merge candidate list. In this case, partitioning merge candidates may be derived based on a rectangular coding block including a first prediction unit and/or a second prediction unit. The maximum number of partitioning merge candidates which may be included by a partitioning mode merge candidate list may be differently set.

Whether diagonal partitioning is applied may be determined according to a pre-defined encoding/decoding condition. In an example, diagonal partitioning may not be applied to a rectangular block whose width and/or height is a threshold value or diagonal partitioning may be partially applied to part of a rectangular block. Concretely, diagonal partitioning may not be applied to an 8×4 or 4×8 sized block. Alternatively, diagonal partitioning is applied to an 8×4 or 4×8 sized block, but only unidirectional prediction (e.g., Uni-L0 and/or Uni-L1) may be set to be possible.

When only unidirectional prediction is allowed for prediction units generated by diagonal partitioning, only arbitrary unidirectional motion information may be set to be used among bidirectional motion information of a merge candidate.

In an example, when an even-numbered merge candidate in a partitioning merge candidate list (e.g., a merge candidate whose index is an even number) has bidirectional motion information, only first directional motion information of a corresponding merge candidate may be used for a prediction unit. When an odd-numbered merge candidate in a partitioning merge candidate list (e.g., a merge candidate whose index is an odd number) has bidirectional motion information, only second directional motion information of a corresponding merge candidate may be used for a prediction unit. A first direction represents one of an L0 and L1 direction and a second direction represents the other.

Alternatively, unidirectional motion information which may be used by a prediction unit may be determined by considering an output order of an L0 reference picture and an L1 reference picture. In an example, it is possible to compare a difference between POC of an L0 reference picture of a merge candidate and POC of a current picture with a difference between POC of an L1 reference picture of a merge candidate and POC of a current picture and then unidirectional motion information using a reference picture with a smaller difference among those differences may be set available. In more detail, when an absolute value of a POC difference between POC of a current picture and POC of an L0 reference picture is smaller than an absolute value of a POC difference between POC of a current picture and POC of an L1 reference picture, L0 motion information may be used as a merge candidate.

When a POC difference for an L0 reference picture is the same as a POC difference for an L1 reference picture, L0 motion information or L1 motion information may be fixedly used.

In another example, unidirectional motion information which may be used by a prediction unit may be determined by considering a temporal ID (TID) of an L0 and an L1 reference picture. In an example, it is possible to compare a difference between TID of an L0 reference picture of a merge candidate and TID of a current picture with a difference between TID of an L1 reference picture of a merge candidate and TID of a current picture and then unidirectional motion information which using a reference picture with a smaller difference among those differences may set to be available. In more detail, when an absolute value of a TID difference between TID of a current picture and TID of an L0 reference picture is smaller than an absolute value of a TID difference between TID of a current picture and TID of an L1 reference picture, L0 motion information may be used as a merge candidate.

When a TID difference for an L0 reference picture is the same as a TID difference for an L1 reference picture, L0 motion information or L1 motion information may be fixedly used.

A partitioning merge candidate list may be reconfigured by using available unidirectional motion information. A partitioning merge candidate having bidirectional motion information in a partitioning merge candidate list may be reconfigured as a partitioning merge candidate having unidirectional motion information. In an example, a partitioning merge candidate having bidirectional motion information may be changed into a partitioning merge candidate having L0 motion information or a partitioning merge candidate having L1 motion information. Alternatively, a partitioning merge candidate having bidirectional motion information may be divided into a partitioning merge candidate having L0 motion information and a partitioning merge candidate having L1 motion information.

In an example, in an example shown in FIG. 27, when partitioning merge candidates are derived by searching neighboring blocks in an order of A0, B0, B1, A1 and B2, each unidirectional motion information of each neighboring block may be set as a partitioning merge candidate. In other words, a merge candidate may be derived in the following order.

A0.MvL0→A0.MvL1→B0.MvL0→B0.MvL1→B1.MvL0→B1.MvL1→A1.MvL0→A1.MvL1→B2.MvL0→B2.MvL1

In this case, pruning between partitioning merge candidates may be performed so that the same unidirectional motion information will not exist.

Bidirectional prediction may be set not to be performed for prediction units. Whether bidirectional prediction is allowed may be determined based on a size and/or a shape of a coding block including prediction units. In an example, when a coding block has a 4×8 or 8×4 size, it may not be allowed to perform bidirectional prediction for prediction units.

When bidirectional direction is not allowed and a partitioning merge candidate has bidirectional motion information, unidirectional motion information may be selected based on at least one of an output order (e.g., POC) difference or a TID difference between an L0 reference picture and an L1 reference picture. Alternatively, a partitioning merge candidate having bidirectional motion information may be reconfigured as a partitioning merge candidate having unidirectional motion information.

To derive the motion information of a prediction unit, information for specifying at least one of partitioning mode merge candidates included in a partitioning mode merge candidate list may be signaled in a bitstream. In an example, index information, merge_triangle_idx, for specifying at least one of partitioning mode merge candidates may be signaled in a bitstream.

Only index information for any one of the first prediction unit and the second prediction unit may be signaled and an index of a merge candidate for the other of the first prediction unit and the second prediction unit may be determined based on the index information.

In an example, merge_triangle_idx, an index for specifying a partitioning merge candidate for a first prediction unit, may be signaled. A syntax, merge_triangle_idx, may represent an index of any one of partitioning mode merge candidates.

When a merge candidate of a first prediction unit is specified based on the merge_triangle_idx, a merge candidate of a second prediction unit may be specified based on a merge candidate of a first prediction unit. In an example, a merge candidate of a second prediction unit may be derived by adding or subtracting an offset to or from an index of a merge candidate of a first prediction unit. An offset may be an integer such as 1 or 2. In an example, a merge candidate of a second prediction unit may have a value adding 1 to an index N of a merge candidate of a first prediction unit as an index.

When an index of a merge candidate of a first prediction unit has the largest index value among partitioning mode merge candidates, a partitioning mode merge candidate whose index is 0 or a partitioning mode merge candidate which has a value subtracting 1 from an index of a merge candidate of a first prediction unit as an index may be determined as a merge candidate of a second prediction unit.

Alternatively, the motion information of the second prediction unit may be derived from a partitioning mode merge candidate with the same reference picture as a partitioning mode merge candidate of the first prediction unit specified by index information. In this case, a partitioning mode merge candidate with the same reference picture as a partitioning mode merge candidate of the first prediction unit may represent a partitioning mode merge candidate that at least one of a L0 reference picture or a L1 reference picture is the same as a partitioning mode merge candidate of the first prediction unit. When there are a plurality of partitioning mode merge candidates with the same reference picture as a partitioning mode merge candidate of the first prediction unit, any one may be selected based on at least one of whether a merge candidate includes bi-directional motion information or a difference value between an index of a merge candidate and index information.

In another example, index information may be signaled for each of the first prediction unit and the second prediction unit. In an example, the first index information, 1st_merge_idx, for determining a partitioning mode merge candidate of the first prediction unit, and the second index information, 2nd_merge_idx, for determining a partitioning mode merge candidate of the second prediction unit, may be signaled in a bitstream. The motion information of the first prediction unit may be derived from a partitioning mode merge candidate determined based on the first index information, 1st_merge_idx, and the motion information of the second prediction unit may be derived from a partitioning mode merge candidate determined based on the second index information, 2nd_merge_idx.

The first index information, 1st_merge_idx, may represent an index of one of partitioning mode merge candidates included in a partitioning mode merge candidate list. A partitioning mode merge candidate of the first prediction unit may be determined as a partitioning mode merge candidate indicated by the first index information, 1st_merge_idx.

A partitioning mode merge candidate indicated by the first index information, 1st_merge_idx, may be set to be unavailable as a partitioning mode merge candidate of the second prediction unit. Accordingly, the second index information of the second prediction unit, 2nd_merge_idx, may represent an index of any one of remaining partitioning mode merge candidates except for a partitioning mode merge candidate indicated by the first index information. When a value of the second index information, 2nd_merge_idx, is smaller than that of the first index information, 1st_merge_idx, a partitioning mode merge candidate of the second prediction unit may be determined as a partitioning mode merge candidate having index information represented by the second index information, 2nd_merge_idx. On the other hand, when a value of the second index information, 2nd_merge_idx, is the same as or greater than that of the first index information, 1st_merge_idx, a partitioning mode merge candidate of the second prediction unit may be determined as a partitioning mode merge candidate having a value obtained by adding 1 to a value of the second index information, 2nd_merge_idx, as an index.

Alternatively, according to the number of partitioning mode merge candidates included in a partitioning mode merge candidate list, whether the second index information is signaled or not may be determined. In an example, when the maximum number of partitioning mode merge candidates which may be included in a partitioning mode merge candidate list does not exceed 2, the signaling of the second index information may be omitted. When the signaling of the second index information is omitted, the second partitioning mode merge candidate may be derived by adding or subtracting an offset to or from the first index information. In an example, when the maximum number of partitioning mode merge candidates which may be included in a partitioning mode merge candidate list is 2 and the first index information indicates an index of 0, the second partitioning mode merge candidate may be derived by adding 1 to the first index information. Alternatively, when the maximum number of partitioning mode merge candidates which may be included in a partitioning mode merge candidate list is 2 and the first index information indicates 1, the second partitioning mode merge candidate may be derived by subtracting 1 from the first index information.

Alternatively, when the signaling of the second index information is omitted, the second index information may be inferred as a default value. In this case, a default value may be 0. The second partitioning mode merge candidate may be derived by comparing the first index information with the second index information. In an example, when the second index information is smaller than the first index information, a merge candidate whose index is 0 may be set as the second partitioning mode merge candidate and when the second index information is the same as or greater than the first index information, a merge candidate whose index is 1 may be set as the second partitioning mode merge candidate.

When a partitioning mode merge candidate has unidirectional motion information, the unidirectional motion information of a partitioning mode merge candidate may be set as the motion information of a prediction unit. On the other hand, when a partitioning mode merge candidate has bidirectional motion information, only one of L0 motion information or L1 motion information may be set as the motion information of a prediction unit. Which of L0 motion information or L1 motion information will be taken may be determined based on an index of a partitioning mode merge candidate or the motion information of the other prediction unit.

In an example, when an index of a partitioning mode merge candidate is an even number, the L0 motion information of a prediction unit may be set to be 0 and the L1 motion information of a partitioning mode merge candidate may be set as the L1 motion information of a prediction unit. On the other hand, when an index of a partitioning mode merge candidate is an odd number, the L1 motion information of a prediction unit may be set to be 0 and the L0 motion information of a partitioning mode merge candidate may be set to be 0. Conversely, when an index of a partitioning mode merge candidate is an even number, the L0 motion information of a partitioning mode merge candidate may be set as the L0 motion information of a prediction unit and when an index of a partitioning mode merge candidate is an odd number, the L1 motion information of a partitioning mode merge candidate may be set as the L1 motion information of a prediction unit. Alternatively, for a first prediction unit, the L0 motion information of a partitioning mode merge candidate may be set as the L0 motion information of the first prediction unit when a partitioning mode merge candidate for the first prediction unit is an even number, but, for a second prediction unit, the L1 motion information of a partitioning mode merge candidate may be set as the L1 motion information of the second prediction unit when a partitioning mode merge candidate for the second prediction unit is an odd number.

Alternatively, when the first prediction unit has L0 motion information, the L0 motion information of the second prediction unit may be set to be 0 and the L1 motion information of a partitioning mode merge candidate may be set as the L1 information of the second prediction unit. On the other hand, when the first prediction unit has L1 motion information, the L1 motion information of the second prediction unit may be set to be 0 and the L0 motion information of a partitioning mode merge candidate may be set as the L0 motion information of the second prediction unit.

The number or a range of merge candidates which may be used by a first prediction unit and a second prediction unit may be differently determined.

In an example, motion information of a left triangular prediction unit may be derived based on a merge candidate derived from a left neighboring block. Motion information of a right triangular prediction unit may be derived based on a merge candidate derived from a top neighboring block.

Alternatively, a partitioning merge candidate derived from a left neighboring block among partitioning merge candidates included by a partitioning merge candidate list may be set to be unavailable for a right triangular prediction unit. A partitioning merge candidate derived from a top neighboring block may be set to be unavailable for a left triangular prediction unit.

FIG. 30 is a diagram for explaining an example in which the availability of a neighboring block is determined per prediction unit.

A neighboring block which is not adjacent to a first prediction unit may be set to be unavailable for a first prediction unit and a neighboring block which is not adjacent to a second prediction unit may be set to be unavailable for a second prediction unit.

In an example, as in an example shown in FIG. 30 (a), when a left triangular partition type is applied to a coding block, it may be determined that while block A1, A0 and A2 adjacent to a first prediction unit among neighboring blocks neighboring a coding block are available for a first prediction unit, block B0 and B1 are unavailable for a first prediction unit.

As in an example shown in FIG. 30 (b), when a left triangular partition type is applied to a coding block, it may be determined that while block B0 and B1 adjacent to a second prediction unit are available for a second prediction unit, block A1, A0 and A2 are unavailable for a second prediction unit.

Accordingly, the number of partitioning mode merge candidates which may be used by a prediction unit or a range of partitioning mode merge candidates may be determined based on at least one of a position of a prediction unit or a partitioning type of a coding block.

A partitioning mode merge candidate list for deriving the motion information of the first prediction unit may be set to be different from a partitioning mode merge candidate list for deriving the motion information of the second prediction unit.

In an example, when a partitioning mode merge candidate for deriving the motion information of the first prediction unit in a partitioning mode merge candidate list is specified based on index information for the first prediction unit, the motion information of the second prediction unit may be derived by using a partitioning mode merge list including remaining partitioning mode merge candidates except for the partitioning mode merge candidate indicated by the index information. Concretely, the motion information of the second prediction unit may be derived from one of remaining partitioning mode merge candidates.

Accordingly, the maximum number of partitioning mode merge candidates included in a partitioning mode merge candidate list of the first prediction unit may be different from the maximum number of partitioning mode merge candidates included in a partitioning mode merge candidate list of the second prediction unit. In an example, when a partitioning mode merge candidate list of the first prediction unit includes M merge candidates, a partitioning mode merge candidate list of the second prediction unit may include M−1 merge candidates except for the partitioning mode merge candidate indicated by the index information of the first prediction unit.

In another example, the availability of a neighboring block may be determined by deriving a merge candidate of each prediction unit based on neighboring blocks adjacent to a coding block, but by considering a shape or a position of a prediction unit.

In another example, a merge mode may be applied to only one of the first prediction unit and the second prediction unit. And, the motion information of the other of the first prediction unit and the second prediction unit may be set the same as the motion information of a prediction unit to which the merge mode is applied or may be derived by refining the motion information of a prediction unit to which the merge mode is applied.

In an example, a motion vector and a reference picture index of the first prediction unit may be derived based on a partitioning mode merge candidate, and a motion vector of the second prediction unit may be derived by refining a motion vector of the first prediction unit. In an example, a motion vector of the second prediction unit may be derived by adding or subtracting a refine motion vector {Nx, Ny} to or from a motion vector of the first prediction unit, {(mvD1L0x, mvD1L0y), (mvD1L1x, mvD1L1y1)}. A reference picture index of the second prediction unit may be set the same as a reference picture index of the first prediction unit.

When a motion vector of a first prediction unit is refined, a motion vector of a second prediction unit may be set to be in a specific range from a motion vector of a first prediction unit. In an example, a motion vector horizontal component of a second prediction unit may have a value between (−Nx+mvD1LXx) and (Nx+mvD1LXx) and a motion vector vertical component of a second prediction unit may have a value between (−Ny+mvD1LXy) and (Ny+mvD1LXy). X represents 0 or 1.

Information for determining a refine motion vector representing a difference between a motion vector of the first prediction unit and a motion vector of the second prediction unit may be signaled in a bitstream. The information may include at least one of information representing a size of a refine motion vector or information representing a sign of a refine motion vector.

Alternatively, a sign of a refine motion vector (e.g., Nx and/or Ny) may be derived based on at least one of a position or an index of a prediction unit or a partition type which is applied to a coding block.

When a size of a coding block has a preset size and/or shape, a process in which a motion vector is refined may be omitted. In an example, when a size of a coding block is 4×8 or 8×4, a process in which a motion vector derived from a merge candidate is refined may be omitted. When a process in which a motion vector is refined is omitted, motion information of each prediction unit may be derived from a different partitioning merge candidate.

In another example, a motion vector and a reference picture index of one of the first prediction unit and the second prediction unit may be signaled. A motion vector of the other of the first prediction unit and the second prediction unit may be derived by refining the signaled motion vector.

In an example, based on information signaled in a bitstream, a motion vector and a reference picture index of the first prediction unit may be determined. And, a motion vector of the second prediction unit may be derived by refining a motion vector of the first prediction unit. In an example, a motion vector of the second prediction unit may be derived by adding or subtracting a refine motion vector {Rx, Ry} to or from a motion vector of the first prediction unit. A reference picture index of the second prediction unit may be set the same as a reference picture index of the first prediction unit.

In another example, a merge mode may be applied to only one of the first prediction unit and the second prediction unit. And, the motion information of the other of the first prediction unit and the second prediction unit may be derived based on the motion information of a prediction unit to which the merge mode is applied. In an example, a symmetric motion vector of a motion vector of the first prediction unit may be set as a motion vector of the second prediction unit. In this case, a symmetric motion vector may mean a motion vector which has the same magnitude as a motion vector of the first prediction unit, but has at least one opposite sign of an x-axis or a y-axis component, or a motion vector which has the same magnitude as a scaled vector obtained by scaling a motion vector of the first prediction unit, but has at least one opposite sign of an x-axis or a y-axis component. In an example, when a motion vector of the first prediction unit is (MVx, MVy), a motion vector of the second prediction unit may be set to be (MVx, −MVy), (−MVx, MVy) or (−MVx, −MVy) which is a symmetric motion vector of the motion vector.

In another example, only motion information of any one of a first prediction unit and a second prediction unit may be derived from a merge candidate. Concretely, information representing motion information may be signaled only for any one of a first prediction unit and a second prediction unit and index information for specifying a merge candidate may be signaled for the other.

In an example, a motion vector and a reference picture index of a first prediction unit may be determined by information signaled in a bitstream and motion information of a second prediction unit may be derived based on a merge candidate. In this case, index information for specifying a merge candidate may be also signaled in a bitstream and a motion vector and a reference picture index of a second prediction unit may be derived based on a partitioning merge candidate indicated by index information.

A reference picture index of a prediction unit to which a merge mode is not applied among the first prediction unit and the second prediction unit may be set the same as a reference picture index of a prediction unit to which a merge mode is applied. Alternatively, a reference picture index of a prediction unit to which a merge mode is not applied may be set as a predefined value. In this case, a predefined value may be the smallest index or the largest index in a reference picture list. Alternatively, information specifying a reference picture index of a prediction unit to which a merge mode is not applied may be signaled in a bitstream. Alternatively, a reference picture of a prediction unit to which a merge mode is not applied may be selected from a reference picture list different from a reference picture list to which a reference picture of a prediction unit to which a merge mode is applied belongs. In an example, when a reference picture of a prediction unit to which a merge mode is applied is selected from an L0 reference picture list, a reference picture of a prediction unit to which a merge mode is not applied may be selected from an L1 reference picture list. In this case, a reference picture of a prediction unit to which a merge mode is not applied may be derived based on a picture order count (POC) difference between a reference picture of a prediction unit to which a merge mode is applied and a current picture. In an example, when a reference picture of a prediction unit to which a merge mode is applied is selected from a L0 reference picture list, a reference picture that a difference value with a current picture in a L1 reference picture list is the same as or similar to a difference value between a reference picture of a prediction unit to which a merge mode is applied and a current picture may be selected as a reference picture of a prediction unit to which a merge mode is not applied.

When a picture order count difference value between a reference picture of the first prediction unit and a current picture is different from a picture order count difference value between a reference picture of the second prediction unit and a current picture, a symmetric motion vector of a scaled motion vector of a prediction unit to which a merge mode is applied may be set as a motion vector of a prediction unit to which a merge mode is not applied. In this case, scaling may be performed based on a picture order count difference value between each reference picture and a current picture.

In another example, after deriving a motion vector of each of the first prediction unit and the second prediction unit, a refine vector may be added to or subtracted from a derived motion vector. In an example, a motion vector of the first prediction unit may be derived by adding or subtracting the first refine vector to or from the first motion vector derived based on the first merge candidate and a motion vector of the second prediction unit may be derived by adding or subtracting the second refine vector to or from the second motion vector derived based on the second merge candidate. Information for determining at least one of the first refine vector or the second refine vector may be signaled in a bitstream. The information may include at least one of information for determining a magnitude of a refine vector or information for determining a sign of a refine vector.

The second refine vector may be a symmetric motion vector of the first refine vector. In this case, information for determining a refine vector may be signaled only for one of the first refine vector and the second refine vector. In an example, when the first refine vector is determined to be (MVDx, MVDy) by information signaled in a bitstream, (−MVDx, MVDy), (MVDx, −MVDy) or (−MVDx, −MVDy) which is a symmetric motion vector of the first refine vector may be set as the second refine vector. According to the picture order count of a reference picture of each prediction unit, a symmetric motion vector of a scaled motion vector obtained by scaling the first refine vector may be set as the second refine vector.

In another example, information of one of the first prediction unit and the second prediction unit may be derived based on a merge candidate and the motion information of the other may be determined based on information signaled in a bitstream. In an example, a merge index may be signaled for the first prediction unit and at least one of information for determining a motion vector and information for determining a reference picture may be signaled for the second prediction unit. The motion information of the first prediction unit may be set the same as the motion information of a merge candidate specified by a merge index. The motion information of the second prediction unit may be specified by at least one of information for determining a motion vector signaled in a bitstream and information for determining a reference picture.

A motion prediction compensation prediction for each coding block may be performed based on the motion information of the first prediction unit and the motion information of the second prediction unit. In this case, quality degradation may be generated on the boundary of the first prediction unit and the second prediction unit. In an example, quality continuity may deteriorate around an edge on the boundary of the first prediction unit and the second prediction unit. To reduce quality degradation on the boundary, a prediction sample may be derived by a smoothing filter or a weighted prediction.

A prediction sample in a coding block to which diagonal partitioning is applied may be derived based on a weighted sum operation of the first prediction sample obtained based on the motion information of the first prediction unit and the second prediction sample obtained based on the motion information of the second prediction unit. Alternatively, a prediction sample of the first prediction unit may be derived from the first prediction block determined based on the motion information of the first prediction unit and a prediction sample of the second prediction unit may be derived from the second prediction block determined based on the motion information of the second prediction unit, but a prediction sample on the boundary region of the first prediction unit and the second prediction unit may be derived based on a weighted sum operation of the first prediction sample included in the first prediction block and the second prediction sample included in the second prediction block. In an example, the following Equation 3 represents an example of deriving a prediction sample of the first prediction unit and the second prediction unit.

$$P(x,y)w1*P1(x,y)+(1-w1)*P2(x,y) \quad\quad\quad \text{[Equation 6]}$$

In the Equation 6, P1 represents the first prediction sample and P2 represents the second prediction sample. w1 represents a weight which is applied to the first prediction sample and (1−w1) represents a weight which is applied to the second prediction sample. As in an example shown in Equation 6, a weight which is applied to the second prediction sample may be derived by subtracting a weight which is applied to the first prediction sample from a constant value.

When a left triangular partition type is applied to a coding block, a boundary region may include prediction samples with the same x-axis coordinate and y-axis coordinate. On the other hand, when a right triangular partition type is applied to a coding block, a boundary region may include prediction samples that a sum of an x-axis coordinate and a y-axis coordinate is equal to or greater than the first threshold value and is equal to or less than the second threshold value.

A size of a boundary region may be determined based on at least one of a size of a coding block, a shape of a coding block, the motion information of prediction units, a motion vector difference value of prediction units, a picture order count of a reference picture or a difference value between the first prediction sample and the second prediction sample on a diagonal boundary.

FIGS. 31 and 32 are diagrams showing an example in which a prediction sample is derived based on a weighted sum operation of the first prediction sample and the second prediction sample. FIG. 31 illustrates a case in which a left triangular partition type is applied to a coding block and FIG. 32 illustrates a case in which a right triangular partition type is applied to a coding block. In addition, FIG. 31 (a) and FIG. 32 (a) are diagrams representing a prediction aspect for a luma component and FIG. 31 (b) and the FIG. 32 (b) are diagrams representing a prediction aspect for a chroma component.

In shown diagrams, a number marked on a prediction sample around the boundary of the first prediction unit and the second prediction unit represents a weight which is applied to the first prediction sample. In an example, when a number marked on a prediction sample is N, the prediction sample may be derived by applying a weight of N/8 to the first prediction sample and applying a weight of (1−(N/8)) to the second prediction sample.

In a non-boundary region, the first prediction sample or the second prediction sample may be determined as a prediction sample. Looking at an example in FIG. 31, the first prediction sample derived based on the motion information of the first prediction unit may be determined as a prediction sample in a region belonging to the first prediction unit. On the other hand, the second prediction sample derived based on the motion information of the second prediction unit may be determined as a prediction sample in a region belonging to the second prediction unit.

Looking at an example in FIG. 32, the first prediction sample derived based on the motion information of the first prediction unit may be determined as a prediction sample in a region where a sum of an x-axis coordinate and a y-axis coordinate is smaller than the first threshold value. On the other hand, the second prediction sample derived based on the motion information of the second prediction unit may be determined as a prediction sample in a region where a sum of an x-axis coordinate and a y-axis coordinate is greater than the second threshold value.

A threshold value determining a non-boundary region may be determined based on at least one of a size of a coding block, a shape of a coding block or a color component. In an example, when a threshold value for a luma component is set to be N, a threshold value for a chroma component may be set to be N/2.

Prediction samples included in a boundary region may be derived based on a weighted sum operation of the first prediction sample and the second prediction sample. In this case, weights applied to the first prediction sample and the second prediction sample may be determined based on at least one of a position of a prediction sample, a size of a coding block, a shape of a coding block or a color component.

In an example, as in an example shown in FIG. 31 (a), prediction samples with the same x-axis coordinate and y-axis coordinate may be derived by applying the same weight to the first prediction sample and the second prediction sample. Prediction samples that an absolute value of a difference between an x-axis coordinate and a y-axis coordinate is 1 may be derived by setting a weight ratio applied to the first prediction sample and the second prediction sample as (3:1) or (1:3). In addition, prediction samples that an absolute value of a difference between an x-axis coordinate and a y-axis coordinate is 2 may be derived by setting a weight ratio applied to the first prediction sample and the second prediction sample as (7:1) or (1:7).

Alternatively, as in an example shown in FIG. 31 (b), prediction samples with the same x-axis coordinate and y-axis coordinate may be derived by applying the same weight to the first prediction sample and the second prediction sample and prediction samples that an absolute value of a difference between an x-axis coordinate and a y-axis coordinate is 1 may be derived by setting a weight ratio applied to the first prediction sample and the second prediction sample as (7:1) or (1:7).

In an example, as in an example shown in FIG. 32 (a), prediction samples that a sum of an x-axis coordinate and a y-axis coordinate is smaller than a width or a height of a coding block by 1 may be derived by applying the sample weight to the first prediction sample and the second prediction sample. Prediction samples that a sum of an x-axis coordinate and a y-axis coordinate is the same as or smaller than a width or a height of a coding block by 2 may be derived by setting a weight ratio applied to the first prediction sample and the second prediction sample as (3:1) or (1:3). Prediction samples that a sum of an x-axis coordinate and a y-axis coordinate is greater than a width or a height of a coding block by 1 or smaller than a width or a height of a coding block by 3 may be derived by setting a weight ratio applied to the first prediction sample and the second prediction sample as (7:1) or (1:7).

Alternatively, as in an example shown in FIG. 32 (b), prediction samples that a sum of an x-axis coordinate and a y-axis coordinate is smaller than a width or a height of a coding block by 1 may be derived by applying the sample weight to the first prediction sample and the second prediction sample. Prediction samples that a sum of an x-axis coordinate and a y-axis coordinate is the same as or smaller than a width or a height of a coding block by 2 may be derived by setting a weight ratio applied to the first prediction sample and the second prediction sample as (7:1) or (1:7).

In another example, a weight may be determined by considering a position of a prediction sample or a shape of a coding block. Equation 7 to Equation 9 represent an example in which a weight is derived when a left triangular partition type is applied to a coding block. Equation 7 represents an example of deriving a weight applied to the first prediction sample when a coding block is square.

$$w1=(x-y+4)/8 \qquad \text{[Equation 7]}$$

In Equation 7, x and y represent a position of a prediction sample. When a coding block is non-square, a weight applied to the first prediction sample may be derived as in the following Equation 8 or Equation 9. Equation 8 represents a case in which a width of a coding block is greater than a height and Equation 9 represents a case in which a width of a coding block is smaller than a height.

$$w1=((x/whRatio)-y+4)/8 \qquad \text{[Equation 8]}$$

$$w1=(x-(y*whRatio)+4)/8 \qquad \text{[Equation 9]}$$

When a right triangular partition type is applied to a coding block, a weight applied to a first prediction sample may be determined as in Equation 10 to Equation 12. Equation 10 represents an example in which a weight applied to a first prediction sample is derived when a coding block is square.

$$w1=(CbW-1-x-y)+4)/8 \quad \text{[Equation 10]}$$

In Equation 10, CbW represents a width of a coding block. When a coding block is non-square, a weight applied to a first prediction sample may be derived as in the following Equation 11 or Equation 12. Equation 11 represents a case in which a width of a coding block is greater than a height and Equation 12 represents a case in which a width of a coding block is smaller than a height.

$$w1=(ChH-1-(x/whRatio)-y)+4)/8 \quad \text{[Equation 11]}$$

$$w1=(CbW-1-x-(y*whRatio)+4)/8 \quad \text{[Equation 12]}$$

In Equation 11, CbH represents a height of a coding block.

As in a shown example, prediction samples included in the first prediction unit among prediction samples in a boundary region may be derived by giving a larger weight to the first prediction sample than the second prediction sample and prediction samples included in the second prediction unit among prediction samples in the boundary region may be derived by giving a larger weight to the second prediction sample than the first prediction sample.

When diagonal partitioning is applied to a coding block, a combined prediction mode that an intra prediction mode and a merge mode are combined may be set not to be applied to a coding block.

Alternatively, a different prediction method may be applied to a first prediction unit and a second prediction unit. In an example, a prediction image may be generated by using a merge candidate for a first prediction unit and by using intra prediction for a second prediction unit. Conversely, a prediction image may be generated by using intra prediction for a first prediction unit and by using a merge candidate for a second prediction unit.

Likewise, a prediction method that a prediction method of each prediction unit is differently set may be referred to as a multi-triangular prediction encoding method.

When a multi-triangular prediction encoding method is applied, an intra prediction mode may be forced to be derived from an MPM. In other words, only N MPM modes may be used in a multi-triangular prediction unit encoding method.

Index information for specifying one of MPM candidates may be signaled in a bitstream. Alternatively, a first MPM among MPM candidates may be set as an intra prediction mode.

When a neighboring block is encoded by a multi-triangular prediction encoding method including intra prediction, a neighboring block may be determined to be available in deriving an MPM candidate.

On the other hand, when a neighboring block is encoded by intra prediction, not a multi-triangular prediction encoding method, a neighboring block may be determined to be unavailable in deriving an MPM candidate.

Alternatively, when a multi-triangular prediction encoding method is applied, an intra prediction mode may be forced to be set as a default mode. A default mode may include at least one of intra prediction modes in a planar, DC, horizontal, vertical or diagonal direction.

In another example, it may be set to use intra prediction both in a first prediction unit and a second prediction unit.

In this case, an intra prediction mode of a first prediction unit may be different from that of a second prediction unit.

A prediction block may be derived by performing weighted prediction for prediction samples derived by a different prediction method. In an example, a prediction sample of each prediction unit may be obtained by performing weighted prediction for a first prediction sample derived based on inter prediction and a second prediction sample derived based on intra prediction.

Equation 13 represents an example in which weighted prediction is performed for a prediction sample derived by inter prediction and a prediction sample derived based on intra prediction.

$$P0=w0*P_{intra}(x,y)+(1-w0)*P_{inter}(x,y)$$

$$P1=w1*P_{intra}(x,y)+(1-w1)*P_{inter}(x,y) \quad \text{[Equation 13]}$$

In Equation 13, P0 represents a prediction sample of a first prediction unit and P1 represents a prediction sample of a second prediction unit. $P_{inter}$ represents a prediction sample derived by inter prediction and $P_{intra}$ represents a prediction sample derived by intra prediction. w1 may have a value smaller than w0.

A problem occurs that quality degradation is generated on a boundary of a first prediction unit and a second prediction unit or quality continuity gets worse around an edge. Accordingly, quality degradation may be reduced by applying a smoothing filter and/or weighted prediction, etc. on a boundary of a first prediction unit and a second prediction unit.

When encoding/decoding of a coding block is completed, the motion information of a coding block that encoding/decoding is completed may be stored for the encoding/decoding of a subsequent coding block. Motion information may be stored in a unit of a sub-block with a preset size. In an example, a sub-block with a preset size may have a 4×4 size. Alternatively, according to a size or a shape of a coding block, a size or a shape of a sub-block may be differently determined.

When a sub-block belongs to the first prediction unit, the motion information of the first prediction unit may be stored as the motion information of a sub-block. On the other hand, when a sub-block belongs to the second prediction unit, the motion information of the second prediction unit may be stored as the motion information of a sub-block.

When a sub-block is on the boundary of the first prediction unit and the second prediction unit, any one of the motion information of the first prediction unit and the motion information of the second prediction unit may be set as the motion information of a sub-block. In an example, the motion information of the first prediction unit may be set as the motion information of a sub-block or the motion information of the second prediction unit may be set as the motion information of a sub-block.

In another example, when a sub-block is on the boundary of the first prediction unit and the second prediction unit, any one of L0 motion information and L1 motion information of a sub-block may be derived from the first prediction unit and the other of L0 motion information and L1 motion information of a sub-block may be derived from the second prediction unit. In an example, the L0 motion information of the first prediction unit may be set as the L0 motion information of a sub-block and the L1 motion information of the second prediction unit may be set as the L1 motion information of a sub-block. But, when the first prediction unit and the second prediction unit have only L0 motion information or only L1 motion information, the motion information of a sub-block may be determined by selecting any one of the first prediction unit or the second prediction unit. Alternatively, a motion vector average value of the first prediction unit and the second prediction unit may be set as a motion vector of a sub-block.

The motion information of a coding block that encoding/decoding is completed may be updated in a motion information table. In this case, the motion information of a coding block to which prediction unit partitioning is applied may be set not to be added to a motion information table.

Alternatively, only the motion information of any one of a plurality of prediction units generated by partitioning a coding block may be added to a motion information table. In an example, while the motion information of the first prediction unit may be added to a motion information table, the motion information of the second prediction unit may not be added to a motion information table. In this case, a prediction unit which will be added to a motion information table may be selected based on at least one of a size of a coding block, a shape of a coding block, a size of a prediction unit, a shape of a prediction unit or whether a bidirectional prediction is performed for a prediction unit.

Alternatively, the motion information of each of a plurality of prediction units generated by partitioning a coding block may be added to a motion information table. In this case, the adding order for a motion information table may be predefined in an encoding device and a decoding device. In an example, the motion information of a prediction unit including a top-left sample or a bottom-left corner sample may be added to a motion information table before the motion information of the other prediction unit. Alternatively, the adding order for a motion information table may be determined based on at least one of a merge index or a reference picture index of each prediction unit or a magnitude of a motion vector.

Alternatively, motion information combining the motion information of the first prediction unit and the motion information of the second prediction unit may be added to a motion information table. Any one of L0 motion information and L1 motion information of combined motion information may be derived from the first prediction unit and the other of L0 motion information and L1 motion information may be derived from the second prediction unit.

Alternatively, based on whether a reference picture of the first prediction unit is the same as a reference picture of the second prediction unit, motion information which will be added to a motion information table may be determined. In an example, when a reference picture of the first prediction unit is different from a reference picture of the second prediction unit, the motion information of any one of the first prediction unit and the second prediction unit or motion information combining the first prediction unit and the second prediction unit may be added to a motion information table. On the other hand, when a reference picture of the first prediction unit is the same as a reference picture of the second prediction unit, an average of a motion vector of the first prediction unit and a motion vector of the second prediction unit may be added to a motion information table.

Alternatively, based on a size of a coding block, a shape of a coding block or a partitioning shape of a coding block, a motion vector which will be added to a motion information table may be determined. In an example, when right triangular partitioning is applied to a coding block, the motion information of the first prediction unit may be added to a motion information table. On the other hand, when left triangular partitioning is applied to a coding block, the motion information of the second prediction unit may be added to a motion information table or motion information combining the motion information of the first prediction unit and the motion information of the second prediction unit may be added to a motion information table.

A motion information table for storing the motion information of a coding block to which prediction unit partitioning is applied may be separately defined. In an example, the motion information of a coding block to which prediction unit partitioning is applied may be stored in a partitioning mode motion information table. A partitioning mode motion information table may be referred to as a triangular motion information table. In other words, the motion information of a coding block to which prediction unit partitioning is not applied may be stored in a general motion information table and the motion information of a coding block to which prediction unit partitioning is applied may be stored in a partitioning mode motion information table. Embodiments that motion information of a coding block to which prediction unit partitioning described above is applied is added to a motion information table may be applied for updating a partitioning mode motion information table. In an example, the motion information of the first prediction unit, the motion information of the second prediction unit, motion information combining the motion information of the first prediction unit and the motion information of the second prediction unit and motion information averaging a motion vector of the first prediction unit and a motion vector of the second prediction unit may be added to a partitioning mode motion information table.

When prediction mode partitioning is not applied to a coding block, a merge candidate may be derived by using a general motion information table. On the other hand, when prediction mode partitioning is applied to a coding block, a merge candidate may be derived by using a prediction mode motion information table.

Intra prediction is to predict a current block by using a reconstructed sample which is encoded/decoded around a current block. In this case, a reconstructed sample before an in-loop filter is applied may be used for intra prediction of a current block.

An intra prediction method includes matrix-based intra prediction and general intra prediction considering directivity with a surrounding reconstructed sample. Information indicating an intra prediction method of a current block may be signaled in a bitstream. The information may be a 1-bit flag. Alternatively, an intra prediction method of a current block may be determined based on at least one of a position, a size or a shape of a current block or an intra prediction method of a neighboring block. In an example, when a current block exists across a picture boundary, matrix-based intra prediction may be set not to be applied to a current block.

General intra prediction is a method in which a prediction block for a current block is obtained based on a nondirectional intra prediction mode or a directional intra prediction mode. Hereinafter, a process in which intra prediction is performed based on general intra prediction will be described in more detail by referring to a diagram.

FIG. 33 is a flow diagram of an intra prediction method according to an embodiment of the present disclosure.

A reference sample line of a current block may be determined S3301. A reference sample line means a set of reference samples included in a k-th line spaced from the top and/or the left of a current block. A reference sample may be derived from a reconstructed sample which is encoded/decoded around a current block.

Index information identifying a reference sample line of a current block among a plurality of reference sample lines may be signaled in a bitstream. In an example, intra_luma_ref_idx, index information for specifying a reference sample line of a current block, may be signaled in a bitstream. The index information may be signaled in a unit of a coding block.

A plurality of reference sample lines may include at least one of a first line, a second line, and a third line on the top and/or left of a current block. Among a plurality of reference sample lines, a reference sample line configured with a row adjacent to the top of a current block and a column adjacent to the left of a current block may be referred to as an adjacent reference sample line and other reference sample line may be referred to as a non-adjacent reference sample line.

Table 5 represents an index assigned to each candidate reference sample line.

TABLE 5

| Index (intra_luma_ref_idx) | Reference Sample Line |
|---|---|
| 0 | Adjacent Reference Sample Line |
| 1 | First Non-adjacent Reference Sample Line |
| 2 | Second Non-adjacent Reference Sample Line |

A reference sample line of a current block may be determined based on at least one of a position, a size or a shape of a current block or a prediction encoding mode of a neighboring block. In an example, when a current block adjoins a boundary of a picture, a tile, a slice or a coding tree unit, an adjacent reference sample line may be determined as a reference sample line of a current block. A reference sample line may include top reference samples at a top position of a current block and left reference samples at a left position of a current block. Top reference samples and left reference samples may be derived from reconstructed samples around a current block. The reconstructed samples may be a state before an in-loop filter is applied.

Next, an intra prediction mode of a current block may be determined S3302. For an intra prediction mode of a current block, at least one of a nondirectional intra prediction mode or a directional intra prediction mode may be determined as an intra prediction mode of a current block. A nondirectional intra prediction mode includes planar and DC and a directional intra prediction mode includes 33 or 65 modes from a bottom-left diagonal direction to a top-right diagonal direction.

FIG. 34 is a diagram showing intra prediction modes.

FIG. 34 (a) represents 35 intra prediction modes and FIG. 34 (b) represents 67 intra prediction modes.

More or less intra prediction modes than shown in FIG. 34 may be defined.

An MPM (Most Probable Mode) may be set based on an intra prediction mode of a neighboring block adjacent to a current block. In this case, a neighboring block may include a left neighboring block adjacent to the left of a current block and a top neighboring block neighboring the top of a current block.

The number of MPMs included in an MPM list may be preset in an encoder and a decoder. In an example, the number of MPMs may be 3, 4, 5, or 6. Alternatively, information representing the number of MPMs may be signaled in a bitstream. Alternatively, the number of MPMs may be determined based on at least one of a prediction encoding mode of a neighboring block, or a size, a shape or a reference sample line index of a current block. In an example, while N MPMs may be used when an adjacent reference sample line is determined as a reference sample line of a current block, M MPMs may be used when a non-adjacent reference sample line is determined as a reference sample line of a current block. As M is a natural number smaller than N, in an example, N may be 6 and M may be 5, 4, or 3. Accordingly, while an intra prediction mode of a current block may be determined as any one of 6 candidate intra prediction modes when an index of a reference sample line of a current block is 0 and an MPM flag is true, an intra prediction mode of a current block may be determined as any one of 5 candidate intra prediction modes when an index of a reference sample line of a current block is greater than 0 and an MPM flag is true.

Alternatively, the fixed number (e.g., 6 or 5) of MPM candidates may be used regardless of an index of a reference sample line of a current block.

When matrix-based intra prediction is applied to a neighboring block, an MPM candidate may be derived by considering an intra prediction mode of a neighboring block as a Planar.

When intra BDPCM is applied to a neighboring block, an MPM candidate may be derived by considering an intra prediction mode of a neighboring block as a default mode. In this case, a default mode may be at least one of a DC, a Planar, a vertical direction or a horizontal direction.

Alternatively, based on an intra BDPCM application direction of a neighboring block, an intra prediction mode of a neighboring block may be determined. In an example, when intra BDPCM in a horizontal direction is applied to a neighboring block, an intra prediction mode of a neighboring block may be considered to be in a horizontal direction. On the other hand, when intra BDPCM in a vertical direction is applied to a neighboring block, an intra prediction mode of a neighboring block may be considered to be in a vertical direction.

An MPM list including a plurality of MPMs may be generated and information representing whether the same MPM as an intra prediction mode of a current block is included in an MPM list may be signaled in a bitstream. As the information is a 1-bit flag, it may be referred to as an MPM flag. When the MPM flag represents that the same MPM as a current block is included in a MPM list, index information identifying one of MPMs may be signaled in a bitstream. In an example, mpm_idx, index information specifying any one of a plurality of MPMs, may be signaled in a bitstream. An MPM specified by the index information may be set as an intra prediction mode of a current block. When the MPM flag represents that the same MPM as current block is not included in an MPM list, remaining mode information indicating any one of residual intra prediction modes excluding MPMs may be signaled in a bitstream. Remaining mode information indicates an index value corresponding to an intra prediction mode of a current block when an index is reassigned to remaining intra prediction modes excluding MPMs. MPMs may be arranged in ascending order in a decoder and an intra prediction mode of a current block may be determined by comparing remaining mode information with MPMs. In an example, when remaining mode information is the same as or smaller than an MPM, an intra prediction mode of a current block may be derived by adding 1 to remaining mode information.

When an intra prediction mode of a current block is derived, a comparison between part of MPMs and remaining mode information may be omitted. In an example, MPMs which are a nondirectional intra prediction mode among MPMs may be excluded from a comparison target. When nondirectional intra prediction modes are set as MPMs, it is clear that remaining mode information indicates a directional intra prediction mode, so an intra prediction mode of a current block may be derived by comparing remaining MPMs excluding nondirectional intra prediction modes with remaining mode information. As nondirectional intra prediction modes are excluded from a comparison target, a value derived by adding the number of nondirectional intra prediction modes to remaining mode information may be used to compare with remaining MPMs.

Instead of setting a default mode as an MPM, information representing whether an intra prediction mode of a current block is a default mode may be signaled in a bitstream. The information may be a 1-bit flag and the flag may be referred to as a default mode flag. The default mode flag may be signaled only when an MPM flag represents that the same MPM as a current block is included in an MPM list. As described above, a default mode may include at least one of a Planar, a DC, a vertical direction mode or a horizontal direction mode. In an example, when a planar is set as a default mode, a default mode flag may indicate whether an intra prediction mode of a current block is a planar. When a default mode flag indicates that an intra prediction mode of a current block is not a default mode, one of MPMs indicated by index information may be set as an intra prediction mode of a current block.

When a default mode flag is used, the intra prediction mode same as a default mode may not set as an MPM. In an example, when a default mode flag indicates whether an intra prediction mode of a current block is a planar, an intra prediction mode of a current block may be derived by using 5 MPMs excluding an MPM corresponding to a planar.

When a plurality of intra prediction modes are set as default modes, index information indicating any one of default modes may be further signaled. An intra prediction mode of a current block may be set as a default mode indicated by the index information.

When an index of a reference sample line of a current block is not 0, it may be set not to use a default mode. In an example, when a non-adjacent reference sample line is determined as a reference sample line of a current block, it may be set not to use a nondirectional intra prediction mode such as a DC mode or a planar mode. Accordingly, when an index of a reference sample line is not 0, a default mode flag may not be signaled and a value of the default mode flag may be inferred to a predefined value (i.e., false).

When an intra prediction mode of a current block is determined, prediction samples for a current block may be obtained based on a determined intra prediction mode 53303.

When a DC mode is selected, prediction samples for a current block are generated based on an average value of reference samples. Concretely, a value of all samples in a prediction block may be generated based on an average value of reference samples. An average value may be derived by using at least one of top reference samples at a top position of a current block and left reference samples at a left position of a current block.

According to a shape of a current block, the number or a range of reference samples used to derive an average value may be different. In an example, when a current block is a non-square block that a width is greater than a height, an average value may be calculated by using only top reference samples. On the other hand, when a current block is a non-square block that a width is smaller than a height, an average value may be calculated by using only left reference samples. In other words, when a width and a height of a current block are different, an average value may be calculated by using only reference samples adjacent to the longer side. Alternatively, based on a width and height ratio of a current block, whether an average value will be calculated by using only top reference samples or whether an average value will be calculated by using only left reference samples may be determined.

When a planar mode is selected, a prediction sample may be obtained by using a prediction sample in a horizontal direction and a prediction sample in a vertical direction. In this case, a prediction sample in a horizontal direction is obtained based on a left reference sample and a right reference sample positioned on the same horizontal line as a prediction sample and a prediction sample in a vertical direction is obtained based on a top reference sample and a bottom reference sample positioned on the same vertical line as a prediction sample. In this case, a right reference sample may be generated by copying a reference sample adjacent to a top-right corner of a current block and a bottom reference sample may be generated by copying a reference sample adjacent to a bottom-left corner of a current block. A prediction sample in a horizontal direction may be obtained based on a weighted sum operation of a left reference sample and a right reference sample and a prediction sample in a vertical direction may be obtained based on a weighted sum operation of a top reference sample and a bottom reference sample. In this case, a weight assigned to each reference sample may be determined according to a position of a prediction sample. A prediction sample may be obtained based on an average operation or a weighted sum operation of a prediction sample in a horizontal direction and a prediction sample in a vertical direction. When a weighted sum operation is performed, a weight assigned to a prediction sample in a horizontal direction and a prediction sample in a vertical direction may be determined based on a position of a prediction sample.

When a directional prediction mode is selected, a parameter representing a prediction direction (or a prediction angle) of a selected directional prediction mode may be determined. The following Table 6 represents intraPredAng, an intra directional parameter per intra prediction mode.

TABLE 6

| | PredModeIntra | | | | | | |
|---|---|---|---|---|---|---|---|
| | 1 | 2 | 3 | 4 | 5 | 6 | 7 |
| IntraPredAng | — | 32 | 26 | 21 | 17 | 13 | 9 |
| | PredModeIntra | | | | | | |
| | 8 | 9 | 10 | 11 | 12 | 13 | 14 |
| IntraPredAng | 5 | 2 | 0 | −2 | −5 | −9 | −13 |
| | PredModeIntra | | | | | | |
| | 15 | 16 | 17 | 18 | 19 | 20 | 21 |
| IntraPredAng | −17 | −21 | −26 | −32 | −26 | −21 | −17 |
| | PredModeIntra | | | | | | |
| | 22 | 23 | 24 | 25 | 26 | 27 | 28 |
| IntraPredAng | −13 | −9 | −5 | −2 | 0 | 2 | 5 |
| | PredModeIntra | | | | | | |
| | 29 | 30 | 31 | 32 | 33 | 34 | |
| IntraPredAng | 9 | 13 | 17 | 21 | 26 | 32 | |

Table 6 represents an intra directional parameter of each intra prediction mode whose index is one of 2 to 34 when 35 intra prediction modes are defined. When 33 or more directional intra prediction modes are defined, an intra directional parameter of each directional intra prediction mode may be set by further subdividing Table 6. A prediction sample may be obtained based on a value of an intra directional parameter after arranging top reference samples and left reference samples of a current block in a line. In this case, when a value of an intra directional parameter is a negative number, left reference samples and top reference samples may be arranged in a line.

FIGS. 35 and 36 are diagrams showing an example of a one-dimensional array which arranges reference samples in a line.

FIG. 35 shows an example of a one-dimensional array in a vertical direction which arranges reference samples in a vertical direction and FIG. 36 shows an example of a one-dimensional array in a horizontal direction which arranges reference samples in a horizontal direction. Embodiments of FIGS. 35 and 36 are described by assuming a case in which 35 intra prediction modes are defined.

When an intra prediction mode index is one of 11 to 18, a one-dimensional array in a horizontal direction which rotates top reference samples counterclockwise may be applied and when an intra prediction mode index is one of 19 to 25, a one-dimensional array in a vertical direction which rotates left reference samples clockwise may be applied. In arranging reference samples in a line, an intra prediction mode angle may be considered.

Based on an intra directional parameter, a reference sample determination parameter may be determined. A reference sample determination parameter may include a reference sample index for specifying a reference sample and a weight parameter for determining a weight applied to a reference sample.

iIdx, a reference sample index, and ifact, a weight parameter, may be obtained by the following Equations 14 and 15, respectively.

$$iIdx=(y+1)*P_{ang}/32 \quad \text{[Equation 14]}$$

$$i_{fact}=[(y+1)*P_{ang}]\&31 \quad \text{[Equation 15]}$$

In Equations 14 and 15, $P_{ang}$ represents an intra directional parameter. A reference sample specified by iIdx, a reference sample index, corresponds to an integer-pel.

At least one or more reference samples may be specified to derive a prediction sample. Concretely, a position of a reference sample used to derive a prediction sample may be specified by considering a slope of a prediction mode. In an example, a reference sample used to derive a prediction sample may be specified by using iIdx, a reference sample index.

In this case, when a slope of an intra prediction mode is not represented by one reference sample, a plurality of reference samples may be interpolated to generate a prediction sample. In an example, when a slope of an intra prediction mode is a value between a slope between a prediction sample and a first reference sample and a slope between a prediction sample and a second reference sample, a prediction sample may be obtained by interpolating a first reference sample and a second reference sample. In other words, when an angular line following an intra prediction angle does not pass a reference sample positioned at an integer-pel, a prediction sample may be obtained by interpolating reference samples adjacent to the left and right or the top and bottom of a position where the angular line passes.

The following Equation 16 represents an example in which a prediction sample is obtained based on reference samples.

$$P(x,y)=((32-i_{fact})/32)*Ref\_1D(x+iIdx+1)+(i_{fact}/32)*Ref\_1D(x+iIdx+2) \quad \text{[Equation 16]}$$

In Equation 16, P represents a prediction sample and Ref_1D represents one of reference samples which are arranged in a one-dimension. In this case, a position of a reference sample may be determined by (x, y), a position of a prediction sample, and iIdx, a reference sample index.

When a slope of an intra prediction mode may be represented by one reference sample, a weight parameter $i_{fact}$ is set to be 0. Accordingly, Equation 16 may be simplified as in the following Equation 17.

$$P(x,y)=Ref\_1D(x+iIdx+1) \quad \text{[Equation 17]}$$

Based on a plurality of intra prediction modes, intra prediction for a current block may be performed. In an example, an intra prediction mode may be derived per prediction sample and a prediction sample may be derived based on an intra prediction mode assigned thereto.

Alternatively, an intra prediction mode may be derived per region and intra prediction for a region may be performed based on an intra prediction mode assigned thereto. In this case, the region may include at least one sample. At least one of a size or a shape of the region may be adaptively determined based on at least one of a size or a shape of a current block or an intra prediction mode. Alternatively, at least one of a size or a shape of a region may be predefined in an encoder and a decoder independently from a size or a shape of a current block.

FIG. 37 is a diagram illustrating an angle formed by directional intra prediction modes with a straight line parallel to an x-axis.

As in an example shown in FIG. 37, directional prediction modes may exist between a bottom-left diagonal direction and a top-right diagonal direction. As described by an angle formed by an x-axis and a directional prediction mode, directional prediction modes may exist between 45 degrees (a bottom-left diagonal direction) and −135 degrees (a top-right diagonal direction).

When a current block has a non-square shape, a case may occur that a prediction sample is derived by using a reference sample farther from a prediction sample instead of a reference sample closer to a prediction sample among reference samples positioned on an angular line following an intra prediction angle according to an intra prediction mode of a current block.

FIG. 38 is a diagram showing an aspect in which a prediction sample is obtained when a current block has a non-square shape.

In an example, as in an example shown in FIG. 38 (a), it is assumed that a current block has a non-square shape whose width is greater than a height and an intra prediction mode of a current block is a directional intra prediction mode having an angle from 0 degrees to 45 degrees. In the case, a case may occur that when prediction sample A near a right column of a current block is derived, left reference sample L far from the prediction sample instead of top reference sample T close to the prediction sample among reference samples positioned in an angular mode following the angle is used.

In another example, as in an example shown in FIG. 38 (b), it is assumed that a current block has a non-square shape whose height is greater than a width and an intra prediction mode of a current block is a directional intra prediction mode from −90 degrees to −135 degrees. In the case, a case may occur that when prediction sample A near a bottom row of a current block is derived, top reference sample T far from the prediction sample instead of left reference sample L close to the prediction sample among reference samples positioned in an angular mode following the angle is used.

To resolve the problem, when a current block is non-square, an intra prediction mode of a current block may be substituted for an intra prediction mode in an opposite direction. Accordingly, directional prediction modes having an angle larger or smaller than directional prediction modes shown in FIG. 34 may be used for a non-square block. Such a directional intra prediction mode may be defined as a wide-angle intra prediction mode. A wide-angle intra prediction mode represents a directional intra prediction mode which does not belong to a range between 45 degrees to −135 degrees.

FIG. 39 is a diagram showing wide-angle intra prediction modes.

As in an example shown in FIG. 39, intra prediction modes whose index is −1 to −14 and intra prediction modes whose index is 67 to 80 represent wide-angle intra prediction modes.

FIG. 39 illustrated 14 wide-angle intra prediction modes (from −1 to −14) that an angle is greater than 45 degrees and 14 wide-angle intra prediction modes (from 67 to 80) that an angle is smaller than −135 degrees, but more or less wide-angle intra prediction modes may be defined.

When a wide-angle intra prediction mode is used, a length of top reference samples may be set as 2W+1 and a length of left reference samples may be set as 2H+1.

As a wide-angle intra prediction mode is used, sample A shown in FIG. 39 (*a*) may be predicted by using reference sample T and sample A shown in FIG. 39 (*b*) may be predicted by using reference sample L.

A total of 67+N intra prediction modes may be used by adding the existing intra prediction modes and N wide-angle intra prediction modes. In an example, Table 7 represents an intra directional parameter of intra prediction modes when 20 wide-angle intra prediction modes are defined.

TABLE 7

| | \multicolumn{8}{c}{PredModeIntra} |
|---|---|---|---|---|---|---|---|---|
| | −10 | −9 | −8 | −7 | −6 | −5 | −4 | −3 | −2 |
| intraPredAngle | 114 | 93 | 79 | 68 | 60 | 54 | 49 | 45 | 39 |

| | \multicolumn{8}{c}{PredModeIntra} |
|---|---|---|---|---|---|---|---|---|
| | −1 | 2 | 3 | 4 | 5 | 6 | 7 | 8 | 9 |
| intraPredAngle | 35 | 32 | 29 | 26 | 23 | 21 | 19 | 17 | 15 |

| | \multicolumn{8}{c}{PredModeIntra} |
|---|---|---|---|---|---|---|---|---|
| | 10 | 11 | 12 | 13 | 14 | 15 | 16 | 17 | 18 |
| intraPredAngle | 13 | 11 | 9 | 7 | 5 | 3 | 2 | 1 | 0 |

| | \multicolumn{8}{c}{PredModeIntra} |
|---|---|---|---|---|---|---|---|---|
| | 19 | 20 | 21 | 22 | 23 | 24 | 25 | 26 | 27 |
| intraPredAngle | −1 | −2 | −3 | −5 | −7 | −9 | −11 | −13 | −15 |

| | \multicolumn{8}{c}{PredModeIntra} |
|---|---|---|---|---|---|---|---|---|
| | 28 | 29 | 30 | 31 | 32 | 33 | 34 | 35 | 36 |
| intraPredAngle | −17 | −19 | −21 | −23 | −26 | −29 | −32 | −29 | −26 |

| | \multicolumn{8}{c}{PredModeIntra} |
|---|---|---|---|---|---|---|---|---|
| | 37 | 38 | 39 | 40 | 41 | 42 | 43 | 44 | 45 |
| intraPredAngle | −23 | −21 | −19 | −17 | −15 | −13 | −11 | −9 | −7 |

| | \multicolumn{8}{c}{PredModeIntra} |
|---|---|---|---|---|---|---|---|---|
| | 46 | 47 | 48 | 49 | 50 | 51 | 52 | 53 | 54 |
| intraPredAngle | −5 | −3 | −2 | −1 | 0 | 1 | 2 | 3 | 5 |

| | \multicolumn{8}{c}{PredModeIntra} |
|---|---|---|---|---|---|---|---|---|
| | 55 | 56 | 57 | 58 | 59 | 60 | 61 | 62 | 63 |
| intraPredAngle | 7 | 9 | 11 | 13 | 15 | 17 | 19 | 21 | 23 |

| | \multicolumn{8}{c}{PredModeIntra} |
|---|---|---|---|---|---|---|---|---|
| | 64 | 65 | 66 | 67 | 68 | 69 | 70 | 71 | 72 |
| intraPredAngle | 26 | 29 | 32 | 35 | 39 | 45 | 49 | 54 | 60 |

| | \multicolumn{4}{c}{PredModeIntra} |
|---|---|---|---|---|
| | 73 | 74 | 75 | 76 |
| intraPredAngle | 68 | 79 | 93 | 114 |

When a current block is non-square and an intra prediction mode of a current block obtained in S2502 belongs to a conversion range, an intra prediction mode of a current block may be converted into a wide-angle intra prediction mode. The conversion range may be determined based on at least one of a size, a shape or a ratio of a current block. In this case, the ratio may represent a ratio between a width and a height of a current block. When a current block has a non-square shape whose width is greater than a height, a conversion range may be set from an intra prediction mode index in a top-right diagonal direction (e.g., 66) to (an index of an intra prediction mode in a top-right diagonal direction −N). In this case, N may be determined based on a ratio of a current block. When an intra prediction mode of a current block belongs to a conversion range, the intra prediction mode may be converted into a wide-angle intra prediction mode. The conversion may be performed by subtracting a predefined value from the intra prediction mode and the predefined value may be a total number of intra prediction modes excluding wide-angle intra prediction modes (e.g., 67).

By the embodiment, intra prediction modes between No. 66 to No. 53 may be respectively converted into wide-angle intra prediction modes between No. −1 to No. −14.

When a current block has a non-square shape whose height is greater than a width, a conversion range may be set from an intra prediction mode index in a bottom-left diagonal direction (e.g., 2) to (an index of an intra prediction mode in a bottom-left diagonal direction+M). In this case, M may be determined based on a ratio of a current block. When an intra prediction mode of a current block belongs to a conversion range, the intra prediction mode may be converted into a wide-angle intra prediction mode. The conversion may be performed by adding a predefined value to the intra prediction mode and the predefined value may be a total number of directional intra prediction modes excluding wide-angle intra prediction modes (e.g., 65).

By the embodiment, intra prediction modes between No. 2 to No. 15 may be respectively converted into wide-angle intra prediction modes between No. 67 to No. 80.

Hereinafter, intra prediction modes belonging to a conversion range are referred to as a wide-angle replaced intra prediction mode.

A conversion range may be determined based on a ratio of a current block. In an example, Table 8 represent a conversion range when 67 intra prediction modes are defined excluding a wide-angle intra prediction mode.

TABLE 8

| Condition | Replaced Intra Prediction Modes |
|---|---|
| W/H = 16 | Modes 12, 13, 14, 15 |
| W/H = 8 | Modes 12, 13 |
| W/H = 4 | Modes 2, 3, 4, 5, 6, 7, 8, 9, 10, 11 |
| H/W = 2 | Modes 2, 3, 4, 5, 6, 7 |
| H/W = 1 | None |
| W/H = 1/2 | Modes 61, 62, 63, 64, 65, 66 |
| W/H = 1/4 | Modes 57, 58, 59, 60, 61, 62, 63, 64, 65, 66 |
| W/H = 1/8 | Modes 55, 56 |
| H/W = 1/16 | Modes 53, 54, 55, 56 |

When a non-adjacent reference sample line is determined as a reference sample line of a current block, or when a multi-line intra prediction encoding method selecting any one of a plurality of reference sample lines is used, a wide-angle intra prediction mode may be set not to be used. In other words, although a current block is non-square and an intra prediction mode of a current block belongs to a conversion range, an intra prediction mode of a current block may not be converted into a wide-angle intra prediction mode. Alternatively, when an intra prediction mode of a current block is determined as a wide-angle intra prediction mode, non-adjacent reference sample lines may be unavailable as a reference sample line of a current block, or a multi-line intra prediction encoding method selecting any one of a plurality of reference sample lines may not to be used. When a multi-line intra prediction encoding method is not used, an adjacent reference sample line may be determined as a reference sample line of a current block.

When a wide-angle intra prediction mode is not used, refW and refH may be set as a sum of nTbW and nTbH. Accordingly, excluding a top-left reference sample, a non-adjacent reference sample whose distance with a current block is i may include (nTbW+nTbH+offsetX[i]) top reference samples and (nTbW+nTbH+offsetY[i]) left reference samples. In other words, a non-adjacent reference sample whose distance with a current block is i may include (2nTbW+2nTbH+offsetX[i]+offsetY[i]+1) reference samples. For example, when a value of whRatio is greater than 1, a value of offsetX may be set to be larger than that of offsetY. In an example, a value of offsetX may be set to be 1 and a value of offsetY may be set to be 0. On the other hand, when a value of whRatio is smaller than 1, a value of offsetY may be set to be larger than that of offsetX. In an example, a value of offsetX may be set to be 0 and a value of offsetY may be set to be 1.

As wide-angle intra prediction modes are used in addition to the existing intra prediction modes, a resource needed to encode wide-angle intra prediction modes may increase and encoding efficiency may decrease. Accordingly, instead of encoding wide-angle intra prediction modes as they are, replaced intra prediction modes for wide-angle intra prediction modes may be encoded to improve encoding efficiency.

In an example, when a current block is encoded by using a wide-angle intra prediction mode of No. 67, No. 2, a wide-angle replaced intra prediction mode of No. 67, may be encoded as an intra prediction mode of a current block. In addition, when a current block is encoded by a wide-angle intra prediction mode of No. −1, No. 66, a wide-angle replaced intra prediction mode of No. −1, may be encoded as an intra prediction mode of a current block.

In a decoder, an intra prediction mode of a current block may be decoded and whether a decoded intra prediction mode is included in a conversion range may be determined. When a decoded intra prediction mode is a wide-angle replaced intra prediction mode, an intra prediction mode may be converted into a wide-angle intra prediction mode. Alternatively, when a current block is encoded by a wide-angle intra prediction mode, a wide-angle intra prediction mode may be encoded as it is.

Encoding of an intra prediction mode may be performed based on the above-described MPM list. Concretely, when a neighboring block is encoded by a wide-angle intra prediction mode, an MPM may be set based on a wide-angle replaced intra prediction mode corresponding to the wide-angle intra prediction mode.

One prediction mode may be applied to a current block several times or a plurality of prediction modes may be redundantly applied. Likewise, a prediction method using the same type or a different type of prediction modes may be referred to as a combined prediction mode (or, Multi-hypothesis Prediction Mode).

A combined prediction mode may include at least one of a mode that a merge mode and a merge mode are combined, a mode that inter prediction and intra prediction are combined, a mode that a merge mode and a motion vector prediction mode are combined, a mode that a motion vector prediction mode and a motion vector prediction mode are combined or a mode that a merge mode and intra prediction are combined.

In a combined prediction mode, a first prediction block may be generated based on a first prediction mode and a second prediction block may be generated based on a second prediction mode. After that, a third prediction block may be generated based on a weighted sum operation of a first prediction block and a second prediction block. A third prediction block may be set as a final prediction block of a current block.

Whether a combined prediction mode is used may be determined based on a size or a shape of a current block. In an example, whether a combined prediction mode is used may be determined based on at least one of a size of a coding block, the number of samples included in a coding block, a width of a coding block or a height of a coding block. In an example, when at least one of a width or a height of a coding block is equal to or greater than 128 or when the number of samples included in a coding block is equal to or less than 64, a combined prediction mode may not be applied to a coding block.

Alternatively, information representing whether a combined prediction mode is applied to a current block may be signaled in a bitstream. In an example, the information may be a 1-bit flag. In an example, mh_intra_flag, a flag representing whether a combined prediction mode that a merge mode and intra prediction are combined is used, may be signaled in a bitstream. When mh_intra_flag is 1, it represents that a combined prediction mode that a merge mode and intra prediction are combined is used and when mh_intra_flag is 0, it represents that a combined prediction mode that a merge mode and intra prediction are combined is not used.

Only when a prediction encoding mode of a current block is an inter prediction mode and a merge mode is applied to a current block, a combined prediction mode that a merge mode and intra prediction are combined may be applied to a current block. In other words, when a value of merge flag, a flag representing whether a merge mode is applied to a current block, is 1, mh_intra_flag may be signaled.

In a combined prediction mode that a merge mode and intra prediction are combined, an intra prediction mode of a current block may be set as a predefined intra prediction mode. In an example, when a combined prediction mode is used, an intra prediction mode of a current block may be set as a planar mode.

In another example, when a combined prediction mode that a merge mode and intra prediction are combined is used, an inter prediction mode of a current block may be determined as any one of candidate intra prediction modes. In this case, candidate intra prediction modes may include at least one of a nondirectional intra prediction mode or a directional intra prediction mode in a specific direction. In this case, a nondirectional intra prediction mode may include at least one of DC or planar and a directional intra prediction mode may include at least one of an intra prediction mode in a horizontal direction, an intra prediction mode in a vertical direction and an intra prediction mode in a diagonal direction. In an example, when a combined prediction mode is used, only a DC, planar, a horizontal directional intra prediction mode or a vertical directional intra prediction mode may be set as an intra prediction mode of a current block. Alternatively, when a combined prediction mode is used, only a planar, a horizontal directional intra prediction mode or a vertical directional intra prediction mode may be set as an intra prediction mode of a current block. Alternatively, when a combined prediction mode is used, only a DC, planar or a vertical directional intra prediction mode may be set as an intra prediction mode of a current block. Alternatively, when a combined prediction mode is used, only a DC, planar or a horizontal directional intra prediction mode may be set as an intra prediction mode of a current block.

Index information for specifying any one of candidate intra prediction modes may be signaled in a bitstream. In an example, mh_intra_idx, index specifying any one of candidate intra prediction modes, may be signaled in a bitstream. Table 9 and Table 10 represent an intra prediction mode according to a value of mh_intra_idx. An intra prediction mode of a current block may be determined as an intra prediction mode indicated by mh_intra_idx.

TABLE 9

| | mh_intra_idx | | | |
|---|---|---|---|---|
| | 0 | 1 | 2 | 3 |
| intra mode | PLANAR | DC | VERTICAL | HORIZONTAL |

TABLE 10

| | mh_intra_idx | | |
|---|---|---|---|
| | 0 | 1 | 2 |
| intra mode | PLANAR | VERTICAL | HORIZONTAL |

The number of candidate intra prediction modes may have a fixed value in an encoder and a decoder. Alternatively, the number or a type of candidate intra prediction modes may be different according to at least one of a size or a shape of a current block or whether a neighboring block is encoded by intra prediction.

In another example, when a combined prediction mode that a merge mode and intra prediction are combined is applied, an inter prediction mode of a current block may be determined based on MPMs. In this case, the number of MPMs included by an MPM list when general intra prediction is applied may be different from the number of MPMs included by an MPM list when a combined prediction mode is applied. In an example, while an MPM list includes 6 or 5 MPMs when a combined prediction mode is not applied, an MPM list may include 4 or 3 MPMs when a combined prediction mode is applied. In other words, while N MPMs are used when general intra prediction is performed, MPMs smaller than N may be used when a combined prediction mode is applied.

In an example, when a general intra prediction mode is applied, it is assumed that MPMs derived based on an intra prediction mode of a neighboring block adjacent to a current block are planar, DC, INTRA_MODE32, INTRA_MODE31, INTRA_MODE33 and INTRA_MODE30. When a combined prediction mode is applied to a current block, an intra prediction mode of a current block may be determined by using only part of the 6 MPMS. In an example, an intra prediction mode of a current block may be determined by using an MPM list including planar, DC and INTRA_MODE32 of 3 MPMs that has the smallest index among the MPMs. Alternatively, any one having a predefined index value among the MPMs may be determined as an intra prediction mode of a current block.

In another example, the number of MPMs used to determine an intra prediction mode of a current block when general intra prediction is applied may be set the same as the number of MPMs used to determine an intra prediction mode of a current block when a combined prediction mode is applied.

When a combined prediction mode is applied, encoding of an MPM flag may be omitted and an MPM flag may be inferred to true. In other words, when a combined prediction mode is applied, any one of MPMs may be determined as an intra prediction mode of a current block.

Alternatively, an intra prediction mode of a current block may be derived based on intra prediction modes of neighboring blocks adjacent to a current block. In this case, a neighboring block may include at least one of a top neighboring block, a left neighboring block, a top-left neighboring block, a top-right neighboring block or a bottom-left neighboring block. An intra prediction mode of a current block may be set as an intra prediction mode with the highest frequency among intra prediction modes of neighboring blocks adjacent to a current block.

Alternatively, an intra prediction mode of a current block may be determined by comparing intra prediction modes of neighboring blocks at a predefined position. In an example, when an intra prediction mode of a top neighboring block of a current block is the same as that of a left neighboring block, an intra prediction mode of a current block may be set the same as an intra prediction mode of a top neighboring block and a left neighboring block.

Alternatively, index information for specifying the same neighboring block as an intra prediction mode of a current block among a plurality of neighboring blocks may be signaled in a bitstream. In an example, information indicating any one of a top neighboring block or a left neighboring block may be signaled in a bitstream and an intra prediction mode of a current block may be set the same as an intra prediction mode of a block indicated by the information.

Alternatively, when a combined prediction mode is applied to a neighboring block, an intra prediction mode of a neighboring block to which a combined prediction mode is applied may be set as an intra prediction mode of a current block.

When a combined prediction mode that a merge mode and intra prediction are combined is applied to a current block, it may be set not to use a multi-line intra prediction encoding method. When a multi-line intra prediction encoding method is not used, an adjacent reference sample line may be used for intra prediction of a current block.

Alternatively, when a combined prediction mode that a merge mode and intra prediction are combined is applied to a current block, it may be set to use a multi-line intra prediction encoding method. Information for determining a reference sample line of a current block among a plurality of reference sample lines may be signaled in a bitstream. Alternatively, a reference sample line of a current block may be determined by considering at least one of a size of a current block, a shape of a current block, an intra prediction mode of a current block or a reference sample line of a neighboring block.

Alternatively, information representing whether a multi-line intra method is applied in a combined prediction mode may be signaled in a bitstream. The information may be a 1-bit flag. When the flag indicates that a multi-line intra method is applied, index information specifying any one of multi-lines may be signaled in a bitstream.

The number of available candidate intra prediction modes may be differently set according to a reference sample line of a current block. In an example, when an adjacent reference sample line is used, a candidate intra prediction mode may include at least one of a planar, a DC, a horizontal directional intra prediction mode, a vertical directional intra prediction mode, a bottom-left diagonal directional intra prediction mode or a top-right diagonal directional intra prediction mode. On the other hand, when a non-adjacent reference sample line is used, a candidate intra prediction mode may include at least one of a horizontal directional intra prediction mode, a vertical directional intra prediction mode, a bottom-left diagonal directional intra prediction mode or a top-right diagonal directional intra prediction mode.

A first prediction block may be generated by using a merge candidate selected in a merge mode and a second prediction block may be generated by using an intra prediction mode. In this case, when a first prediction block is generated, triangular partitioning may not be applied to a current block. In other words, triangular partitioning may not be allowed in a combined prediction mode that a merge mode and intra prediction are combined. In addition, when a second prediction block is generated, PDPC may not be applied to a current block. In other words, PDPC may not be allowed in a combined prediction mode that a merge mode and intra prediction are combined.

A third prediction block may be generated based on a weighted sum operation of a first prediction block and a second prediction block. In an example, Equation 18 is a diagram showing an example in which a third prediction block is generated based on a weighted sum operation of a first prediction block and a second prediction block.

$$P_{comb}(W*P_{merge}+(N-W)*P_{intra}+4)>>\log_2 N \qquad \text{[Equation 18]}$$

In the Equation 18, $P_{merge}$ represents a first prediction block obtained based on a merge mode and $P_{intra}$ represents a second prediction block obtained based on intra prediction. $P_{comb}$ represents a third prediction block obtained by combining a first prediction block and a second prediction block. w represents a first weight applied to a first prediction block. A second weight applied to a second prediction block may be derived by subtracting w, a first weight, from a constant N. In this case, N may have a value which is predefined in an encoder and a decoder. In an example, N may be 4 or 8. Alternatively, a constant N may be derived based on at least one of a size or a shape of a current block or an intra prediction mode of a current block.

Unlike an example in Equation 18, w may be set as a second weight and a value subtracting a second weight from a predetermined constant N may be set as a first weight.

Weights applied to a first prediction block and a second prediction block may be determined based on at least one of an intra prediction mode of a current block or whether a merge mode has bidirectional motion information. In an example, a value of w, a first weight, when an intra prediction mode of a current block is a directional prediction mode may have a value greater than a value of w, a first weight, when an intra prediction mode of a current block is a nondirectional mode. Alternatively, a value of w, a first weight, when bidirectional prediction is performed by a merge candidate may have a value greater than a value of w, a first weight, when unidirectional prediction is performed by a merge candidate.

In another example, weights may be determined by considering a prediction encoding mode of neighboring blocks adjacent to a current block. In this case, a neighboring block may include at least one of a top neighboring block adjacent to the top of a current block, a left neighboring block adjacent to the left of a current block or a top-left neighboring block adjacent to a top-left corner of a current block. A weight may be determined based on the number of neighboring blocks encoded by intra prediction among neighboring blocks adjacent to a current block. In an example, a first weight may be set to have a smaller value and a second weight may be set to have a larger value as the number of neighboring blocks encoded by intra prediction among neighboring blocks adjacent to a current block increases. On the other hand, a first weight may be set to have a larger value and a second weight may be set to have a smaller value as the number of neighboring blocks encoded by non-intra prediction among neighboring blocks adjacent to a current block decreases. In an example, when both a left neighboring block and a top neighboring block are encoded by intra prediction, a second weight may be set to be n. When only any one of a left neighboring block and a top neighboring block is encoded by intra prediction, a second weight may be set to be n/2. When both a left neighboring block and a top neighboring block are not encoded by intra prediction, a second weight may be set to be n/4. In this case, n represents an integer which is the same as or smaller than N.

A block to which a combined prediction mode that a merge mode and intra prediction are combined is applied may be considered to be encoded by inter prediction. Accordingly, an intra prediction mode of a block encoded by a combined prediction mode may be unavailable for deriving an intra prediction mode of a block which will be encoded/decoded. When an MPM is derived, an intra prediction mode of an unavailable block may be considered as planar.

On the other hand, motion information of a block encoded by a combined prediction mode may be set to be available for deriving motion information of a block which will be encoded/decoded.

A residual image may be derived by subtracting a prediction image from an original image. In this connection, when the residual image is converted into a frequency domain, even though high frequency components are removed from frequency components, subjective image quality of the image does not drop significantly. Accordingly, when values of high frequency components are transformed into small values, or when values of high frequency components are set to 0, compression efficiency may be increased without causing large visual distortion. Reflecting the above feature, transform may be performed on a current block so as to decompose a residual image to two-dimensional frequency components. The transform may be performed by using transform methods such as DCT (discrete cosine transform), DST (discrete sine transform), etc.

A transform method may be determined on a basis of a block. A transform method may be determined on the basis of at least one of a prediction encoding mode for a current block, a size of the current block, or a size of the current block. In an example, when a current block is encoded through an intra-prediction mode, and a size of the current block is smaller than N×N, transform may be performed by using a transform method of DST. On the other hand, when the above condition is not satisfied, transform may be performed by using a transform method of DCT.

For a partial block of a residual image, two-dimensional image transform may not be performed. Not performing two-dimensional image transform may be referred to as transform skip. When transform skip is applied, quantization may be applied to residual values for which transform is not performed.

After performing transform on a current block by using DCT or DST, transform may be performed again on the transformed current block. In this connection, transform based on DCT or DST may be defined as first transform, and performing transform again on a block to which first transform is applied may be defined as second transform.

First transform may be performed by using any one of a plurality of transform core candidates. In an example, first transform may be performed by using any one of DCT2, DCT8, or DCT7.

Different transform cores may be used for a horizontal direction and a vertical direction. Information representing a combination of a transform core of a horizontal direction and a transform core of a vertical direction may be signaled in a bitstream.

A processing unit of first transform may differ with second transform. In an example, first transform may be performed on an 8×8 block, and second transform may be performed on a 4×4 sized sub-block within the transformed 8×8 block. In this connection, a transform coefficient for remaining regions for which second transform is not performed may be set to 0.

Alternatively, first transform may be performed on a 4×4 block, and second transform may be performed on a region having an 8×8 size including the transformed 4×4 block.

Information representing whether or not to perform second transform may be signaled in a bitstream.

Alternatively, whether to perform the second transform may be determined based on whether a horizontal directional transform core and a vertical directional transform core are identical with each other. In one example, the second transform may be performed only when the horizontal directional transform core and the vertical directional transform core are identical with each other. Alternatively, the second transform may be performed only when the horizontal directional transform core and the vertical directional transform core are different from each other.

Alternatively, the second transform may be allowed only when a predefined transform core is used for the horizontal directional transform and the vertical directional transform. In one example, when a DCT2 transform core is used for transform in the horizontal direction and transform in the vertical direction, the second transform may be allowed.

Alternatively, it may be determined whether to perform the second transform based on the number of non-zero transform coefficients of the current block. In one example, when the number of the non-zero transforms coefficient of the current block is smaller than or equal to a threshold, the prediction method may be configured not to use the second transform. When the number of the non-zero transform coefficients of the current block is greater than the threshold, the prediction method may be configured to use the second transform. As long as the current block is encoded using intra prediction, the prediction method may be configured to use the second transform.

The decoder may perform inverse-transform (second inverse-transform) to the second transform and may perform inverse-transform (first inverse-transform) to the first transform resultant from the second inverse-transform. As a result of performing the second inverse-transform and the first inverse-transform, residual signals for the current block may be obtained.

When transform and quantization are performed by the encoder, the decoder may obtain the residual block via inverse-quantization and inverse-transform. The decoder may add the prediction block and the residual block to each other to obtain the reconstructed block for the current block.

When the reconstructed block of the current block is obtained, loss of information as occurring in the process of the quantization and encoding may be reduced via the in-loop filtering. The in-loop filter may include at least one of a deblocking filter, a sample adaptive offset filter (SAO), or an adaptive loop filter (ALF).

Applying the embodiments as described about the decoding process or the encoding process to the encoding process or the decoding process respectively may be included in the scope of the present disclosure. Within the scope of the present disclosure, the embodiments in which operations occur in a predetermined order may be modified to embodiments in which the operations occur in a different order from the predetermined order.

Although the above-described embodiment is described based on a series of the operations or the flowchart, the embodiment does not limit a time-series order of the operations of the method thereto. In another example, the operations may be performed simultaneously or in a different order therefrom as necessary. Further, in the above-described embodiment, each of the components (for example, a unit, a module, etc.) constituting the block diagram may be implemented in a form of a hardware device or software. A plurality of components may be combined with each other into a single component which may be implemented using a single hardware device or software. The above-described embodiment may be implemented using program instructions that may be executed via various computer components. The instructions may be recorded in a computer-readable storage medium. The computer-readable storage medium may contain therein program instructions, data files, data structures, or the like alone or in combination with each other. Examples of the computer-readable storage media include magnetic media such as hard disks, floppy disks, and magnetic tapes, optical storage media such as CD-ROMs, DVDs, and magneto-optical media such as floptical disks, and hardware devices such as ROM, RAM, flash memory, and the like specifically configured to store therein and execute the program instructions. The hardware device may be configured to operate as one or more software modules to perform processing according to the present disclosure, and vice versa.

INDUSTRIAL AVAILABILITY

The present disclosure may be applied to an electronic device that encodes/decodes a video.

What is claimed is:

1. A method of decoding a video, the method comprising:
determining a partitioning type of a coding block
partitioning the coding block into a first prediction unit and a second prediction unit based on the determined partitioning type,
    wherein the partitioning type is determined by index information specifying one of a plurality of partitioning type candidates, and
    wherein the plurality of partitioning type candidates comprises a symmetric partitioning type that a size of the first prediction unit and a size of the second prediction unit are the same and an asymmetric partitioning type that the size of the first prediction unit is different from the size of the second prediction unit;
deriving motion information of each of the first prediction unit and the second prediction unit; and
obtaining a prediction sample for the first prediction unit and the second prediction unit based on the derived motion information,
wherein the motion information of the first prediction unit is derived from a first merge candidate specified by a first merge index signaled in a bitstream, and
wherein the motion information of the second prediction unit is derived from a second merge candidate specified by a second merge index signaled in the bitstream.

2. The method of claim 1, wherein when the second merge index is the same as or greater than the first merge index, the second merge candidate has an index with a value adding 1 to the second merge index.

3. The method of claim 2, wherein when the second merge index is smaller than the first merge index, the second merge candidate has an index with a value indicated by the second merge index.

4. The method of claim 1, wherein when the first merge candidate has bidirectional motion information, one of L0 motion information or L1 motion information of the first merge candidate is derived as the motion information of the first prediction unit.

5. The method of claim 4, wherein whether the L0 motion information or the L1 motion information is used as the motion information of the first prediction unit is determined based on whether an index of the first merge candidate is an even number or an odd number.

6. The method of claim 1, wherein when the asymmetric partitioning type is selected, the coding block is partitioned by a partitioning line that one of a start point or an end point passes a corner of the coding block and the other does not pass the corner of the coding block.

7. A method of encoding a video, the method comprising:
determining a partitioning type of a coding block;
partitioning the coding block into a first prediction unit and a second prediction unit based on the determined partitioning type,
    wherein the partitioning type is determined as one of a plurality of partitioning type candidates, and
    wherein the plurality of partitioning type candidates comprises a symmetric partitioning type that a size of the first prediction unit and a size of the second prediction unit are the same and an asymmetric partitioning type that the size of the first prediction unit is different from the size of the second prediction unit;
deriving motion information of each of the first prediction unit and the second prediction unit; and
obtaining a prediction sample for the first prediction unit and the second prediction unit based on the derived motion information,
wherein a first merge index for specifying a first merge candidate used to derive the motion information of the first prediction unit and a second merge index for specifying a second merge candidate used to derive the motion information of the second prediction unit is encoded, respectively.

8. The method of claim 6, wherein when an index of the second merge candidate is greater than that of the first merge candidate, the second merge index is encoded with a value subtracting 1 from the index of the second merge candidate.

9. The method of claim 8, wherein when the index of the second merge candidate is smaller than that of the first merge candidate, the second merge index is encoded with a value of an index of the second merge candidate.

10. The method of claim 7, wherein when the first merge candidate has bidirectional motion information, one of L0 motion information or L1 motion information of the first merge candidate is derived as the motion information of the first prediction unit.

11. The method of claim 10, wherein whether the L0 motion information or the L1 motion information is used as the motion information of the first prediction unit is determined based on whether an index of the first merge candidate is an even number or an odd number.

12. The method of claim 7, wherein when the asymmetric partitioning type is selected, the coding block is partitioned by a partitioning line that one of a start point or an end point passes a corner of the coding block and the other does not pass the corner of the coding block.

13. A device for decoding a video, the device comprising:
an inter prediction unit configured to:
 determine a partitioning type of a coding block, partition the coding block into a first prediction unit and a second prediction unit based on the determined partitioning type, derive motion information of each of the first prediction unit and the second prediction unit, and obtain a prediction sample for the first prediction unit and the second prediction unit based on the derived motion information,
wherein the partitioning type is determined by index information specifying one of a plurality of partitioning type candidates, and
wherein the plurality of partitioning type candidates comprises a symmetric partitioning type that a size of the first prediction unit and a size of the second prediction unit are the same and an asymmetric partitioning type that the size of the first prediction unit is different from the size of the second prediction unit, and
wherein the motion information of the first prediction unit is derived from a first merge candidate specified by a first merge index signaled in a bitstream and the motion information of the second prediction unit is derived from a second merge candidate specified by a second merge index signaled in the bitstream.

* * * * *

UNITED STATES PATENT AND TRADEMARK OFFICE
CERTIFICATE OF CORRECTION

PATENT NO. : 12,010,305 B2
APPLICATION NO. : 17/428330
DATED : June 11, 2024
INVENTOR(S) : Bae Keun Lee and Dong San Jun It is certified that error appears in the above-identified patent and that said Letters Patent is hereby corrected as shown below:

In the Claims

Column 78, Line 58, in Claim 8, delete "claim 6," and insert -- claim 7, --.

Signed and Sealed this
Twentieth Day of August, 2024

Katherine Kelly Vidal
Director of the United States Patent and Trademark Office